US006783203B2

(12) United States Patent
Fujimori

(10) Patent No.: US 6,783,203 B2
(45) Date of Patent: Aug. 31, 2004

(54) PRINTING WITH MULTIPLE PIXELS AS UNIT OF GRADATION REPRODUCTION

(75) Inventor: Yukimitsu Fujimori, Nagano-ken (JP)

(73) Assignee: Seiko Epson Corporation (JP)

( * ) Notice: Subject to any disclaimer, the term of this patent is extended or adjusted under 35 U.S.C. 154(b) by 78 days.

(21) Appl. No.: 10/142,106

(22) Filed: May 8, 2002

(65) Prior Publication Data

US 2003/0007024 A1 Jan. 9, 2003

(30) Foreign Application Priority Data

May 11, 2001 (JP) ........................... 2001-141719
Oct. 24, 2001 (JP) ........................... 2001-326189

(51) Int. Cl.[7] .............................................. B41J 2/205
(52) U.S. Cl. .......................................................... 347/15
(58) Field of Search ............................. 347/43, 15, 9, 347/12; 358/298, 504

(56) References Cited

U.S. PATENT DOCUMENTS

| | | | | |
|---|---|---|---|---|
| 4,672,432 A | * | 6/1987 | Sakurada et al. | 358/534 |
| 5,111,302 A | * | 5/1992 | Chan et al. | 358/298 |
| 5,412,410 A | * | 5/1995 | Rezanka | 347/15 |
| 5,801,838 A | * | 9/1998 | Larson | 358/298 |

FOREIGN PATENT DOCUMENTS

| | | |
|---|---|---|
| JP | 11-115222 | 4/1999 |
| JP | 2000-225717 | 8/2000 |
| JP | 2000-280459 | 10/2000 |
| JP | 2001-341295 | 12/2001 |

OTHER PUBLICATIONS

Abstract of Japanese Patent Pub. No. 11–115222, Pub. Date: Apr. 27, 1999, Patent Abstracts of Japan.
Abstract of Japanese Patent Pub. No. 2000–225717, Pub. Date: Aug. 15, 2000, Patent Abstracts of Japan.
Abstract of Japanese Patent Pub. No. 2000–280459, Pub. Date: Oct. 10, 2000, Patent Abstracts of Japan.
Abstract of Japanese Patent Pub. No. 2001–341295, Pub. Date: Dec. 11, 2001., Patent Abstracts of Japan.

* cited by examiner

Primary Examiner—Thinh Nguyen
(74) Attorney, Agent, or Firm—Martine & Penilla, LLP

(57) ABSTRACT

In the first embodiment, gradation reproduction with a same ink is performed by (i) setting as a unit of gradation reproduction a group of N contiguous pixels (where N is an integer of at least 2) arranged in the main scan direction or the sub scan direction; (ii) setting the volume of ink ejectable onto at least one pixel location of the N pixels to a value different from the volume of ink ejectable onto other pixel locations; and (iii) controlling the volume of ink at each pixel location of the N pixels to reproduce M gradation levels (where M is an integer of at least N+2) for each group of the N pixels. In the second embodiment, low-resolution image data are generated based on high-resolution image data when the print control device outputs printing data to the printing device, assuming that each group of high-resolution pixels adjacent to each other constitute one low-resolution pixel. The low-resolution image data are used to eject ink drops onto each high-resolution pixel.

29 Claims, 55 Drawing Sheets

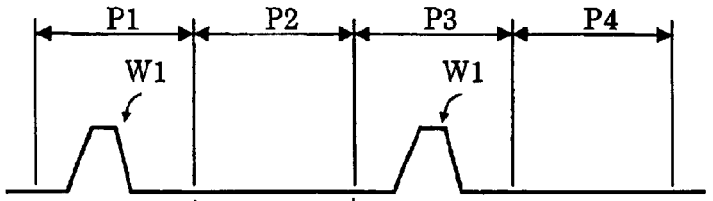
Fig.6(A) small dot common drive signal COM1 (Pass 1)
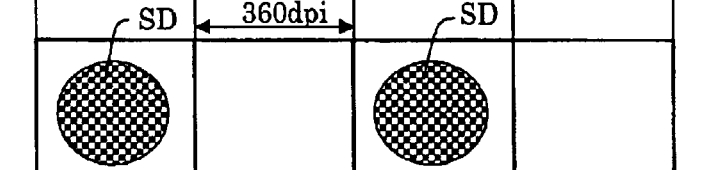
Fig.6(B) small dot formation (Pass 1)
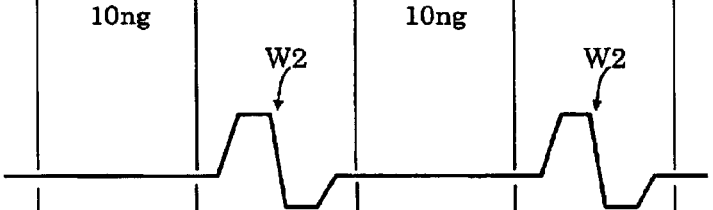
Fig.6(C) medium dot common drive signal COM2 (Pass 2)
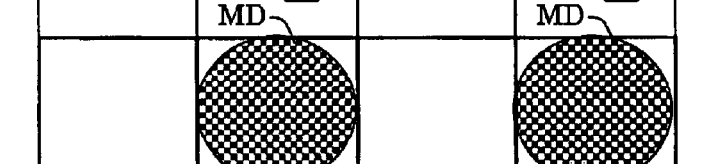
Fig.6(D) medium dot formation (Pass 2)
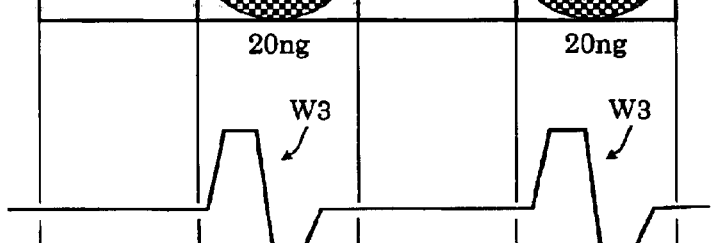
Fig.6(E) large dot common drive signal COM3 (Pass 3)
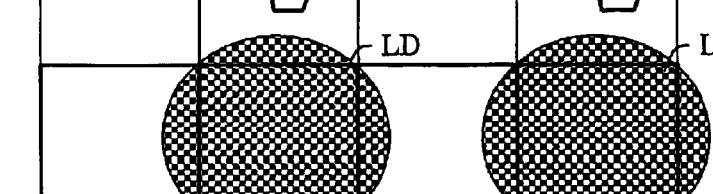
Fig.6(F) large dot formation (Pass 3)
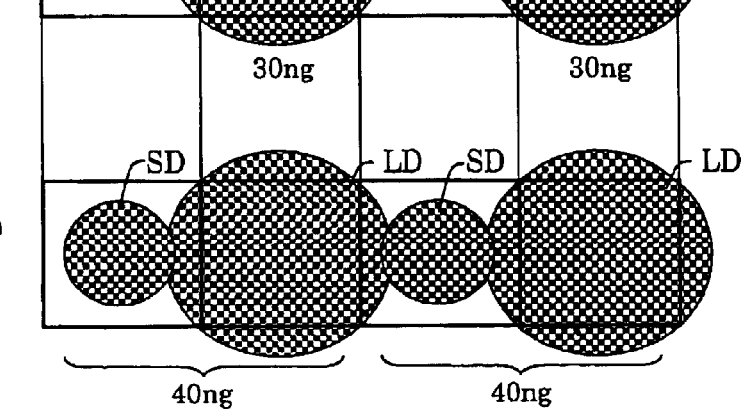
Fig.6(G) small + large dot formation (Pass 1 + Pass 3)

SOLID IMAGE WITH SMALL DOTS SD AND LARGE DOTS LD

Fig. 8

VOLUME OF EJECTED INK AT PIXEL PAIRS IN EXAMPLE 1

|  | Volume of ejected ink at each pixel ||
|---|---|---|
|  | odd pixel locations | even pixel locations |
| Pass 1 | 10 ng (SD) | - |
| Pass 2 | - | 20 ng (MD) |
| Pass 3 | - | 30 ng (LD) |

| Halftone data | Volume of ejected ink at pixel pair |
|---|---|
| 000 | 0 ng |
| 001 | 10 ng (SD) |
| 010 | 20 ng (MD) |
| 011 | 30 ng (LD) |
| 100 | 40 ng (SD+LD) |

Fig.9(A) PIXEL PAIR HALFTONE DATA (3-bit)

Fig.9(B) SINGLE PIXEL HALFTONE DATA (1-bit)

Fig.9(C) DOT FORMATION

D(S-on): density level with small dot On
D(M-on): density level with medium dot On
D(L-on): density level with large dot On

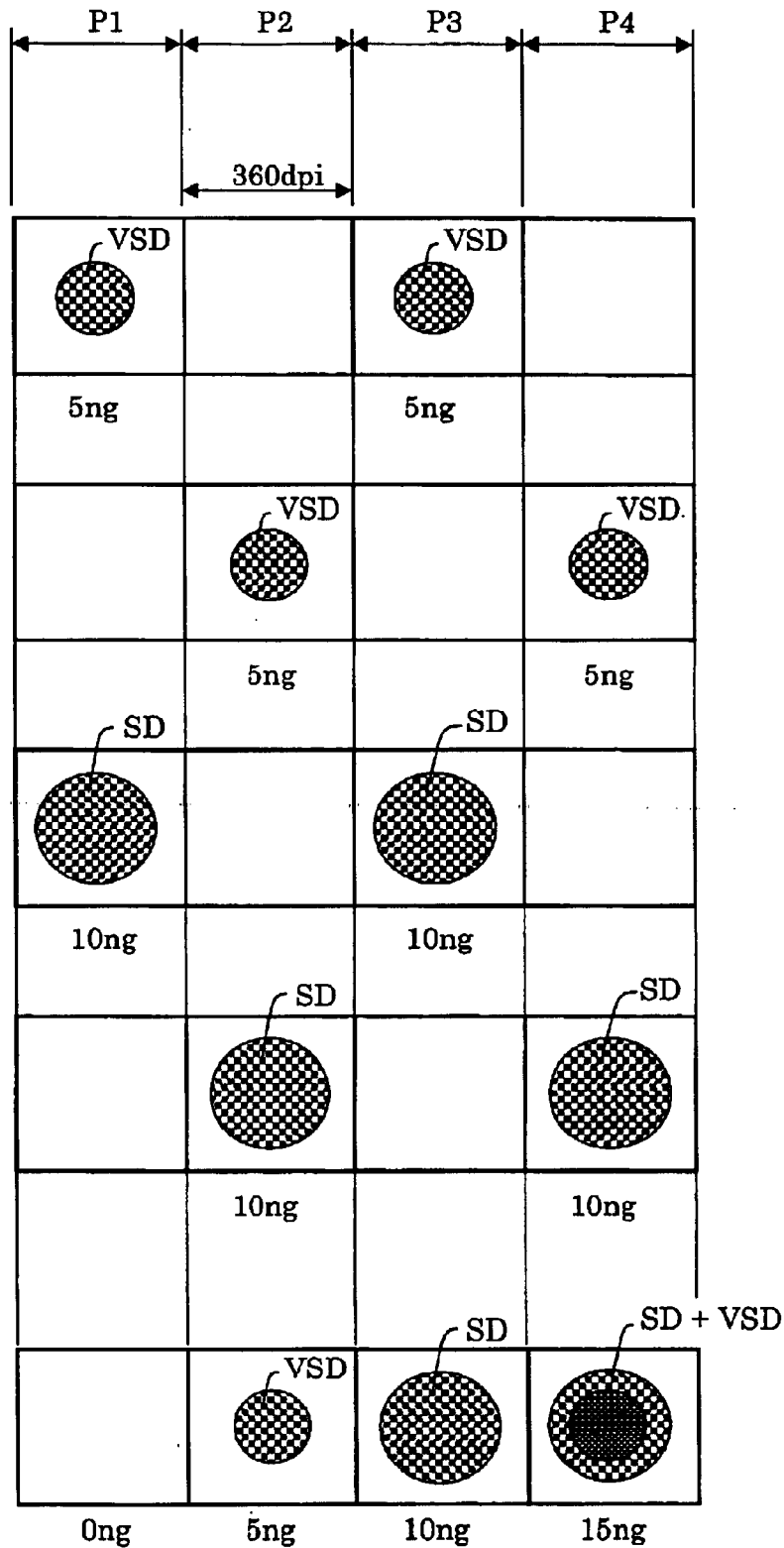

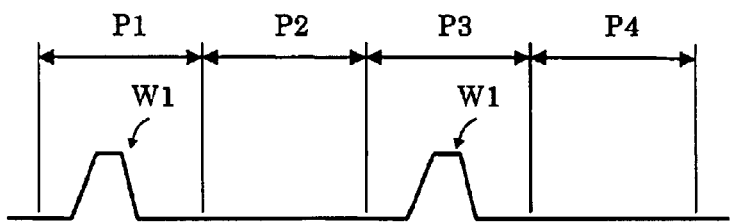
Fig.12(A) SMALL DOT COMMON DRIVE SIGNAL COM1a (Pass 1)
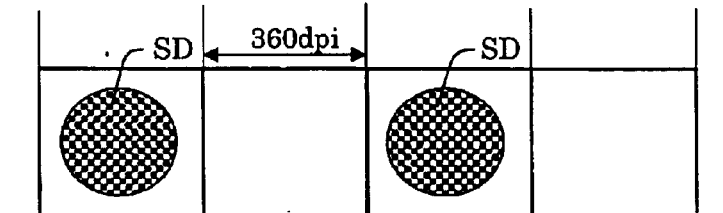
Fig.12(B) SMALL DOT FORMATION (Pass 1)
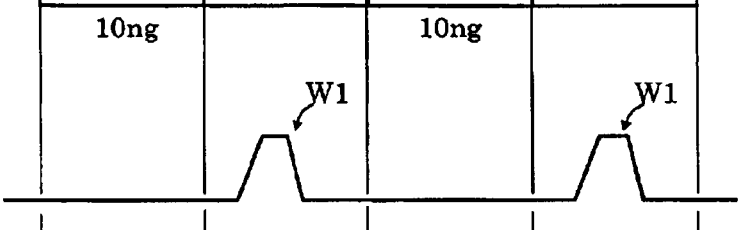
Fig.12(C) SMALL DOT COMMON DRIVE SIGNAL COM1b (Pass 2)
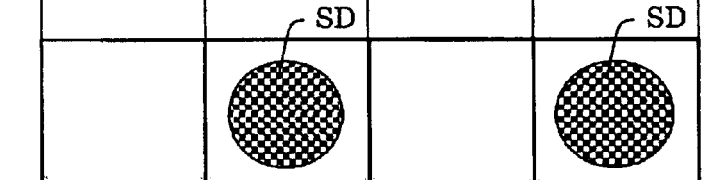
Fig.12(D) SMALL DOT FORMATION (Pass 2)
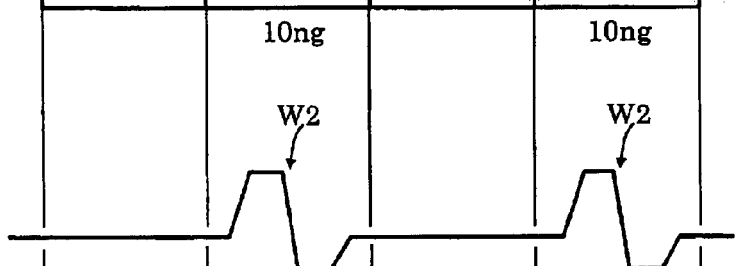
Fig.12(E) MEDIUM DOT COMMON DRIVE SIGNAL COM2 (Pass 3)
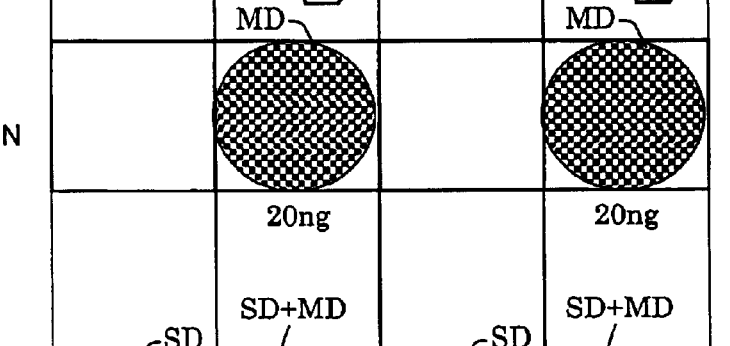
Fig.12(F) MEDIUM DOT FORMATION (Pass 3)
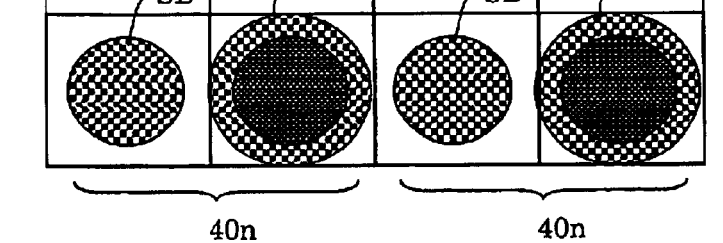
Fig.12(G) 2 SMALL DOTS + LARGE DOT FORMATION (Pass 1 + Pass 3)

Fig. 13

VOLUME OF EJECTED INK AT PIXEL PAIRS IN EXAMPLE 2

|  | Volume of ejected ink at each pixel | |
| --- | --- | --- |
|  | odd pixel locations | even pixel locations |
| Pass 1 | 10 ng (SD) | - |
| Pass 2 | - | 10 ng (SD) |
| Pass 3 | - | 20 ng (MD) |

| Halftone data | Volume of ejected ink at pixel pair |
| --- | --- |
| 000 | 0 ng |
| 001 | 10 ng (SD) |
| 010 | 20 ng (SD+SD) |
| 011 | 30 ng (SD+MD) |
| 100 | 40 ng (SD+SD+MD) |

Fig.14

VOLUME OF EJECTED INK AT PIXEL PAIRS IN EXAMPLE 3

|  | Volume of ejected ink at each pixel | |
|---|---|---|
|  | odd pixel locations | even pixel locations |
| Pass 1 | 6 ng (SD) | - |
| Pass 2 | - | 12 ng (MD) |
| Pass 3 | 22 ng (LD) | - |

| Halftone data | Volume of ejected ink at pixel pair |
|---|---|
| 000 | 0 ng |
| 001 | 6 ng (SD) |
| 010 | 12 ng (MD) |
| 011 | 22 ng (LD) |
| 100 | 40 ng (SD + MD + LD) |

Fig. 16(A) LARGE DOT/SMALL DOT PLACEMENT MISALIGNMENT

Fig. 16(B) LARGE DOT DRIVE SIGNAL

Fig. 16(C) SMALL DOT DRIVE SIGNAL (before correction)

Fig. 16(D) SMALL DOT DRIVE SIGNAL (after correction)

Fig. 18(A) DURING ADJUSTMENT

Fig. 18(B) DURING PRINTING

Fig.29

| 360 dpi: | odd | ... | 140 | ... | 255 | ... | 128 | ... |
|---|---|---|---|---|---|---|---|---|
| | even | ... | 100 | ... | 155 | ... | 0 | ... |

| 180 dpi mean values | ... | 120 | ... | 205 | ... | 64 | ... |
|---|---|---|---|---|---|---|---|

| 180 dpi maximum values | ... | 140 | ... | 255 | ... | 128 | ... |
|---|---|---|---|---|---|---|---|

Fig.34

| Single-color data (Original data) | Two-color data (Separated data) | |
|---|---|---|
| | L | D |
| 0 ⋮ 255 | 0 ⋮ 255 | 0 ⋮ 255 |

Fig.40

| 360 dpi | odd | ... | 140 | ... | 255 | ... | 128 | ... |
|---|---|---|---|---|---|---|---|---|
| | even | ... | 100 | ... | 155 | ... | 0 | ... |

| 180 dpi minimum values | ... | 100 | ... | 155 | ... | 0 | ... |
|---|---|---|---|---|---|---|

|  | (2n-1) Odd | 2n Even |  |
|---|---|---|---|
| ... | 140 | 100 | ... |
| ... | 255 | 155 | ... |
| ... | 128 | 0 | ... |
|  |  |  |  |

Fig.45

|  | n |  |
|---|---|---|
| ... | 120 | ... |
| ... | 205 | ... |
| ... | 64 | ... |
|  |  |  |

Fig. 52

| | S | S | S | S | M | M | M | M | M | L | L | L | L |
|---|---|---|---|---|---|---|---|---|---|---|---|---|---|
| | | S | S | M | L | | M | M | L | L | L | L | M | S |

S: Small
M: Medium
L: Large

Fig. 54

Mean values

| | S | S | S | M | M | S | S | M | M | L | M | M | L | L | M |

S: Small
M: Medium
L: Large

Fig.55

Upper pixel dot

|  | None | Small | Medium | Large |
|---|---|---|---|---|
| None | None | Small | Small | Medium |
| Small | Small | Small | Medium | Large |
| Medium | Small | Medium | Large | Large |
| Large | Medium | Large | Large | Large |

Lower pixel dot

Fig. 56

Table reference

| | S | S | S | M | L | | S | S | L | | M | L | | L | L |
|---|---|---|---|---|---|---|---|---|---|---|---|---|---|---|---|

6    9    16

S: Small
M: Medium
L: Large

Fig. 57

PRINTING WITH MULTIPLE PIXELS AS UNIT OF GRADATION REPRODUCTION

BACKGROUND OF THE INVENTION

1. Field of the Invention

The present invention relates to a printing technique for printing by means of ejecting ink droplets.

2. Description of the Related Art

Ink jet printers, which eject ink from a head, have come to enjoy widespread use as computer output devices in recent years. While conventional ink-jet type printers can only reproduce "bilevel" (i.e. On or Off) pixels, more recently there have been developed multilevel printers that can reproduce individual pixels at three or more gradation levels. Multilevel pixels can be reproduced, for example, by adjusting the size of the dot produced at each pixel location. To produce dots having a plurality of different sizes, a drive signal having a complex waveform for selectively ejecting different volumes of ink is used. The volume of ink ejected at each pixel location is adjusted by shaping the drive signal.

However, where a single type of drive signal is used, the volume of ink ejected per pixel can only be varied by about three levels at most. This imposes limitations on local gradation reproduction for each pixel. In other words, there is a rather small degree of freedom as regards local gradation reproduction through adjustment of the volume of ink ejected for each pixel. If the degree of freedom in local gradation reproduction could be increased, it would be possible to achieve higher print quality and faster printing. Accordingly, for some time there has been a need for a technique to increase the degree of freedom in local gradation reproduction.

SUMMARY OF THE INVENTION

Accordingly, an object of the present invention is to provide increased degree of freedom in local gradation reproduction, thereby attaining higher print quality or faster printing speed.

In order to attain at least part of the above and other related objects of the present invention, there is provided a printing device for printing on a print medium while performing main scanning. The printing device comprises: a print head having a plurality of nozzles ejecting a same given ink and a plurality of eject drive elements for causing droplets of ink to be ejected from the plurality of nozzles; a main scan drive section for performing main scanning by means of moving the print medium and/or the print head; a sub scan drive section performing sub scanning by means of moving the print medium and/or the print head; a head drive section for providing a drive signal to each eject drive element in response to a print signal; and a controller for controlling the sections; the controller having a first print mode. The gradation reproduction with the same ink is performed by: (i) designating as a unit of gradation reproduction a group of N contiguous pixels arranged in a selected one of a main scan direction and a sub scan direction where N is an integer of at lease 2; (ii) setting a volume of ink ejectable onto at least one pixel location of the N pixels to a value different from a volume of ink ejectable onto other pixel locations; and (iii) controlling the volume of ink at each pixel location of the N pixels to reproduce M gradation levels for each group of the N pixels where M is an integer of at least N+2.

This printing device uses N contiguous pixels in a given direction as a unit for gradation reproduction to reproduce M ($M \geq 2$) gradation levels, thereby providing a high degree of freedom as to the volume of ink ejected onto the N pixels. The printing device can attain improved gradation reproduction accordingly.

The present invention is also directed to a dot placement adjustment method for the printing device. The method comprises the steps of: (a) printing a first test pattern including two dot types of different size such that the two dot types are recorded substantially arrayed in single columns in the sub scanning direction; (b) determining a relative correction value for placement in the main scanning direction for the two dot types with reference to the first test pattern; and (c) performing correction of relative position of the two dot types using the relative correction value during printing, while forming the two dot types at different pixel locations on a same main scan line.

According to this method, ink droplets containing mutually different volumes of ink are used to record a plurality of dot types having different size at different pixel locations in the main scanning direction, so that placement adjustment can be performed so as the adjust the positions of the dots in the main scanning direction.

The second embodiment of the present invention is premised on controlling a printing device equipped with a plurality of nozzles capable of performing high-resolution printing by ejecting individual ink drops onto each pixel. Low-resolution image data are generated based on high-resolution image data when the print control device outputs printing data to the printing device. The low-resolution image data are created by assuming that each group of high-resolution pixels adjacent to each other constitute one low-resolution pixel. The low-resolution image data are used to eject ink drops onto each high-resolution pixel.

Specifically, nozzles traditionally eject ink drops onto each high-resolution pixel according to high-resolution image data, but if the nozzle resolution, or the nozzle pitch, does not correspond to the high resolution, a plural scan passes are required to complete printing on each row of high-resolution pixels. The use of low-resolution image data in the second embodiment of the present invention, on the other hand, reduces the number of scan passes required to complete dot formation on each row of high-resolution pixels. For example, low-resolution image data is prepared to represent dot formation state for each low-resolution pixel which includes two high-resolution pixels. In this case, two neighboring nozzles will eject ink drops onto two neighboring high-resolution pixels according to the low-resolution image data for a single low-resolution pixel corresponding to the two high-resolution pixels.

The invention may take a number of different embodiments, examples being a printing method and printing device; a printing control method and printing control device; a method and device for correcting dot placement; a computer program for realizing the functions of these methods and devices; a storage medium storing such a computer program; a data signal containing the computer program, applied to a carrier wave; and so on.

These and other objects, features, aspects, and advantages of the present invention will become more apparent from the following detailed description of the preferred embodiments with the accompanying drawings.

BRIEF DESCRIPTION OF THE DRAWINGS

FIGS. 6(A)–6(G) are illustrative diagrams showing drive signal waveforms and dot formations used in the first example;

FIG. 8 is an illustrative diagram indicating volume of ejected ink for each pixel pair in Example 1;

FIGS. 11(A)–11(E) are illustrative diagrams depicting dot formation in a comparison example;

FIGS. 12(A)–12(G) are illustrative diagrams showing drive signal waveform and dot formation used in a second example;

FIG. 13 is an illustrative diagram showing volumes of ink ejected for each pixel pair in Example 2;

FIG. 14 is an illustrative diagram showing volumes of ink ejected for each pixel pair in a third example;

FIG. 29 is a diagram depicting the manner in which data vary in the resolution reduction routine;

FIG. 34 is a diagram depicting a reference table for the density separation routine;

FIG. 40 is a diagram depicting the manner in which data vary during the resolution reduction routine of the fourth modification;

FIG. 41 is a diagram depicting the nozzle arrangement for a case in which nozzle rows are arranged in a different manner;

FIG. 44 is a diagram depicting video data whose resolution has not yet been reduced;

FIG. 45 is a diagram depicting video data whose resolution has already been reduced;

FIG. 52 is a diagram depicting the correspondence relationship between the pixels and the dot sizes expressed by multilevel data;

FIG. 54 is a diagram depicting dot images in which a technique for calculating mean values is reflected;

FIG. 55 is a diagram depicting the specifics of a conversion table;

FIG. 56 is a diagram depicting dot images in which a routine for referencing the conversion table is reflected; and FIG. 57 is a diagram depicting dot images in which a routine for calculating logical sums for each digit is reflected.

DESCRIPTION OF THE PREFERRED EMBODIMENT

The embodiments of the invention is now described through examples, in the following order.

A. First Embodiment
  A-1. Overall device configuration
  A-2. First example
  A-3. Other examples
  A-4. Correcting dot placement
  A-5. Modifications
B. Second Embodiment
  B-1. Overview of the Second Embodiment
  B-2. System Hardware Structure
  B-3. Printer Hardware Structure
  B-4. Schematic Flow of Printing Routine
  B-5. Resolution Reduction Routine
  B-6. Density Separation
  B-7. Operation of Second Embodiment
  B-8. Summary
  B-9. Modifications The present invention is fully described in Japanese Patent Applications JP2001-141719, and JP2001-326189, the disclosure of which is hereby incorporated by reference for all purposes.

A. First Embodiment

A-1. Overall Device Configuration

Figure 1:
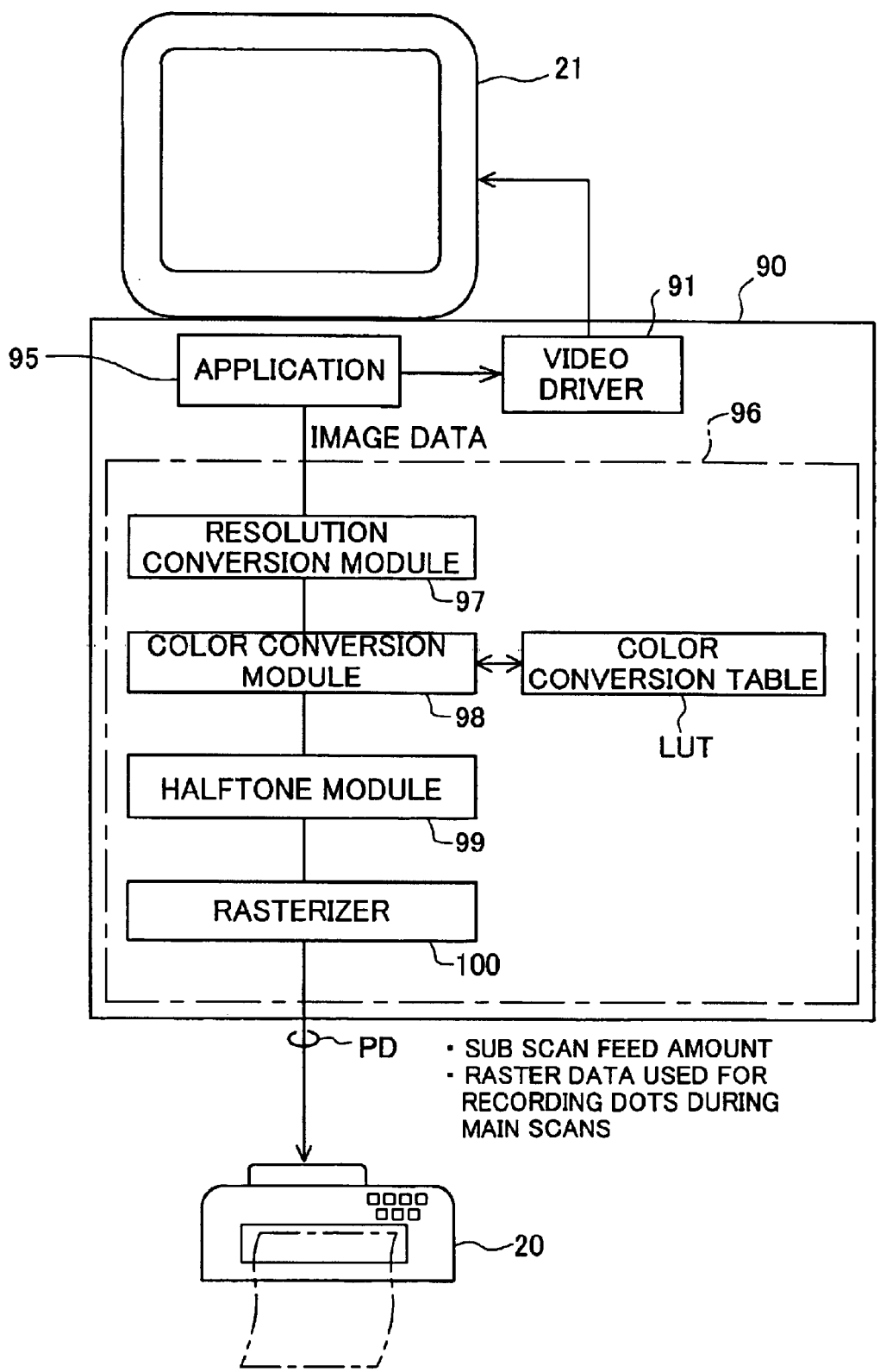
FIG. 1 is a block diagram showing the configuration of a printing system as the first embodiment of the invention.

FIG. 1 is a block diagram showing the configuration of a printing system as the first embodiment of the present invention. The printing system comprises a computer 90 and a color printer 20. The printing system can be termed a "printing device", broadly defined.

Computer 90 runs an application program 95 on a predetermined operating system. The operating system includes a video driver 91 and printer driver 96; the application program 95 send print data PD to printer 20 via the printer driver. The application program 95, which also performs functions such as image retouching, performs desired processes on an image to be processed, and also displays the image on a CRT 21 with the aid of the video driver 91.

When the application program 95 issues a print command, the printer driver 96 of computer 90 receives image data from the application program 95 and converts this into print data PD to be supplied to the printer 20. In the example depicted in FIG. 1, the printer driver 96 includes a resolution conversion module 97, a color conversion module 98, a halftone module 99, a rasterizer 100, and a color conversion lookup table LUT.

The resolution conversion module 97 converts the resolution of the color image data generated by the application program 95 into the proper print resolution. The resolution-converted image data is still image information consisting of the three color components RGB. The color conversion module 98 refers to the color conversion lookup table LUT to convert, for each pixel, RGB image data into multilevel data for the plurality of ink colors useable by the printer 20.

The color-converted multilevel data has, for example, 256 levels. The halftone module performs a "halftone" process to generate halftone image data. The halftone image data is lined up by rasterizer 100 in the order in which the data will be transmitted to the printer 20, and is output as final print data PD. The print data PD includes raster data that indicates dot formation state at each pixel, and sub-scan data that indicates sub-scan feed amounts.

The printer driver 96 corresponds to a program for performing the function of generating print data PD. The program for performing the function of printer driver 96 is provided stored on a computer-readable medium. Typical storage media include flexible disks; CD-ROM; magnetooptical disks; IC cards; ROM cartridges; punchcards; printed matter imprinted with symbols such as a bar code; computer internal storage devices (e.g. RAM, ROM or other type of memory), and external storage devices.

The computer 90 equipped with a printer driver 96 functions as a printing control device, generating print data PD and providing this to the printer 20 for printing.

Figure 2:
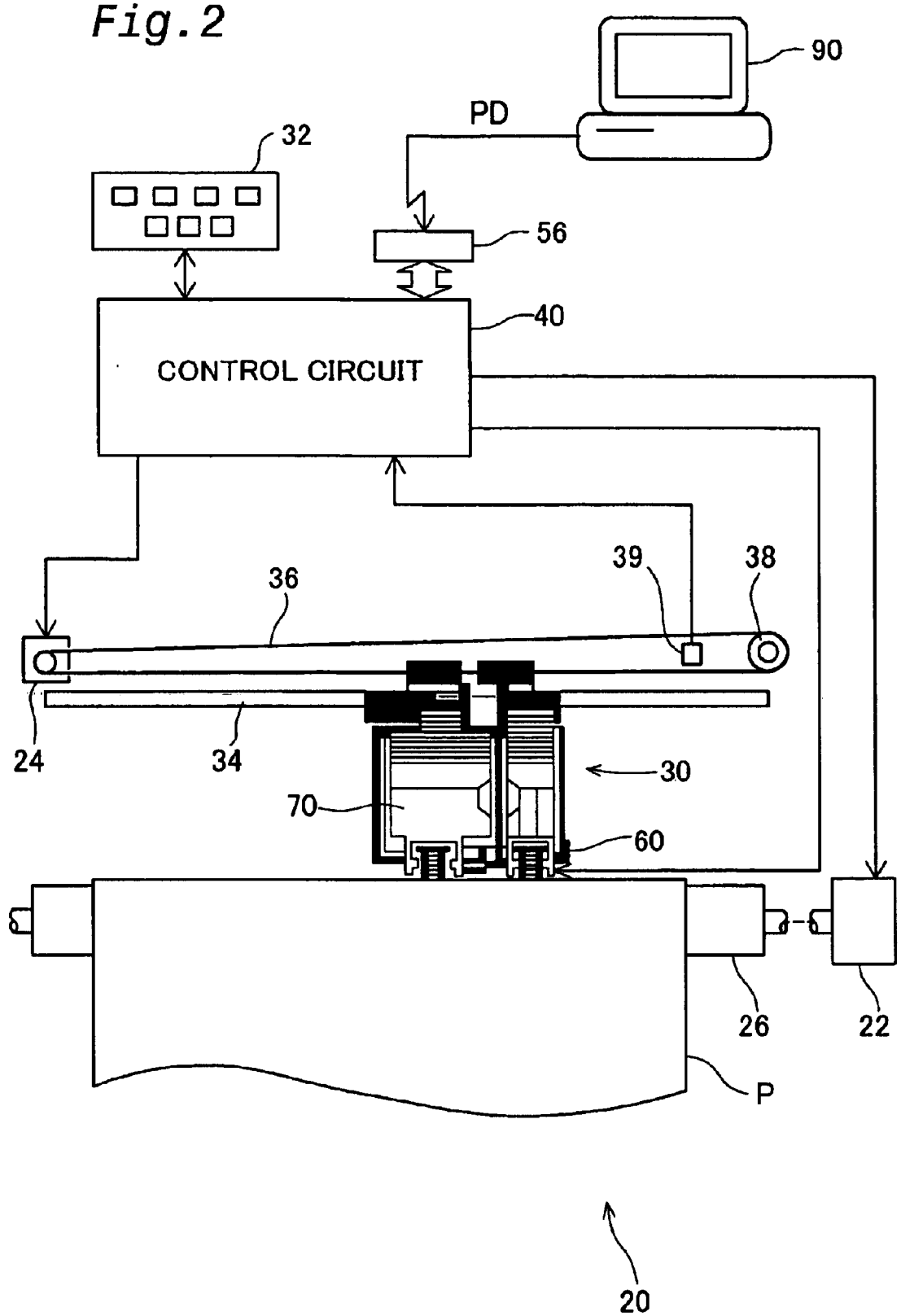
FIG. 2 is a simplified schematic illustration of a printer.

FIG. 2 is a simplified schematic illustration of the printer 20. Printer 20 comprises a sub scan feed mechanism for advancing printing paper P in the sub scanning direction by means of a paper feed motor 22; a main scan advance mechanism for reciprocating a carriage 30 in the axial direction of a platen 26 (i.e. main scanning direction) by means of a carriage motor 24; a head drive mechanism for driving a print head unit 60 carried on carriage 30, and controlling ink ejection and dot formation thereby; and a control circuit 40 for controlling various elements in the printer including the paper feed motor 22, carriage motor 24, print head unit 60 and a control panel 32. The control circuit 40 is connected to computer 90 via a connector 56.

The mechanism for advancing print paper P in the sub scanning direction comprises a gear train (not shown) for transmitting rotation of the paper feed motor 22 to the platen 26 and paper feed rollers (not shown). The mechanism for reciprocating the carriage 30 comprises a slide rail 34 extending parallel to the axis of platen 26, for slidably supporting the carriage 30; a pulley 38 around which is passed an endless belt 36 that extends to the carriage motor 24; and a position sensor 39 for sensing the original position of the carriage 30.

Figure 3:
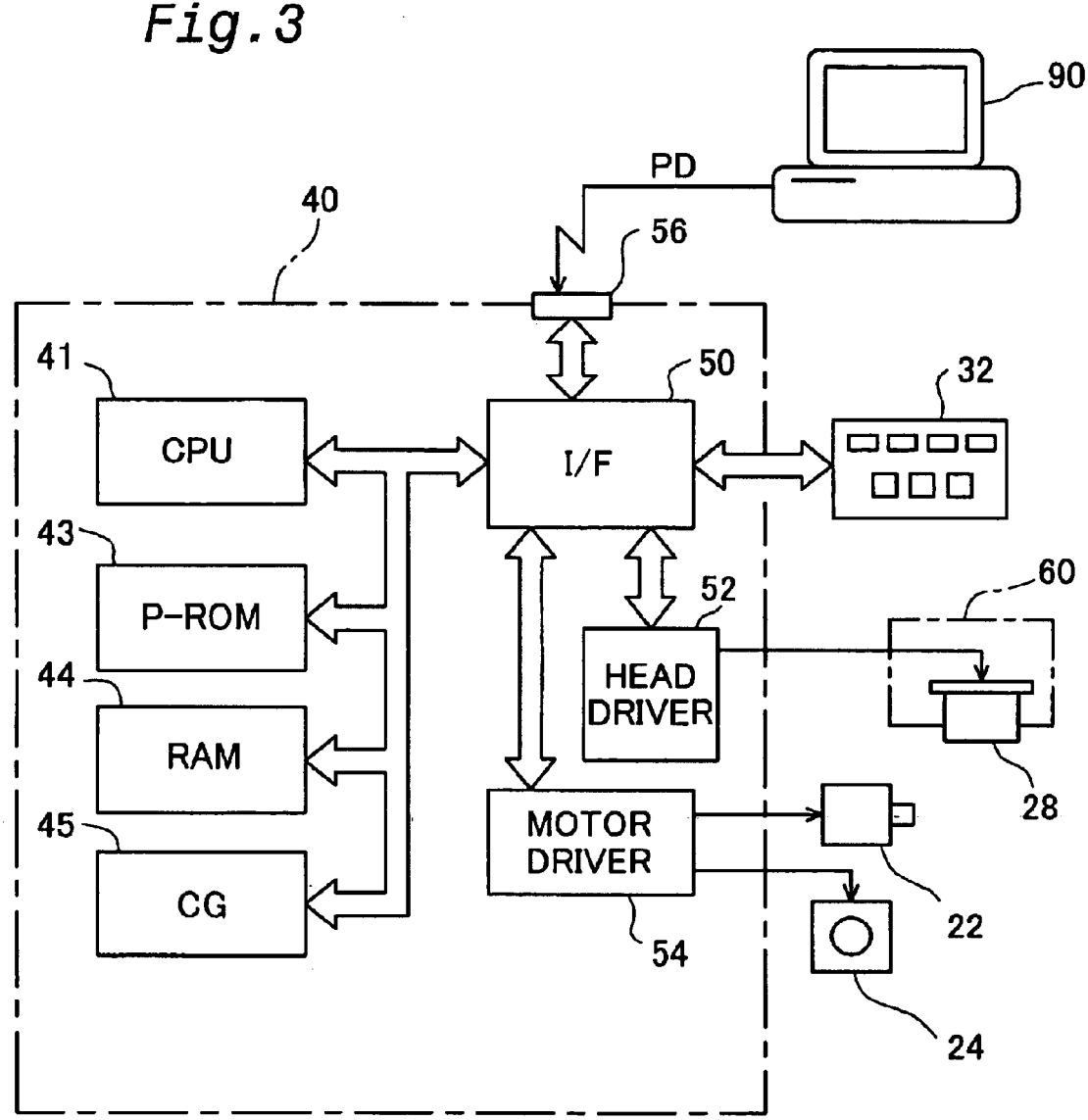
FIG. 3 is a block diagram of the control circuit 40 in printer 20.

FIG. 3 is a block diagram depicting the arrangement of printer 20, focusing on the control circuit 40. The control circuit 40 is designed as an arithmetic/logic circuit comprising a CPU 41, programmable ROM (PROM) 43, RAM 44, and a character generator (CG) for storing a character dot matrix. The control circuit 40 additionally comprises an I/F circuit 50 dedicated exclusively to interface with external motors, etc.; a head driver circuit 52 connected to the I/F circuit 50, for driving the print head unit 60 to eject ink; and a motor drive circuit 54 for driving the paper feed motor 22 and carriage motor 24. The I/F circuit 50 includes a parallel interface circuit allowing it to receive print data PD supplied by computer 90 via connector 56. The printer 20 performs printing in accordance with this print data PD. RAM 44 functions as buffer memory for temporary storage of raster data.

CPU 41 functions as a "control section" in the narrow sense, for controlling the printing operation. CPU 41, PROM 43 and RAM in control circuit 40, together with computer 90, perform control of various kinds for the printing operation, and can all be included in the "control section" in the broad sense.

The print head unit 60 has a print head 28 and accommodates ink cartridges 70 (FIG. 2). The print head unit 60 is detachably installed in printer 20 as a component thereof. That is, to replace the print head 28, the entire print head unit 60 is replaced.

Figure 4:
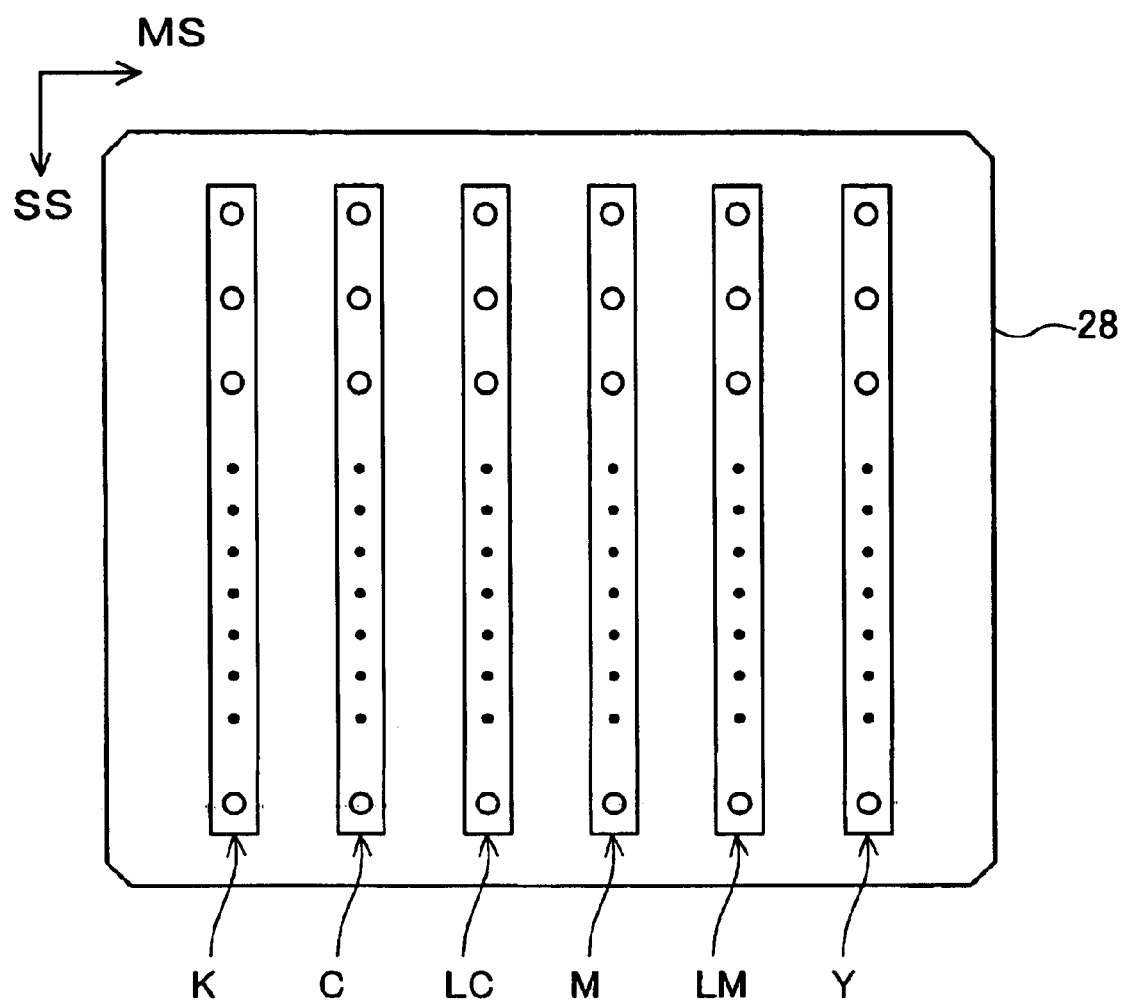
FIG. 4 is an illustrative diagram showing nozzle arrangement on the bottom face of print head 28.

FIG. 4 is an illustrative diagram showing nozzle arrangement on the bottom face of print head 28. On the bottom face of print head 28 are arranged a nozzle group for ejecting black ink K, a nozzle group for ejecting dark cyan ink C, a nozzle group for ejecting light cyan ink LC, a nozzle group for ejecting dark magenta ink M, a nozzle group for ejecting light magenta ink LM, and a nozzle group for ejecting yellow ink Y. Each nozzle is provided with an eject drive element consisting of a piezoelectric element (not shown).

Figure 5:
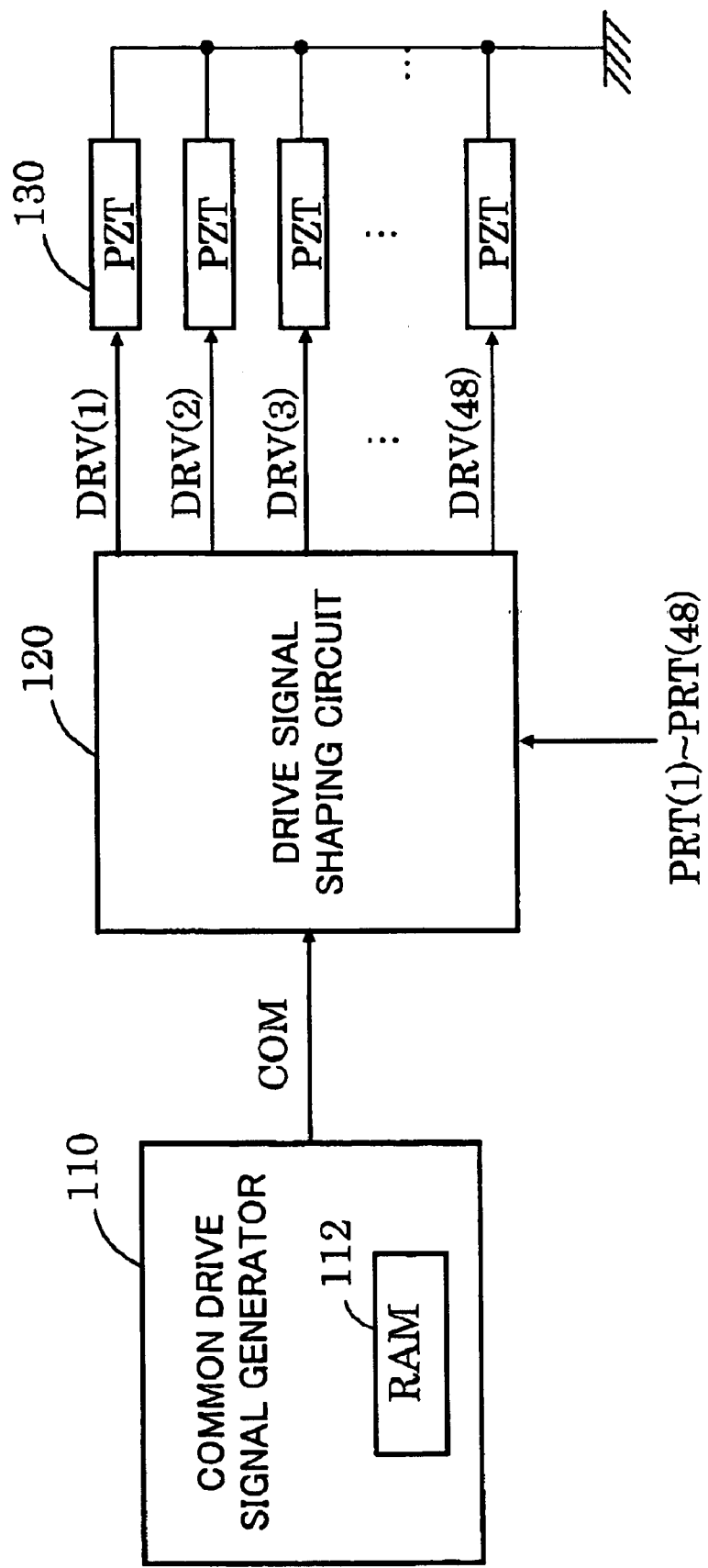
FIG. 5 is a block diagram of the internal arrangement of the head driver circuit 52 (FIG. 2)

FIG. 5 is a block diagram of the internal arrangement of the head driver circuit 52 (FIG. 3). Head driver circuit 52 comprises a common drive signal generator circuit 110 and a drive signal shaping circuit 120.

The common drive signal generator circuit 110 has a RAM 112 for storing waveform data that indicates the waveform of the common drive signal; this waveform data is subjected to D/A conversion to give a common drive signal COM having a desired waveform. The signal shaping circuit 120 comprises a plurality of analog switches (not shown) for masking part or all of the common drive signal COM according to a serial print signal PRT values in order to generate drive signals DRV for individual nozzles. The shaped drive signals DRV are presented to the piezoelectric elements 130 which constitute the drive elements for the nozzles. In the example depicted in FIG. 5, drive signals DRV(1)-DRV(48) for 48 piezoelectric elements 130 are generated according to print signals PRT(1)-PRT(48).

"Common drive signal" herein refers to a drive signal used in common by a plurality of nozzles. In this example, all of the six nozzle groups shown in FIG. 4 are supplied with the same common drive signal COM. Alternatively, nozzle groups can be supplied with different common drive signals COM.

The common drive signal generator circuit 110 is capable of selecting and generating, for each main scan, one of a number of common drive signal types having mutually different waveforms. Dot formation in the examples described hereinbelow utilizes the functions of such a common drive signal generator circuit 110.

A-2. FIRST EXAMPLE

FIGS. 6(A)–6(G) are illustrative diagrams showing drive signal waveforms and dot formations used in the first example. FIGS. 6(A) and 6(B) depict a first common drive signal COM1 for producing small dots SD, and the resultant small dot formation. Each rectangle in FIG. 6(B) represents one pixel; here, four contiguous pixel positions P1–P4 are rendered on the main scan line. In this print mode the print resolution in the main scan direction is 360 dpi. The first common drive signal COM1 generates a small dot pulse W1 at every other pixel. As shown in FIG. 6(B), when producing a small dot DS, pulse W1 is applied to a piezoelectric element 130 (FIG. 5). When not producing a small dot SD, on the other hand, pulse W1 is masked by the drive signal shaping circuit 120 (FIG. 5). In the example shown in FIG. 6(B) small dots SD are produced at odd-numbered pixel locations P1, P3. Ink volume for small dots SD is 10 ng.

The reason for only generating a small dot pulse W1 at every other pixel is that when main scanning speed, or carriage speed, is set to a high level to enhance printing speed, it is physically difficult to eject ink at every pixel location. A more detailed explanation follows. Ink ejection frequency is dependent not only on drive signal frequency, but also the mechanical natural frequency of the nozzle portion. Where main scanning speed is set to a high level to enhance printing speed, pixel frequency on main scan lines during main scans will become higher than the upper limit of ink ejection frequency. In this case it will not be possible to eject ink at every pixel, so instead ink is ejected at every other pixel.

There is also that fact that, in terms of improving print quality, it is preferable to complete dot formation on each main scan line in several main scan passes, rather than completing the dot formation in a single main scan pass. The reason is that where dot placement is misaligned due to nozzle production errors, misaligned dot placement is less noticeable where several nozzles are used, versus using a single nozzle to complete dot formation on each main scan line.

As will be apparent from the preceding explanation, by ejecting ink onto every other pixel on a main scan line during each main scan pass, and completing dot formation on each main scan line over several main scan passes, both printing speed and print quality can be improved.

FIGS. 6(C) and 6(D) depict a second common drive signal COM2 for producing medium dots MD, and the resultant medium dot MD formation. The second common drive signal COM2 generates a medium dot pulse W2 at every other pixel. However, medium dots MD are produced at even-numbered pixel positions P2, P4. Ink volume for medium dots MD is 20 ng.

FIGS. 6(E) and 6(F) depict a third common drive signal COM3 for producing large dots LD, and the resultant large dot LD formation. The third common drive signal COM3 generates a large dot pulse W3 at every other pixel. Large dots LD are produced at even-numbered pixel positions P2, P4. Ink volume for large dots LD is 30 ng.

Droplets of the small dot SD shown in FIG. 6(B), the medium dot MD shown in FIG. 6(D), and the large dot LD shown in FIG. 6(F) are ejected onto the same given main scan line. The first main scan pass for ejecting small ink droplets is referred to as "Pass 1"; the second main scan pass for ejecting medium ink droplets as "Pass 2", and the third main scan pass for ejecting large ink droplets as "Pass 3". At least one sub scan feed is performed between Pass 1 and Pass 2, and between Pass 2 and Pass 3. Accordingly, different nozzles service the same main scan line in the course of the three passes. However, each pass can be performed by the same nozzle, by omitting the sub scan feed.

For a single given main scan line, only one main scan pass is performed to eject small ink droplets for producing small dots SD. Accordingly, small dots SD are only produced at a ratio of 1 per 2 pixels. These two pixels are hereinafter referred to as a "pixel pair". In the example illustrated in FIGS. 6(A)–6(G), pixel positions P1 and P2 make up a pixel pair. Pixel positions P3 and P4 also make up a pixel pair. Small dots SD are produced at only one predetermined pixel position in any given pixel pair. Similarly, each of medium dots MD and large dots LD is produced at only one predetermined pixel position in any given pixel pair.

Figure 7:
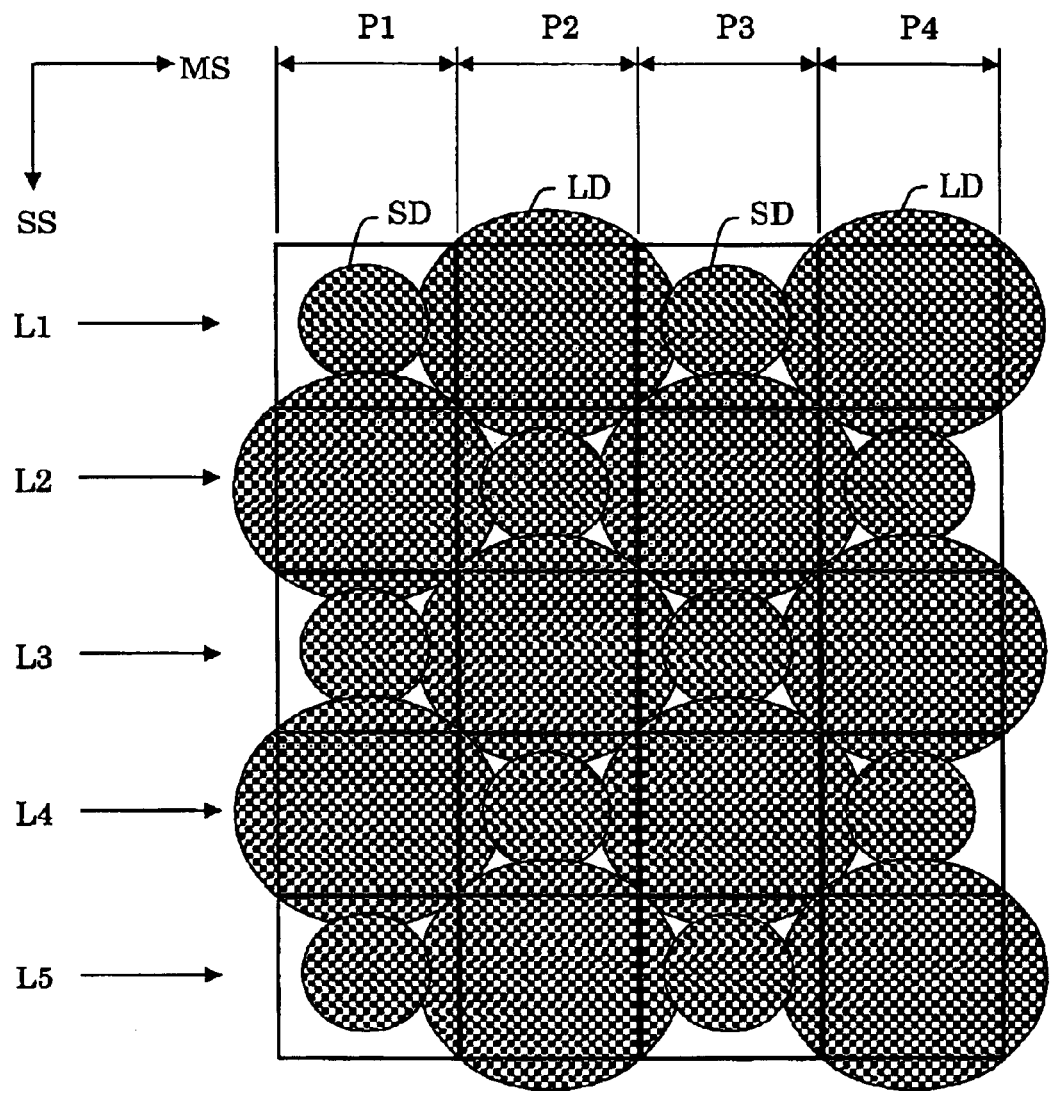
FIG. 7 is an illustrative diagram of a solid image reproduced with small dots SD and large dots LD.

FIG. 6(G) shows small dots SD produced at odd-numbered pixel locations P1 and P3, and large dots LD produced at even-numbered pixel locations P2 and P4. Here, a total of 40 ng of ink has been ejected onto the first pixel pair P1, P2, and a total of 40 ng of ink has been ejected onto the second pixel pair P3, P4 as well. The small dots SD are produced during Pass 1, and the large dots LD during Pass 3.

Where a total of 40 ng of ink is ejected onto pixel pairs over a wide area as shown in FIG. 6(G), a solid image is reproduced. FIG. 7 illustrates a solid image reproduced with small dots SD and large dots LD. On odd-numbered main scan lines L1, L3 and L5, small dots SD are produced at odd-numbered pixel locations P1, P3, and large dots LD at even-numbered pixel locations P2, P4. On even-numbered main scan lines L2, L4, on the other hand, large dots LD are produced at odd-numbered pixel locations P1, P3, and small dots SD at even-numbered pixel locations P2, P4. In other words, small dots SD and large dots LD are produced alternately in both the main scanning direction MS and sub scanning direction SS, as a result reproducing a solid image devoid of white background areas. For convenience of illustration, spaces appear to remain between small dots SD and large dots LD in FIG. 7, but in actual practice spaces will not be present, due to diffusion of the ink.

The dot array shown in FIG. 7 is produced by arraying pixel pairs in opposite directions on adjacent main scan lines. Using this array provides the advantage of ease of reproduction of solid images. An additional advantage is substantially uniform dot placement when reproducing uniformly printed images, thereby improving image quality.

The ink droplets for producing small dots SD contain a volume of ink capable of reproducing a solid image in 720 dpi resolution print mode. By using a volume of ink capable of reproducing a solid image in 720 dpi print mode (high quality print mode) in the 360 dpi print mode (high speed print mode) shown in FIGS. 6(A)–6(G) as well, the design of the head driver circuit 52 (FIG. 5) can be simplified. In particular the amount of waveform data in RAM 112 in the common drive signal generator circuit 100 can be reduced.

FIG. 8 indicates volume of ejected ink for each pixel pair in Example 1. Volume of ink droplets ejected in Pass 1–3 and pixel locations onto which ink droplets are ejected are indicated in the upper table in FIG. 8. In the lower table are indicated 3-bit halftone data values and the total volume of ink ejected in association with particular halftone data. In this example it will be understood that five gradation levels can be reproduced for each pixel pair.

Halftone data refers herein to data produced by the halftone process in the halftone module 99 (FIG. 1), the data indicating dot formation state for each ink color component. In other words the halftone data represents local gradation level using pixel pairs as single units. Halftone data using pixel pairs as single units shall hereinafter be referred to as "pixel pair halftone data." Halftone data using single pixels as single units, on the other hand, will be referred to as "single pixel halftone data."

"Local gradation level" herein refers to a gradation level reproduced in a small local area ranging from one to several pixels. In contradistinction thereto, gradation level reproduced in a wide area that includes several tens to several hundred pixels is termed "wide area gradation level" or "image gradation level."

Figure 9:
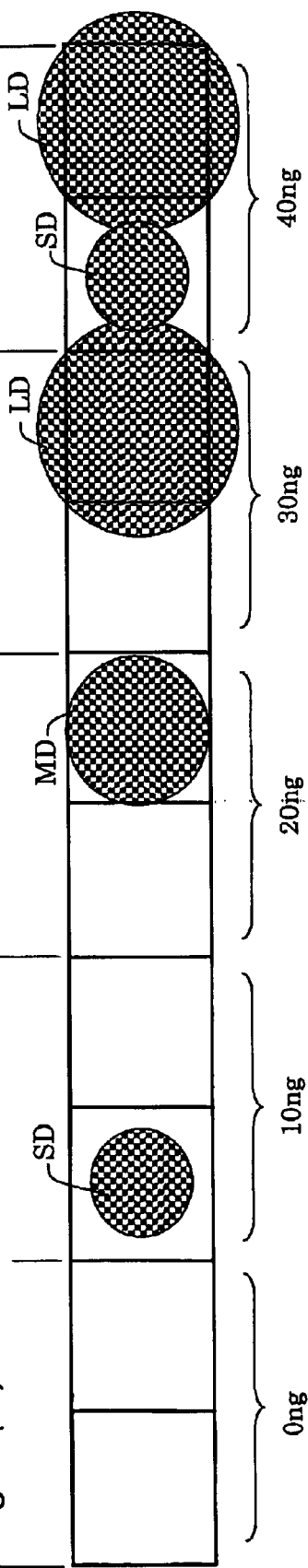
FIGS. 9(A)–9(C) are illustrative diagrams showing relationships among pixel pair halftone data, single pixel halftone data, and dot formation.

FIGS. 9(A)–9(C) are illustrative diagrams showing relationships among pixel pair halftone data, single pixel halftone data, and dot formation. In this example, dot formation states in pixel pairs, going in order from the left in FIG. 9(C), are no dot; small dot SD only; medium dot MD only; large dot LD only; and small dot SD plus large dot LD. The pixel pair halftone data indicated in FIG. 9(A) corresponds to these dot formation states. Pixel pair halftone data is converted into three kinds of single pixel halftone data, given in FIG. 9(B). Single pixel halftone data consists of 1-bit data indicating On/Off status for each single pixel. Single pixel halftone data is supplied to the drive signal shaping circuit 120 as a serial print signal PRT (FIG. 5) for each main scan pass.

Conversion of pixel pair halftone data to single pixel halftone data is performed by the CPU 41 in the control circuit 40 of printer 20. Alternatively, the conversion of halftone data may be performed by a dedicated hardware circuit, or in printer driver 96 (FIG. 1). Performing the conversion of halftone data in printer 20 provides the advantage of less data transfer from the computer 90 to the printer 20.

Figure 10:
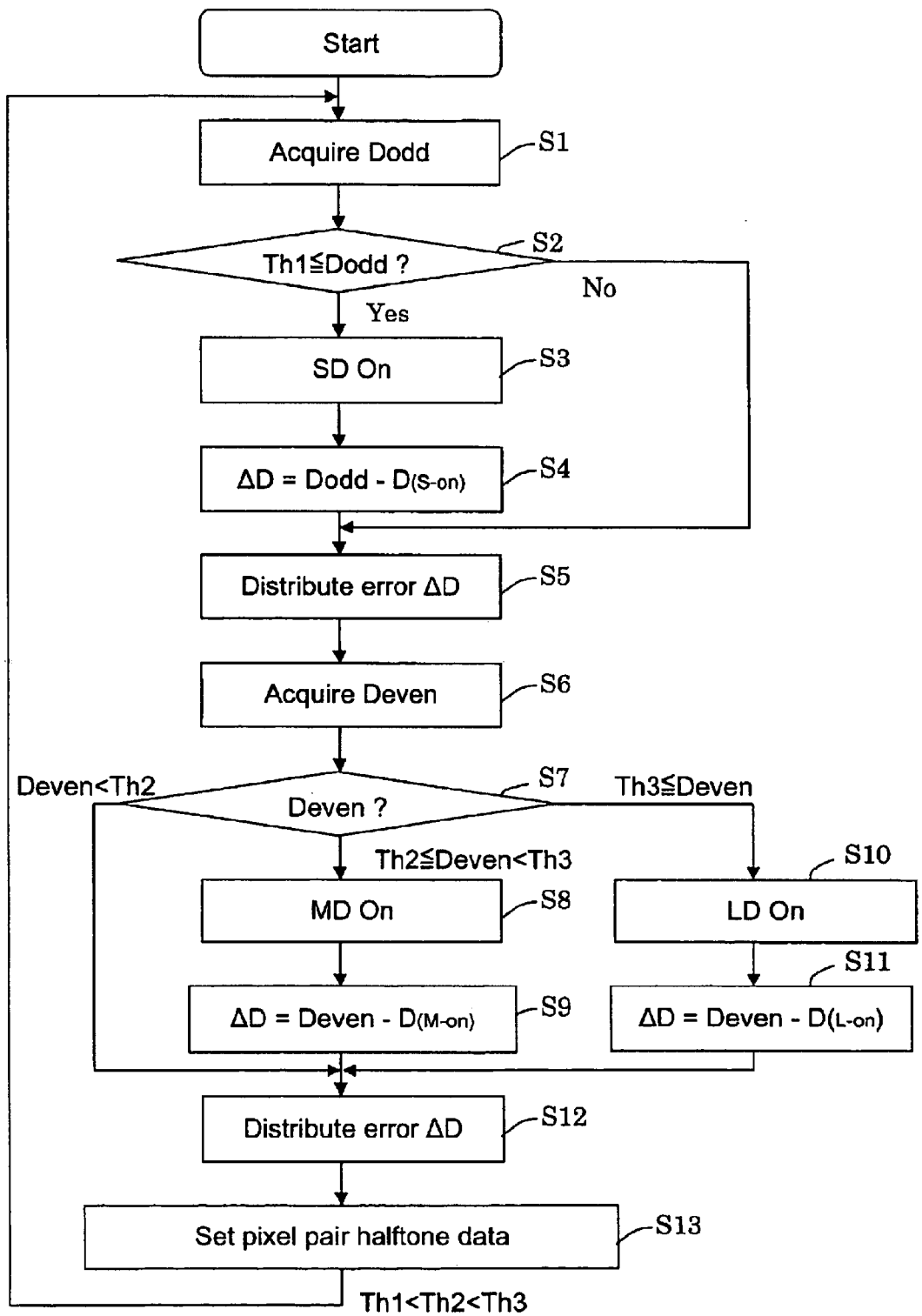
FIG. 10 is a flow chart of a halftone process employing error diffusion.

FIG. 10 is a flow chart of a halftone process employing error diffusion. This process is executed by the halftone module 99 (FIG. 1) to perform a halftone process on the odd-numbered main scan lines K1, K3, L5 in FIG. 7.

In Step S1, a pixel value for an odd-numbered pixel location Dodd is acquired. This pixel value Dodd indicates a gradation level of a specific ink color, and assumes, for example, an 8-bit value in the range of 0–255. In Step S2 the pixel value Dodd is compared with a first threshold value Th1 for small dots. If the pixel value Dodd is equal to or greater than the first threshold value Th1, in Step S3 small dot SD formation at the odd-numbered pixel location is turned On. In Step S4, a gradation level $D_{(S\text{-}on)}$ corresponding to On status for a small dot SD is subtracted from the pixel value Dodd to calculate error ΔD. If, on the other hand, the pixel value Dodd is less than the first threshold value Th1, the pixel value Dodd is used as-is as difference ΔD. In Step S5 error ΔD is distributed among neighboring pixels.

In Step S6 a pixel value for the next even-numbered pixel location Deven is acquired. In Step S7 the pixel value Deven is compared with a second threshold value Th2 for medium dots and a third threshold value Th3 for large dots. If the pixel value Deven is less than the second threshold value Th2, the pixel value Deven is used as-is as error ΔD. If, on the other hand, the pixel value Deven is equal to or greater than the second threshold value Th2 and less than the third threshold value Th3, medium dot MD formation status for the even-numbered pixel location is set to On (Step S8). A gradation level $D_{(M\text{-}on)}$ corresponding to On status for a medium dot MD is subtracted from the pixel value Deven to calculate error ΔD (Step S9). If, on the other hand, Deven is equal to or greater than the third threshold value Th3, large dot LD formation status for the even-numbered pixel location is set to On (Step S10). A gradation level $D_{(L\text{-}on)}$ corresponding to On status for a large dot LD is subtracted from the pixel value Deven to calculate error ΔD (Step S11). In Step S12 error ΔD is distributed among neighboring pixels.

Once dot formation status at odd and even pixel locations that make up the pixel pairs has been set in this way, in Step S13, halftone data for the pixel pairs is set according to the relation indicated in FIGS. 9(A) and 9(B).

In the halftone process for the even-numbered main scan lines L2, L4 in FIG. 7, the even-numbered pixel location pixel value Deven is processed first, followed by processing of the odd-numbered pixel location pixel value Dodd. Halftone data is then set for the pixel pairs made up of the two pixels.

Methods other than error diffusion may be also used for the halftone process. In the example illustrated in FIG. 10, after performing a halftone process for each single pixel, halftone data is obtained for each pixel pair, but instead a halftone process can be performed directly for each pixel pair. However, obtaining halftone data for each pixel pair after first performing a halftone process for each single pixel, as in the example illustrated in FIG. 10, will give more faithful reproduction of image gradation level.

The main features of Example 1 are as follows.

(Feature 1) The unit for local gradation reproduction is a pixel pair.
(Feature 2) Ink droplets are overstruck at one of the two pixel locations that make up a pixel pair.
(Feature 3) In a single main scan pass, ink droplets are ejected only to intermittent pixel locations on the main scan line.
(Feature 4) In a single main scan pass, only droplets of a given volume of ink, predetermined for each main scan pass, are ejected.
(Feature 5) Ink droplets are ejected substantially onto the center of either one of the two pixel locations that make up a pixel pair.

Feature 1 means that different volumes of ink can be ejected onto each of the two pixel locations that make up a pixel pair. In a conventional printing device, on the other hand, the single pixel is the basic unit of local gradation reproduction, so only a same given volume of ink can be ejected at each pixel. Feature 1 increases the number of gradation levels that can be reproduced, and enables the use of smaller dots than conventional printing methods, thereby reducing granularity in printed images. Feature 2 has the effect of increasing the number of gradation levels that can be reproduced in pixel pairs. Feature 3 is a limitation imposed by the need to increase main scanning speed, discussed previously. Feature 4 has the effect of facilitating control of ink ejection (in particular generation of the common drive signal). Feature 5 has the effect, for example, of facilitating alignment of dot placement in the main scanning direction during the forward pass and return pass in bi-directional printing, making it possible to improve image quality.

The above features of Example 1 make it possible to reproduce five gradation levels—ranging from paper white (no dot) to solid—by performing three main scan passes over each main scan line. It is not necessary to have all of the above features; embodiments having only some of Features 1–5 are possible as well.

FIGS. 11(A)–11(E) are illustrative diagrams depicting dot formation in a comparison example. The Comparative Example differs from Example 1 in that all pixels have the same gradation level reproduction.

Ink droplets are ejected onto every other pixel in each main scan pass, as in Example 1. Specifically, in Pass 1 very small dots VSD (5 ng) are produced at odd-numbered pixel locations, and in Pass 2 very small dots VSD are produced at even-numbered pixel locations. In Pass 3 small dots SD (10 ng) are produced at odd-numbered pixel locations, and in Pass 4 small dots SD are produced at even-numbered pixel locations. As shown in FIG. 11(E) there are four possible levels of ejected ink volume per pixel: 0 ng, 5 ng, 10 ng and 15 ng. That is, there are four possible gradation levels reproducible locally in this Comparative Example. If it were necessary, in order to produce a solid image, for the volume of ejected ink per pixel to be 20 ng, an additional two main scan passes are required.

Since in this Comparative Example four gradation levels are reproduced for each pixel, four or more passes are required over a single main scan line. In Example 1 depicted in FIGS. 6(A)–6(G), five gradation levels can be reproduced with only three passes over a single main scan line. The principal reason for this is the use of pixel pairs as single units for gradation reproduction, so that equivalent or greater gradation reproduction is possible with fewer passes than in the Comparative Example. Printing speed is typically inversely proportional to the number of passes, so in Example 1 print speed will be faster than in the Comparative Example. Moreover, Example 1 has equivalent or greater gradation reproduction than the Comparative Example.

Example 1 also affords a greater degree of freedom in certain points than does the Comparative Example. Specifically, with respect to the volume of ink ejected in each pass, the pixel locations targeted for ink ejection during each pass (e.g. either even- or odd-numbered pixel locations), and the number of passes needed to complete dot formation on a single main scan line. Example 1 affords a greater degree of freedom in these points than does the Comparative Example. In other words, Example 1 has the advantage of a high degree of freedom in local gradation level reproduction.

A-3. OTHER EXAMPLES

FIGS. 12(A)–12(G) are illustrative diagrams showing drive signal waveform and dot formation used in a second example. In Example 2, small dots SD (10 ng) are produced at odd-numbered pixel locations during Pass 1 (FIGS. 12(A), 12(B)). During Pass 2, small dots SD are produced at even-numbered pixel locations (FIGS. 12(C), 12(D)). During Pass 3, medium dots MD (20 ng) are produced at even-numbered pixel locations (FIGS. 12(E), 12(F)).

FIG. 12(G) shows ink droplets for small dot SD ejected onto the four pixel positions P1–P4, and those for medium dot MD ejected onto the even-numbered pixel positions P2, P4. 40 ng of ink is ejected onto the first pixel pair P1, P2 and onto the second pixel pair P3, P4.

As will be apparent from comparison of FIGS. 6(A)–6(G) with FIGS. 12(A)–12(G), while mutually different volumes of ink are ejected during three passes in Example 1, in Example 2 the volume of ink ejected during Pass 1 and Pass 2 are the same. Where the same volume of ink is ejected during some of a plurality of main scan passes over a single main scan line, it is nevertheless possible to reproduce the same number of gradation levels as in Example 1, using the same number of passes. It will be apparent that this affords a high degree of freedom in local gradation reproduction using pixel pairs.

FIG. 13 shows volumes of ink ejected for each pixel pair in Example 2. As in Example 1, in Example 2 five gradation levels can be reproduced at each pixel pair.

FIG. 14 shows volumes of ink ejected for each pixel pair in a third example. In Example 3, small dots SD (6 ng) are produced at odd-numbered pixel locations during Pass 1, medium dots MD (12 ng) are produced at even-numbered pixel locations during Pass 2, and large dots LD (22 ng) are produced at odd-numbered pixel locations during Pass 3. As will be apparent from the lower table in FIG. 14, in Example 3 ejected ink volumes of 0 ng, 6 ng, 12, ng, 22 ng and 40 ng per pixel pair are possible. In Example 3, as in Example 1, there are five possible gradation levels reproducible at each pixel pair. A volume of ink needed for solid image reproduction (40 ng per pixel pair) can be ejected as well. The waveform of the common drive signal used in Example 3 is not shown in the figure.

Figure 15:
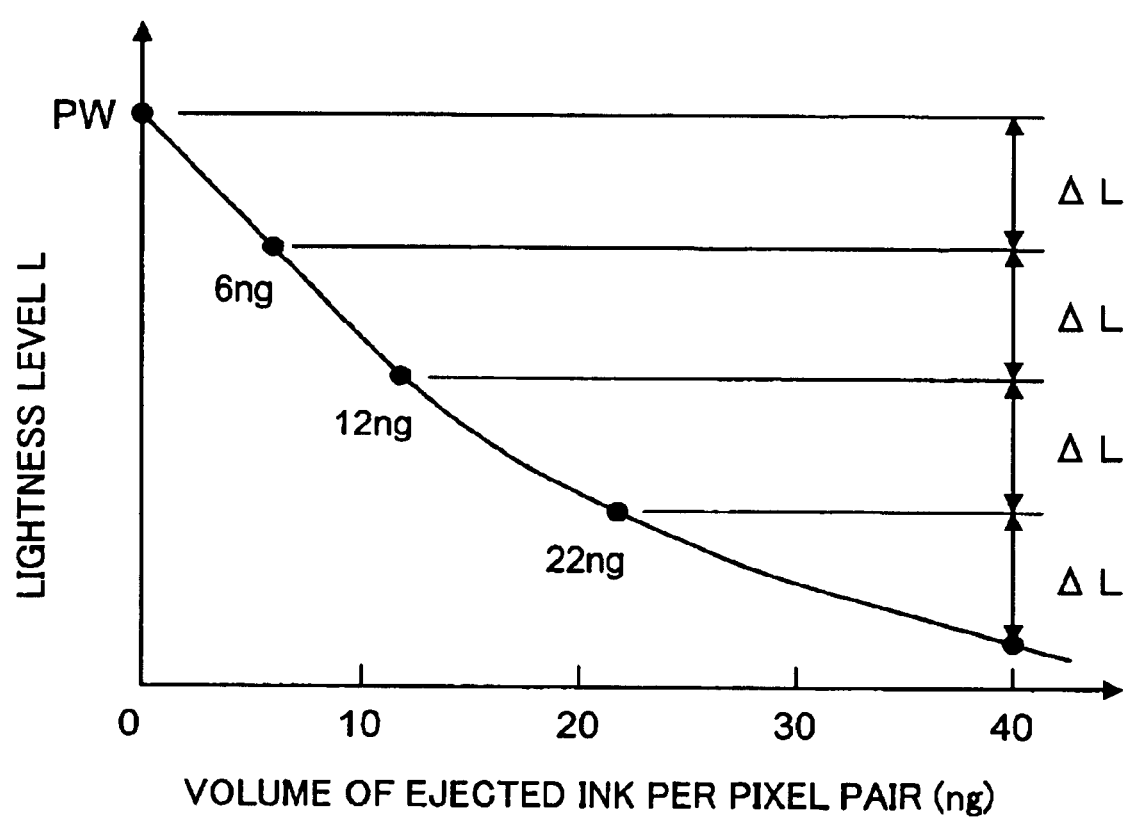
FIG. 15 is a graph of the relationship of volume of ejected ink per pixel pair and image lightness level L in Example 3.

FIG. 15 is a graph of the relationship of volume of ejected ink per pixel pair and image lightness level L in Example 3. The five gradation levels reproducible locally in Example 3 correspond to the five ink volumes: 0 ng, 6 ng, 12, ng, 22 ng and 40 ng. Lightness at 0 ng ejected volume is that of the print medium per se, and is termed "paper white." As will be apparent from the graph, in Example 3 the lightness levels L of the five gradation levels reproducible by pixel pairs are set to substantially equal intervals apart. Setting equal gradation level intervals like this has the advantage of enabling smooth gradation reproduction for improved image quality. As used herein "lightness substantially equal intervals apart" means that the lightness interval $\Delta L$ is within the range of average value ±20%. A more preferable definition of "lightness substantially equal intervals apart" is that the lightness interval $\Delta L$ is within the range of average value ±10%.

Examples 2 and 3 have the same five features explained with reference to Example 1. Further, Examples 2 and 3, like Example 1, have the advantage of being able to reproduce the same or more number of gradation levels as the Comparative Example, with fewer passes than the Comparative Example. Another advantage is a high degree of freedom in local gradation reproduction.

A-4. Correcting Dot Placement

Figure 16:
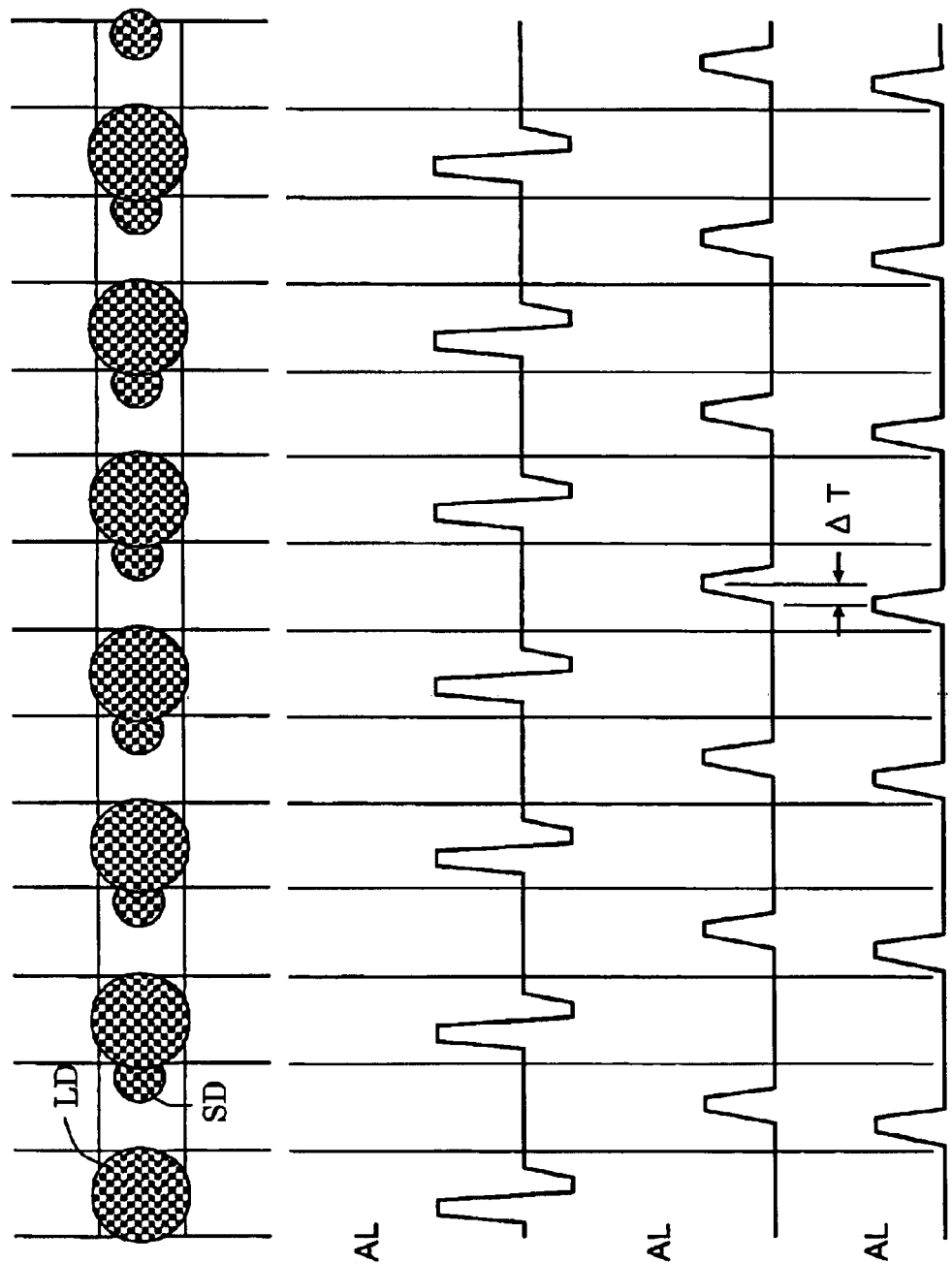
FIGS. 16(A)–16(D) are illustrative diagrams showing misalignment in relative placement of large dots and small dots.

In the preceding examples it has been assumed that each dot is correctly produced in the center of the pixel; in actual practice, however, there is a certain degree of misalignment in relative placement of dots of different sizes in the main scanning direction. FIG. 16(A) shows large dots LD and small dots SD which are misaligned with respect to their correct relative placement. FIG. 16(A) shows a grid dividing the pixels on the basis of large dot LD placement; it will be apparent that small dot SD placement deviates somewhat to the right from the pixel center. As shown in FIGS. 16(B) and 16(C) the waveforms of the respective drive signals are produced at regular timing. The reason for misaligned dot placement lies in nozzle manufacturing error, whereby ink droplet eject speed and eject direction varies somewhat among nozzles.

Where relative placement of large dots LD and small dots SD is misaligned in this way, the timing for production of the small dot drive signal may be corrected using a suitable correction value ΔT, as shown in FIG. 16(D). As described previously with reference to FIGS. 6(A)–6(G), dots of different size are produced in different passes. Thus, by adjusting the timing for production of the drive signal during the pass in which small dots SD are produced, for example, it is possible to reduce misalignment of relative placement.

Figure 17:
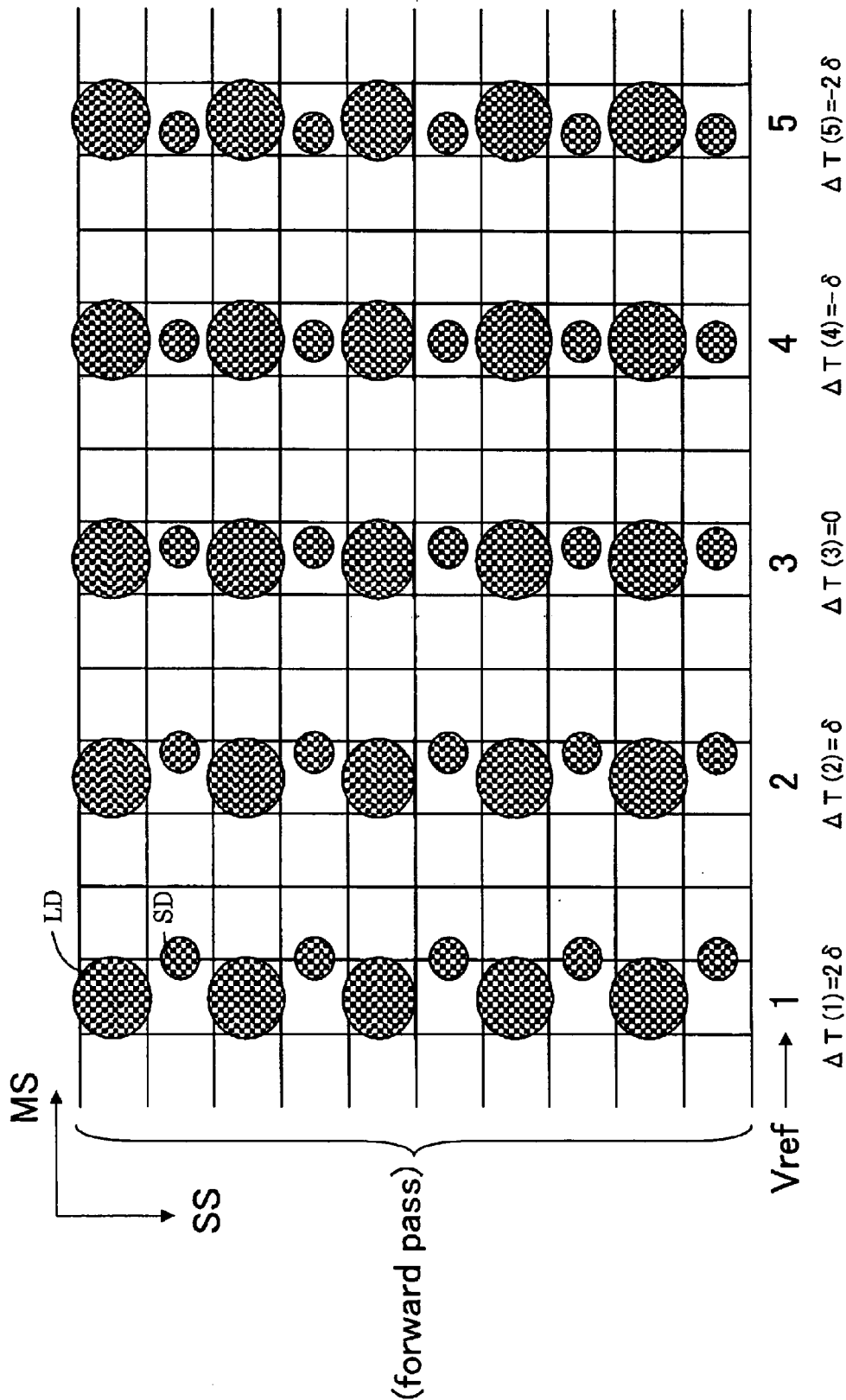
FIG. 17 is an illustrative diagram showing an exemplary test pattern for adjusting relative placement of large dots and small dots.

FIG. 17 shows an exemplary test pattern for adjusting relative placement of large dots LD and small dots SD. The test pattern includes five linear sub-patterns. In each sub-pattern, large dots LD and small dots SD are recorded in alternating fashion in a substantially straight column extending in the sub scan direction SS. Both large dots LD and small dots SD are produced during the forward pass. The five sub-patterns are produced while shifting the timing for small dot SD ink ejection by a given amount δ, so that the relative placement of large dots LD and small dots SD is shifted in small increments in response thereto. The value of the relative placement adjustment number Vrel (=1~5) is printed at the bottom of each sub-pattern. Relative placement adjustment number Vrel of 1~5 are associated with the relative correction values ΔT(1)~ΔT(5) for small dot SD placement. In actual practice relative placement adjustment number Vrel is printed using large text (several tens of dots per side); for convenience, small numerals are shown in FIG. 17.

Figure 18:
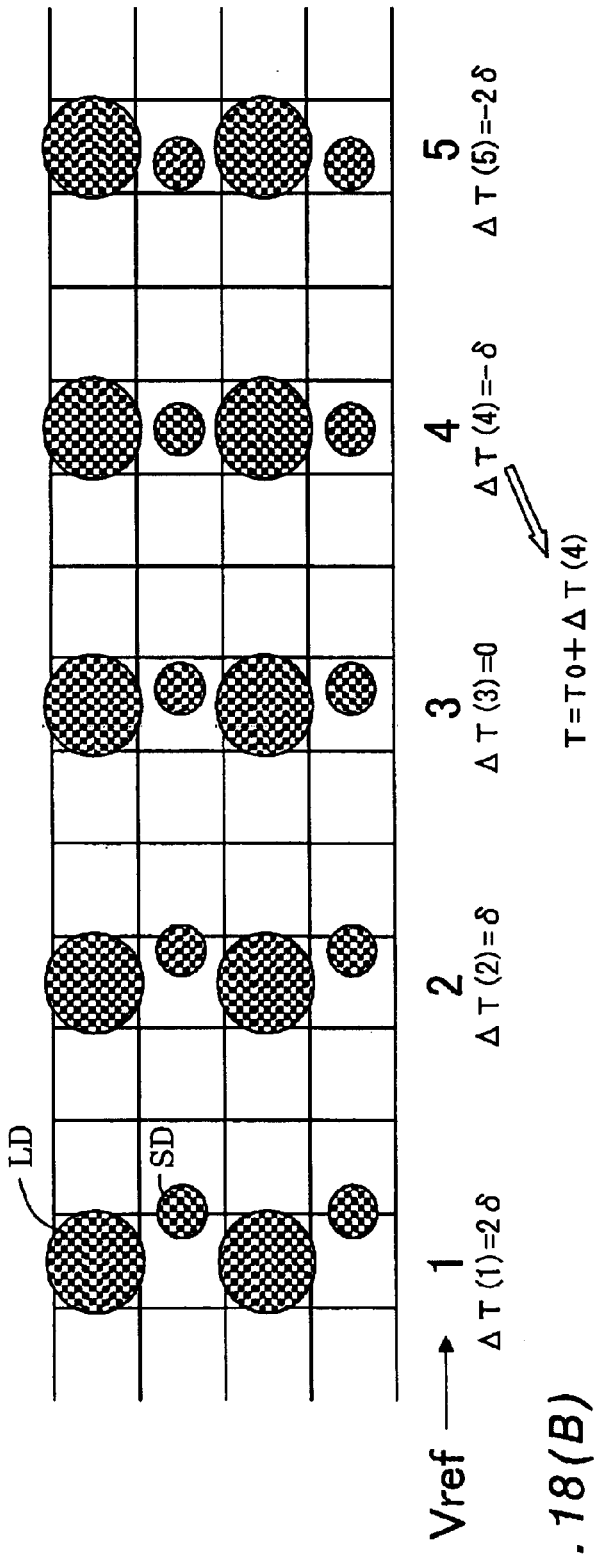
FIGS. 18(A) and 18(B) are illustrative diagrams showing the relationship of relative placement adjustment number and placement correction.

After the test pattern described above is printed out by printer 20; the user selects the relative placement adjustment number Vrel that gives the best adjustment, and sets the adjustment number into the printer driver or the printer 20. FIGS. 18(A) and 18(B) show the relationship of relative placement adjustment number Vrel selected from the test pattern and the resultant placement correction made during printing. In this example, where the relative placement adjustment number Vrel is 4, relative placement of large dots LD and small dots SD is aligned correctly, as shown in FIG. 18(A). While in the test pattern the large dots LD and small dots SD are arrayed in the sub scanning direction, in actual printing large dots LD and small dots SD will be produced at adjacent pixel locations, as shown in FIG. 18(B) (see also FIG. 6(G)). Accordingly, during actual printing the small dot SD timing is adjusted using a correction value T that is a sum of a single-pixel reference offset TO and the relative correction value ΔT (4), as shown in FIG. 18(B). By so doing it is possible to correctly align placement of large dots LD and small dots SD in the main scanning direction.

Figure 19:
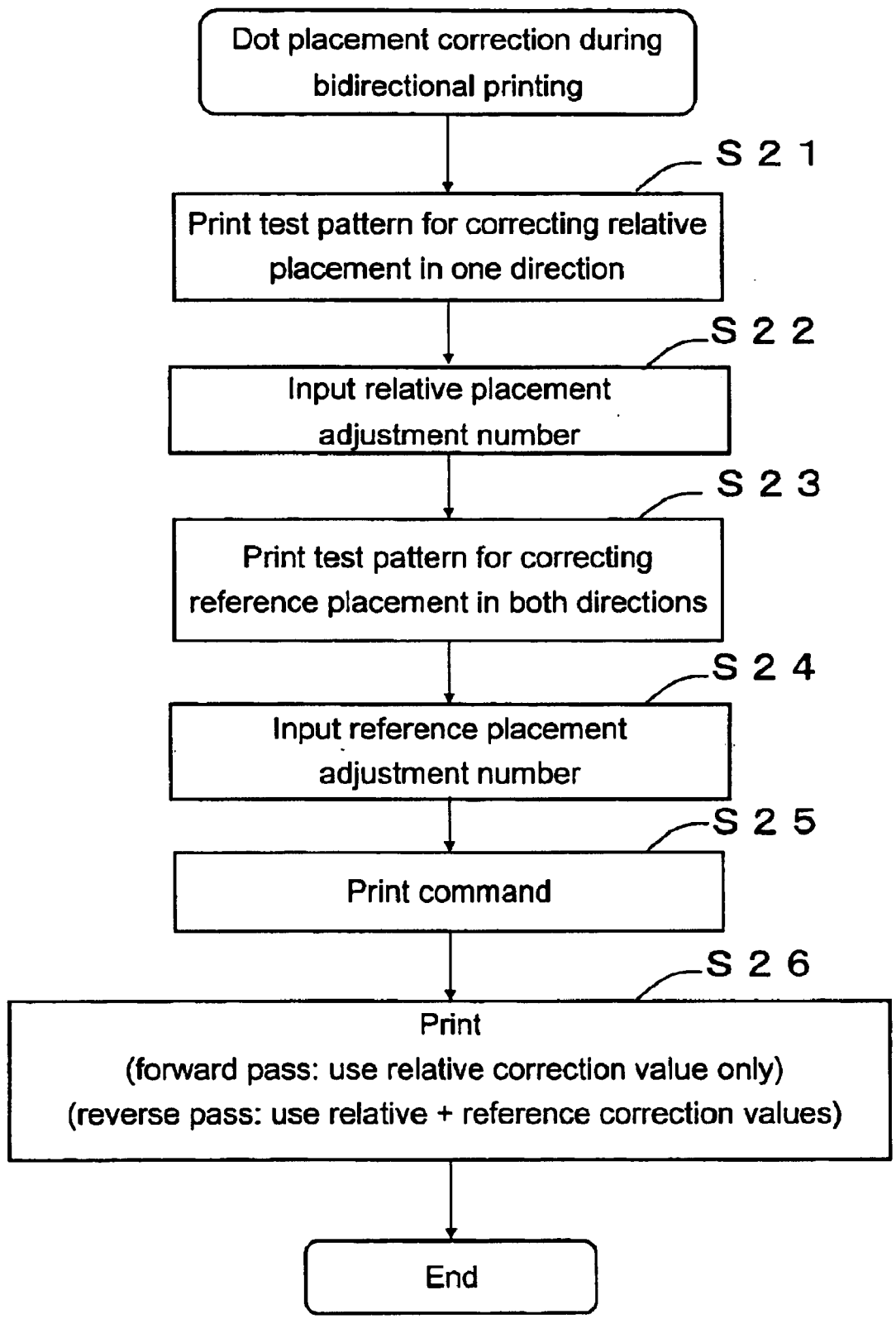
FIG. 19 is a flow chart showing the procedure for adjusting dot placement during printing.

In the preceding example, placement of small dots SD is corrected, but alternatively it is possible to correct placement of large dots instead. In preferred practice, this same procedure will be used to align relative placement of medium dots MD against the large dots LD and small dots SD.

Where printer 20 performs bidirectional printing, placement correction occurring with bidirectional printing is performed. FIG. 19 is a flow chart showing the procedure for adjusting dot placement during bidirectional printing. In Step S21, test patterns for relative placement adjustment are printed out during the forward pass and reverse pass; and in Step S22 the appropriate relative placement adjustment number is input to the printer 20. The relative placement adjustment test patterns are identical to that shown in FIG. 17. However, since in bidirectional printing is performed during both the forward pass and reverse pass, separate test patterns are produced for the forward pass and reverse pass, and relative placement adjustment numbers Vrel (i.e. relative correction values) are set independently for the forward pass and reverse pass. Alternatively, rather than printing a test pattern and setting relative correction values for both the forward pass and reverse pass, the relative correction value for the forward pass can be used for the reverse pass as well. In this case, the relative correction values for the forward pass and reverse pass will have opposite signs.

Figure 20:
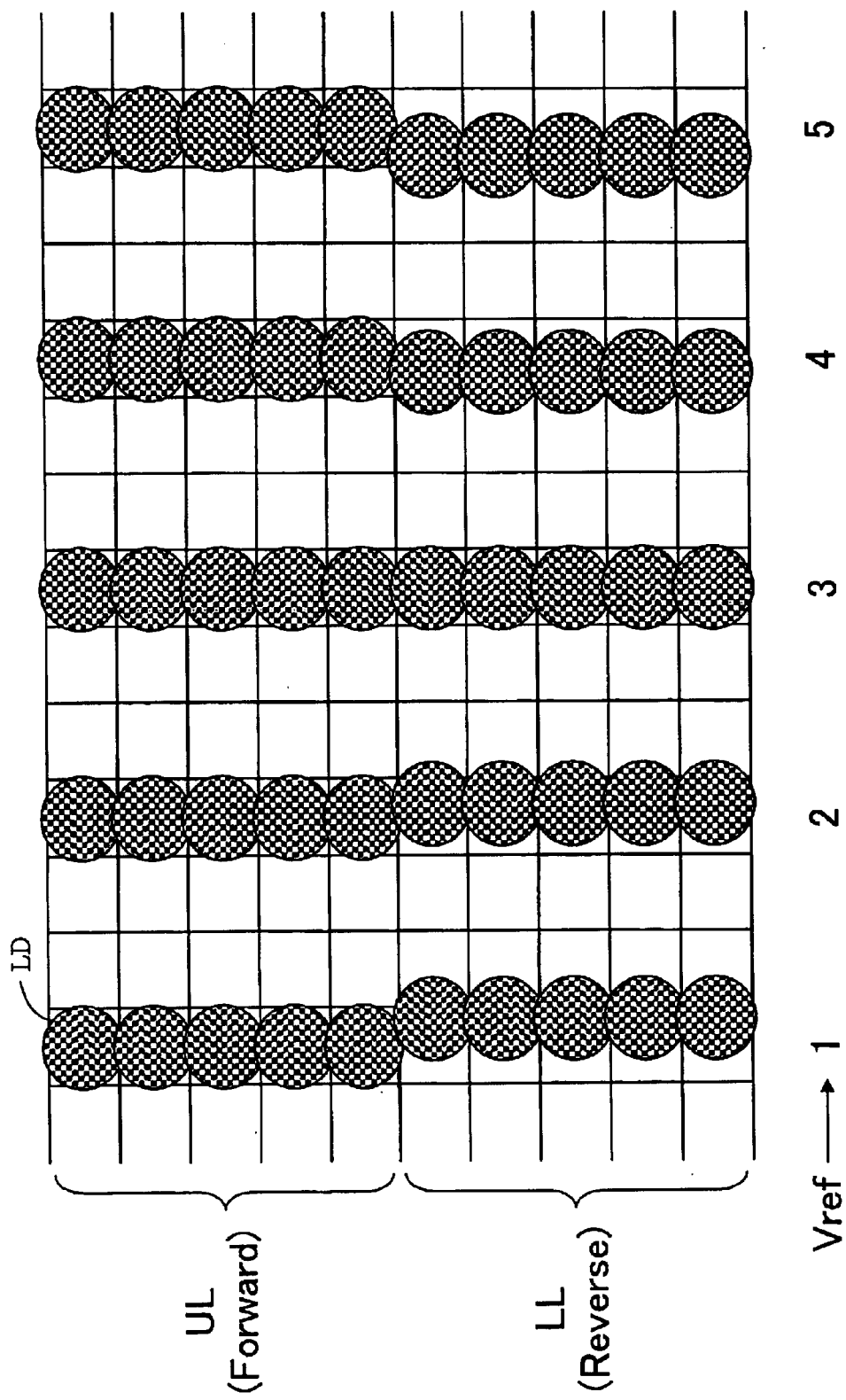
FIG. 20 is an illustrative diagram showing a test pattern for reference placement adjustment.

In Step S23 shows a test pattern for reference placement adjustment during bidirectional printing is printed out. FIG. 20 is an illustrative diagram showing an exemplary test pattern for reference placement adjustment. The test pattern includes five linear sub-patterns consisting of large dots LD only. Each sub-pattern is composed of an upper line portion UL recorded during the forward passes, and a lower line portion LL recorded during the reverse passes. The five sub-patterns are produced while shifting by a given amount the timing for ink ejection to produce the large dots LD making up the lower line portion LL, so that the relative placement of the upper line portion UL and lower line portion LL is shifted in small increments in response thereto. The value of the relative placement adjustment number Vrel (=1~5) is printed at the bottom of each linear pattern. Reference placement adjustment number Vrel values of 1~5 are associated with the reference correction values.

Reference placement adjustment numbers Vrel for bidirectional printing are determined with reference to a specific single reference dot selected from a plurality of dots of different size (in the example shown in FIG. 20, the large dot LD). Misaligned placement in the main scanning direction in bidirectional printing is corrected with reference to this reference dot LD, using a reference correction value associated with a reference placement adjustment number Vrel. For other dots (medium dots MD and small dots SD) the correction value for bidirectional printing is determined by adding this reference correction value to the relative correction value determined in Step S21 and S22.

After determining relative correction value and reference correction value in this way, a Print command from the user in Step S25 initiates Step S26, in which printing is executed while correcting placement. Specifically, during the forward pass, misaligned placement in the main scanning direction of a plurality of dots of different size is corrected using the relative correction value only, while during the reverse pass placement is corrected using both the relative correction value and reference correction value. Alternatively, the opposite approach can be used, i.e., correcting placement using both the relative correction value and reference correction value during the forward pass, and correcting placement using only the relative correction value during the reverse pass.

Setting of the relative correction value and reference correction value by the procedure shown in FIG. 19 can be performed at the time of printer assembly, or under instruction by the user. Alternatively, either the relative correction value or reference correction value can be performed at the time of printer assembly, with the other value being set by the user.

Figure 21:
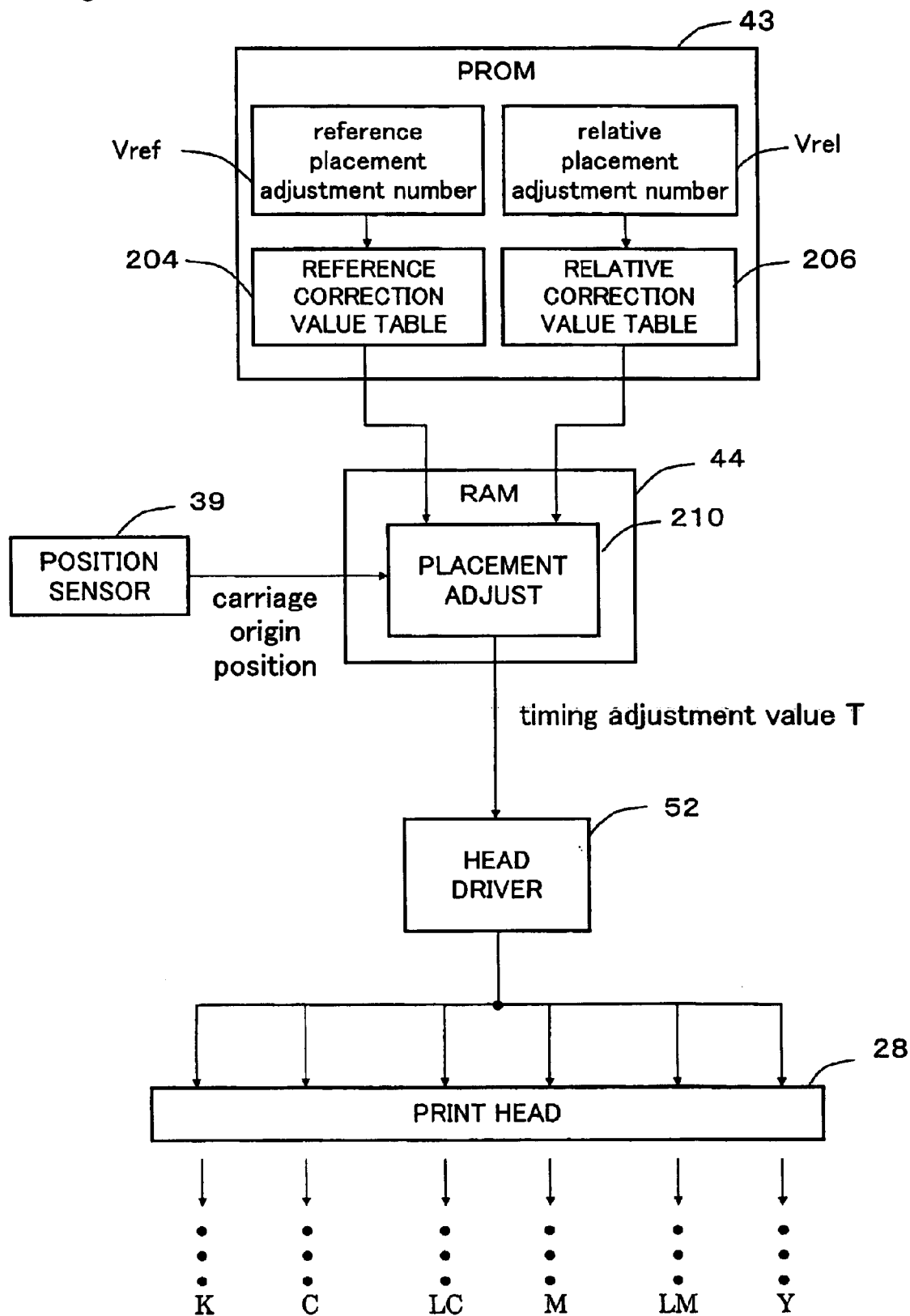
FIG. 21 is a block diagram showing the principal elements for placement adjustment in bidirectional printing.

FIG. 21 is a block diagram showing the principal elements used for placement adjustment in bidirectional printing. PROM 43 in printer 20 stores the reference placement adjustment value Vref, relative placement adjustment value Vrel, a reference correction value table 204, and a relative correction value table 206. Adjustment values Vref, Vrel are input in Steps S22 and S24 in FIG. 19. The reference correction value table 204 stores the relationship between the reference placement adjustment values Vref and the reference correction values. The relative correction value table 206 stores the relationship between the relative placement adjustment value Vrel and the relative correction value.

RAM 44 in printer 20 stores a computer program that functions as a placement correcting portion (adjustment value determining portion) 210 for correcting dot placement in the main scanning direction. During the forward pass the misaligned placement correcting portion 210 supplies to head driver circuit 52 a timing adjustment value T corresponding to the relative correction value, and during the reverse pass it supplies to head driver circuit 52 a timing adjustment value T corresponding to the sum of the relative correction value and reference correction value. The timing for generating the drive signal is determined on the basis of the original position of the carriage, detected by position sensor 39. The timing adjustment value T for each pass is determined with reference to the type of dot being recorded during the pass. In response to the timing adjustment value T the head driver circuit 52 corrects the timing for generating the drive signal during each pass.

In the procedure shown in FIG. 19, misaligned placement of reference large dots LD in the main scanning direction during main scan printing is corrected with the reference correction value, and misaligned placement of dots other than reference large dots LD—i.e. dots SD and MD—is corrected with the relative correction value, so that mutual placement can be aligned during bidirectional printing. As described in FIGS. 18(A) and 18(B), in actual practice large dots LD and small dots SD are recorded at different positions in the main scanning direction, but when determining a relative correction value, these are recorded in substantially a single column extending in the sub scanning direction so as to obtain the same main scan placement. This has the advantage of facilitating determination of proper relative correction values.

In the preceding example large dots LD are used as the reference dots, but medium dots MD or small dots SD can be used as the reference dots.

A-5. Modifications of First Embodiment (1) Modification 1

In the preceding examples ejection of ink droplets onto a single main scan line is completed in three main scan passes; however, the number of main scan passes over a single main scan line is not limited to 3, and may be 4 or more.

(2) Modification 2

In the preceding examples pixel pairs are composed of contiguous pixels in the main scanning direction, but pixel pairs can be composed of contiguous pixels in the sub scanning direction. In the preceding examples a pixel pair is the unit for local gradation reproduction, but it is possible to use 3 or more pixels as the unit for local gradation reproduction. Typically, it is acceptable to employ N contiguous pixels, where N is an integer equal to 2 or greater, in either the main scanning direction or sub scanning direction as the unit for local gradation reproduction. In this case, the volume of ink ejectable onto at least one pixel location of the N pixels is set to a value different from the volume of ink ejectable onto other pixel locations.

In the preceding examples the number of locally reproducible gradation levels is 5, but it can be set to 6 or more. Typically, by adjusting the volume of ink at each pixel location of the N pixels, it is possible to reproduce M gradation levels where M is an integer equal to N+2 or greater.

(3) Modification 3

The present invention is also applicable to a drum scan printer. In a drum scan printer the direction of drum rotation is the main scanning direction, and the direction of carriage travel is the sub scanning direction. The present invention is not limited to ink-jet printers, but is applicable generally to any printing device that performs printing onto the surface of a print medium using a print head equipped with a plurality of nozzles. Such printing devices include fax machines and copiers.

(4) Modification 4

Some or all of the functions performed by hardware in the preceding examples can instead be performed by software; and conversely some or all of the functions performed by software in the preceding examples can instead be performed by hardware. For example, some of the functions of the control circuit 40 (FIG. 2) could be performed by the host computer 90.

B. Second Embodiment

B-1. Overview of the Second Embodiment

Typical ink-jet printers has a print head provided with nozzles which are disposed at regular intervals in the direction of paper advance, forming nozzle arrays. A single nozzle array or a plurality of nozzle arrays is commonly available for each color ink.

The nozzle interval is not always equal to a print resolution, but they are equal in many cases. It is possible, for example, to adopt a construction in which the nozzles are arranged in staggered fashion for a certain color ink, the right and left columns each print a single row of pixels in an alternating fashion, and the nozzles eject ink drops to an extent that allows each of these rows to be filled without gaps.

With this construction, the nozzles arranged in staggered fashion are alternately assigned to rows of pixels so that each nozzle ejects drops of specific color ink on the corresponding pixel row to thereby print a desired image without creating any gaps between the pixel rows. Setting a print resolution based on such nozzle intervals allows image data based on this print resolution to be prepared.

There are also constructions in which dark and light color inks of the same hue are used to prevent graininess in printed images and those color inks are ejected by the right and left nozzle arrays in the aforementioned staggered arrangement.

In a hypothetical example, the right and left rows each have a nozzle interval of 180 dpi, these rows are offset by a distance corresponding to a dot pitch of 360 dpi, and the color ink drops ejected from each nozzle have a diameter that corresponds to 360 dpi. In this case, one scan pass of the print head will cause pixel rows to be alternately printed with dark and light color inks, and another pass after a paper feed by a pitch of 360 dpi will cause light and dark inks to be dropped in an interchanging manner. Each pixel row can thus be printed with both dark and light color inks, reducing graininess in the printed image. In this case, image data of 360 dip are prepared.

In the above printing devices, images are printed at a high resolution, but the printing speed is low because of the high resolution. When two staggered nozzle arrays are used for black ink to increase the monochromatic printing speed while dark and light inks are distributed in two staggered rows for primary colors, the black ink requires one scan pass to complete dot formation on each pixel row while each ink of the primary colors requires two scan passes.

The second embodiment of the present invention is premised on controlling a printing device equipped with a plurality of nozzles capable of performing high-resolution printing by ejecting individual ink drops onto each pixel. Low-resolution image data are prepared based on high-resolution image data when the print control device outputs printing data to the printing device. The low-resolution image data are created by assuming that groups of pixels composed of a plurality of high-resolution pixels disposed adjacent to each other constitute a single low-resolution pixel, and the low-resolution image data are used to eject ink drops onto each high-resolution pixel.

Specifically, nozzles traditionally eject ink drops onto each high-resolution pixel according to high-resolution image data, but if the nozzle resolution, or the nozzle pitch, does not correspond to the high resolution, a plural scan passes are required to complete printing on each row of high-resolution pixels. The use of low-resolution image data in the second embodiment of the present invention, on the other hand, reduces the number of scan passes required to complete dot formation on each row of high-resolution pixels. For example, low-resolution image data is prepared to represent dot formation state for each low-resolution pixel which includes two high-resolution pixels. In this case, two neighboring nozzles will eject ink drops onto two neighboring high-resolution pixels according to the low-resolution image data for a single low-resolution pixel corresponding to the two high-resolution pixels.

Figure 22:
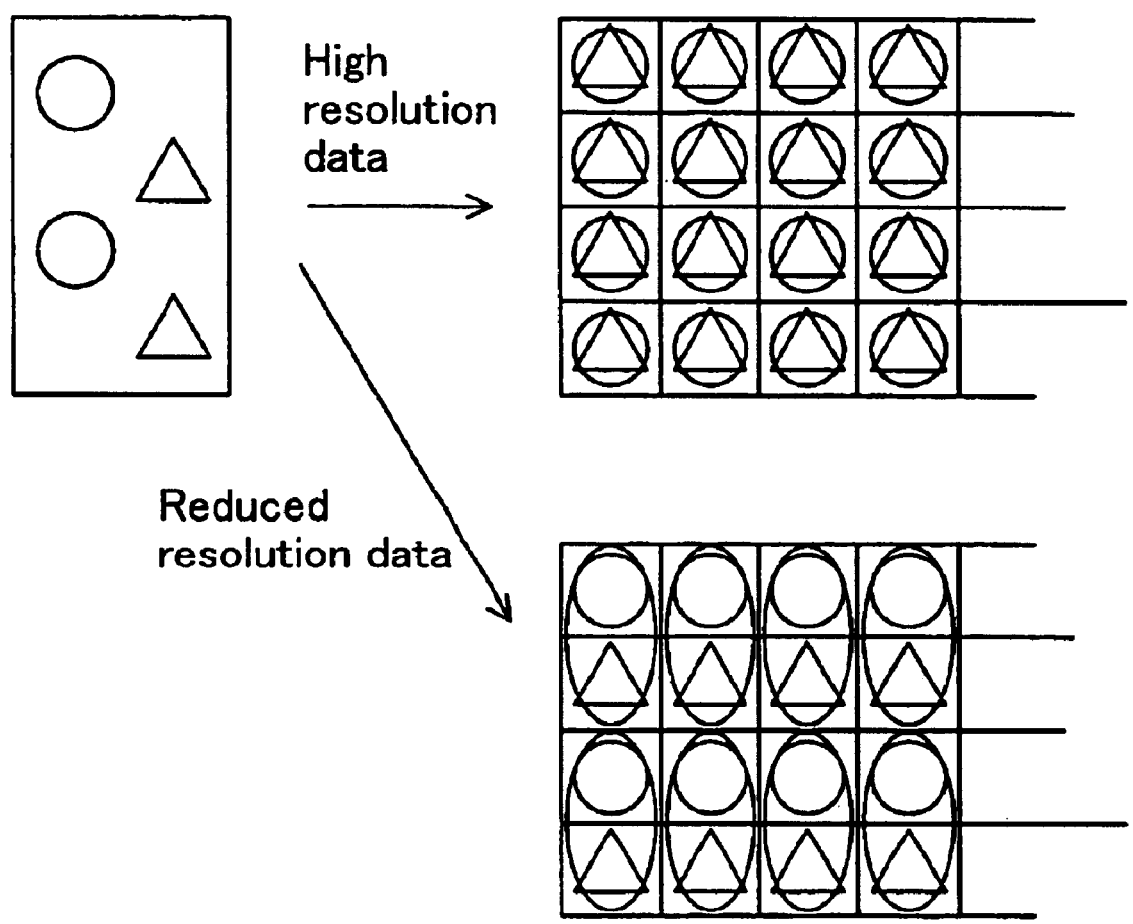
FIG. 22 is a diagram schematically depicting a routine in which the resolution of high-resolution data is reduced to print high-resolution pixels.

FIG. 22 is a schematic depicting a state in which ink drops are ejected onto pixels with the aid of a print head equipped with staggered nozzles. The assignment of nozzles and inks is shown by circles and triangles for the convenience of understanding. Conventionally, each nozzle ejects an ink drop onto each of the high-resolution pixels when one nozzle array is used for a dark color ink and the other nozzle array is used for a light color ink to improve gradation reproduction. When individual nozzle arrays are considered, however, it becomes clear that the nozzles and pixels do not match each other in terms of resolution and that the print head is not capable of completing dot formation of the dark ink and light ink at all the pixels in a single scan pass. However, the use of low-resolution image data for a low-resolution pixel, which consists of two high-resolution pixels arranged in the vertical direction, makes it possible to fill each high-resolution pixel on two high-resolution pixel rows by two nozzles in a single scan pass.

Since a plurality of adjacent high-resolution pixels are treated as a single low-resolution pixel, the reduction in resolution can be easily represented as an integral fraction.

For this reason, the print control device of the second embodiment entails creating low-resolution image data for a reduced number of pixel rows on the basis of high-resolution image data having a plurality of pixel rows. When, for example, image data for two pixel rows are combined into a single pixel row, two neighboring nozzles individually eject respective ink onto two neighboring high-resolution pixels according a single pixel value of the low-resolution data. If a staggered nozzle arrangement is adopted, it is then possible to eject ink drops from two nozzles disposed in different columns, and to form dots on a single low-resolution pixel. In the case shown in FIG. 22, the two upper nozzles form a group, as do the two lower nozzles.

In another embodiment, low-resolution image data represent an image with reduced number of pixel columns each including a plurality of high-resolution pixel columns. In contrast to the previous embodiment, in which resolution was reduced with respect to pixel rows, this embodiment entails lowering the resolution with respect to pixel columns. It is therefore preferable to use nozzle arrays that are arranged in sequence along the row direction. The case shown in FIG. 22 entails reducing resolution by combining two vertically adjacent high-resolution pixels into a single low-resolution pixel, but it is also possible to reduce the resolution by combining two horizontally adjacent high-resolution pixels into a single low-resolution pixel.

When resolution is reduced by combining two pixel columns into a single column, the ink drops ejected by two nozzles are adjacent to each other in the row direction to form dots on a single low-resolution pixel consisting of two high-resolution pixels.

Various arrangements can be adopted for individually ejecting ink drops from a plurality of nozzles according to low-resolution image data. In one example the plurality of nozzles being divided into groups for ejecting color inks having different densities. The nozzles belonging to these groups can reproduce pixels having reduced resolution. When, for example, the color inks have two types of densities, dark and light inks, the nozzle groups are also divided into two types, and the color inks having different densities are ejected onto separate high-resolution pixels adjacent to each other, yielding a single low-resolution pixel. In the case shown in FIG. 22, a dark color ink is ejected from the nozzle array marked by circles, and light color inks are ejected from the nozzle array marked by triangles.

In this case, a color ink of the same density can alone be ejected with respect to each hue, instead of using all inks of different densities. This is because printing can inherently be accomplished using one ink for each primary color, provided the color ink has the full density. In the case shown in FIG. 22, a dark color ink may be ejected from the nozzle array marked by circles while light color ink is prevented from being ejected from the nozzle array marked by triangles. Printing can still be performed with this arrangement, and the printing procedure is speeded up in proportion to the absence of processing involving light color inks.

In one example of gradation reproduction using color inks of the same hue and various densities, a plurality of pixel gradation levels are attained with combinations of inks of different ink densities. For example, three gradation levels are attained with the sequence (light)<(dark)<(light+dark) using light and dark color inks. It is apparent that this arrangement may also be referred to as "four-level gradation" by taking into account the condition in which no ink is ejected. In the case shown in FIG. 22, "gradation reproduction" is performed according to the sequence (no ejection) <($\Delta$ alone)<(O alone)<($\Delta$+O), assuming that the circles represent dark ink and the triangles represent light ink.

In a simplified example, the number of pixel gradations for a particular hue is set equal to the number of ink densities for the hue. For example, two pixel gradation levels are used in the case of color inks with two different densities. This arrangement may also be referred to as "three-level gradation" if the no ink state is taken into account. In the case shown in FIG. 22, "gradation reproduction" is performed according to the sequence (no ejection)<($\Delta$ alone)<(O alone), assuming that the circles represent dark ink and the triangles represent light ink.

Resolution can be reduced during a variety of steps in which image data are processed, including steps in which the image data are used to represent the dots of print pixels. For example, when the image data are bi-level data for indicating whether or not dots are to be deposited, logical sum is performed on the original high-resolution image data to obtain low-resolution image data.

In a specific example, assuming that the two adjacent pixel rows in the original high-resolution image data are "01010101 . . . "; and

"00110010 . . . ", the logical sum of these two pixel rows in a bit-by-bit manner will produce

"01110111 . . . "

as a single low-resolution pixel row of the reduced resolution image data.

Although the resolution reduction by the logical sum can be applied to each hue, it is also possible to limit this arrangement to specific hues in consideration of printing speed and print quality. For example, the logical sum is applied solely for the yellow hue to produce image data with reduced resolution.

Instead of bi-level print data, it is also possible to use multi-level print data representing plural dot sizes, such as small, medium, and large dots. Even in this case bi-level data may be used for each dot size. In this case, the logical sum can be applied to each of the plural dot sizes to produce low-resolution image data. Specifically, logical sums are calculated for the image data for small dots. The same applies to medium dots and large dots.

It is also possible to use multi-level data for expressing multiple dot sizes. With two bit data, "00" represents the absence of ejection, "01" a small dot, "10" a medium dot, and "11" a large dot, for example. In this case, the resolution reduction can be performed by selecting a multilevel data representing a maximum dot size within a set of plural high-resolution pixels corresponding to a single low-resolution pixel, to thereby produce low-resolution image data. For example, assuming that the two adjacent pixel rows in the original high-resolution image data are "xSxS S S MxM M M LxL L L . . . "; and "xxS S M LxM M S LxL L M S . . . ", where "x" denotes no dot, "S" denotes small dot, "M" denotes medium dot, and "L" denotes large dot, the dot size selection between these two pixel rows will produce "xS S S M L M M M M L L L L L L . . . "

as a single low-resolution pixel row of the reduced resolution image data.

The selection of maximum dot-size data is not necessarily the best option when dots can be printed with color inks having the same hue and different densities. For this reason, multilevel data of mean-sized dot may be selected for light inks, and multilevel data of maximum-sized dot may be selected for dark inks. Since the presence of the dark ink dot in the high-resolution image data clearly indicates that it is preferable to form the dark ink dot also in the low-resolution pixel, the preferred option is to select the maximum size dot to enhance the tendency to form the dark ink dot on a low-resolution pixel. However, gradation level, or gradation, can be better preserved by selecting a mean-sized dot for the light ink because the light ink dots are created for fine tuning of the gradation level.

Performing specific adjustments appears to be a more preferred option when dots having a plurality of sizes are utilized. For this reason, a conversion table may be used for selecting a single size dot for each combination of original high-resolution data, and multilevel data representing the selected size dot may be produced with reference to the conversion table to obtain low-resolution image data.

Assuming that four dot states of no dot, small dot, medium dot, and large dot are available, the conversion from high-resolution data to low-resolution data may be (no dot)+(no dot)→(no dot);
(no dot)+(small dot)→(small dot);
(no dot)+(medium dot)→(small dot);
(no dot)+(large dot)→(medium dot);
(small dot)+(small dot)→(small dot);
(small dot)+(medium dot)→(medium dot);
(small dot)+(large dot)→(large dot);
(medium dot)+(medium dot)→(large dot);
(medium dot)+(large dot)→(large dot); and
(large dot)+(large dot)→(large dot).

If the multilevel data in this conversion table is two bit data, two pieces of the multilevel data can be combined to make a four-bit input, and the result can be obtained by addressing the conversion table with the four bit data.

In order to accelerate the resolution reduction for the original high-resolution data of multi-bit data, the logical sum calculation may be performed for each bit of the multi-bit data. For example, the logical sum will yield "01" from "00" and "01", "10" from "10" and "00," and "11" from "11" and "00." Assuming that the two adjacent pixel rows in the original high-resolution image data are "xSxS S S MxM M M LxL L L . . . "; and "xxS S M LxM M S LxL L M S . . . ", and these rows are represented by "00, 01, 00, 01, 01, 01, 10, 00, 10, 10, 10, 11, 00, 11, 11, 11, . . . "; and

"00, 00, 01, 01, 10, 11, 00, 10, 10, 01, 11, 11, 11, 11, 10, 01, . . . ."

The bit-by-bit logical sum between these two pixel rows will produce

"00, 01, 01, 01, 11, 11, 10, 10, 10, 11, 11, 11, 11, 11, 11, 11, . . . "

which represent

"xS S S M L M M M M L L L L L L . . . ."

Although the preceding example gives better gradation reproduction, this example is also highly practical because of a marked increase in calculation speed.

During printing with the aid of a personal computer, the color space of image data is typically RGB at the time of data creation, and these data are converted to the CMY color space (color space of color inks) at the time of printing. The gradation values of the first color space are proportional to luminous brightness, and the gradation values of the second color space are proportional to image density of the inks.

The resolution reduction can be performed in any color space. It may be performed in the color space of luminous brightness before the image data is converted into another image data of the ink density.

In this case, a minimum value among a plurality of high-resolution pixels corresponding to each single low-resolution pixel may be selected to produce low-resolution image data.

Lower gradation values for luminous brightness correspond to higher gradation values for ink density. Specifically, selection of a minimum value of luminous brightness means selection of the darkest pixel, which ensures a tendency to eject as much color ink as possible. In a hypothetical example of two pixel rows being combined into a single pixel row, it can be assumed that one of the rows contains an underline whose width is equal to one pixel row and that the other row represents no dot formation, in which case underlines can be prevented from being deleted or blurred when the resolution is reduced by retaining the darkest pixel for the hue. It is apparent that such blurring can be prevented in a similar manner for characters or graphs.

In another example, image data of luminous brightness are converted to image data of ink dot density, resolution reduction is then performed on the image data of ink density, and density separation is performed on the low-resolution data. The term "density separation" denotes separation of ink density data of a particular hue into a plurality of sub data for a plurality of same-hue inks which have the same hue but different densities. The maximum-value selection may be applied to the resolution reduction in this case.

Since the image data of ink dot density are subjected to the resolution reduction, the maximum-value selection means that colored pixels are retained as much as possible, preventing underlines from being deleted or blurred because of the resolution reduction.

The technique suitable for reducing the number of conversion steps entails performing conversion to ink dot density data for all of the usable inks including same-hue inks, and then performing resolution reduction. Adopting this approach makes it possible to perform a single conversion because the color conversion and density separation are conducted simultaneously. When, for example, the color image data of luminous brightness in the RGB color space are converted to color image data of C, M, Y, K, lc (light cyan), and lm (light magenta), the density separation with respect to the cyan hue and magenta hue is also completed by the color conversion.

The resolution reduction may be performed such that a maximum value of image data for the plurality of high-resolution pixels constituting a low-resolution pixel is selected for dark color ink, and a mean-value is selected for light color ink. If the high-resolution image data represent to form dark color ink dots, better images will be obtained by forming dark ink dots even at a reduced resolution. If, on the other hand, the high-resolution image data represent to form light color ink dots, better images will be obtained by making dots non-conspicuous even at a reduced resolution. These considerations lead to the selection of a maximum value for dark ink and selection of a mean value for light ink.

It is apparent that the present invention is not always limited to the above-described resolution reduction and that the above-described techniques should be adopted for the above-described situations. In one embodiment, one resolution reduction procedure is selected from a plurality of possible procedures, wherein the mean value selection is set as the default procedure of resolution reduction.

Such print control can be considered to be more effective when a different number of nozzles are assigned to each ink. In this case, the resolution reduction may be performed only for the ink colors that have fewer nozzles.

Assuming that the number of nozzles assigned to first ink is an integral multiple of that assigned to second ink, dot formation for the first ink may be completed by a single scan pass on each pixel line or scan line according to high-resolution image data, while dot formation for the second ink requires two or more scan passes. If the resolution is reduced for the second ink so that a larger number of nozzles can be simultaneously used for the second ink, dot formation for the second ink will be also completed by a single scan pass As described above, the number of scan passes required to complete dot formation is reduced by eliminating or reducing the difference between nozzle resolution and image data resolution through the creation of low-resolution image data, and this can be realized both as an apparatus and a method. In a print control method for outputting print data to a printing device equipped with a plurality of nozzles capable of performing high-resolution printing by ejecting individual ink drops onto each pixel, low-resolution image data in which a plurality of groups of pixels adjacent to each other at a high resolution are combined into a single pixel are created based on high-resolution image data, and images of reduced resolution are printed by ejecting ink drops onto each high resolution pixel according to the reduced-resolution data.

It should be noted that such print control devices can be configured as standalone devices, be incorporated into other equipment, or have some other design, but the idea of the present invention is not limited to these alone and can incorporate a variety of embodiments. Consequently, the hardware, software, or other elements can be modified as needed.

Computer programs realizing the present invention may be stored on a recording medium, which may be a magnetic recording medium or a magnetooptic recording medium, and the same concept can be applied to any recording medium developed in the future. The approach remains exactly the same for first-generation copying, second-generation copying, and other types of copying. The scope of the present invention remains unchanged in cases in which the product is implemented as part software and part hardware. Another possible embodiment is one in which part of the product is stored on a recording medium, and the data are read in an appropriate manner as needed.

When the present invention is embodied as software, it is possible to design a configuration in which a piece of hardware or an operating system is utilized, or a configuration that is separate from these elements is created. For example, various types of data processing can be implemented by adopting methods in which specific functions are invoked in the operation system, or input is made through hardware without invoking any functions. It is also understood that the proposed concept can actually be implemented through the agency of an operating system or that a program can be recorded on media and distributed, with the present invention implemented solely through this program.

A printing device equipped with a plurality of nozzles for ejecting color inks having same hue but different densities usually ejects ink drops onto a single pixel from a plurality of nozzles, so color inks of different densities are deposited onto each pixel. When the above described print control is executed with this printing device, however, individual nozzles eject ink drops solely onto individual pixels on the basis of reduced-resolution image data, allowing the density of the color inks to remain constant in specific pixel columns or pixel rows.

B-2. System Hardware Structure

Figure 23:
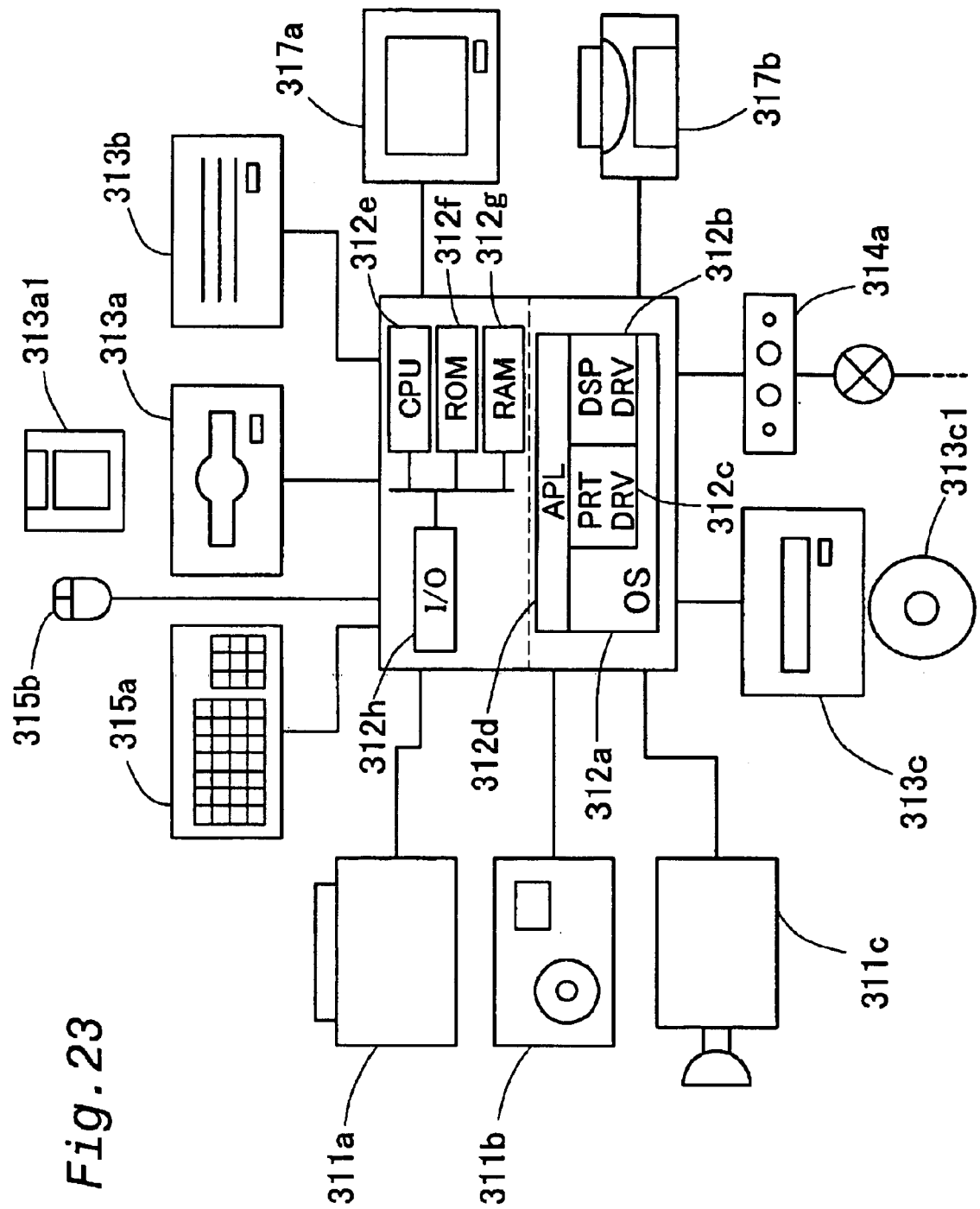
FIG. 23 is a schematic block diagram of a computer system that can be used to execute a print control program pertaining to a second embodiment of the present invention.

FIG. 23 is a block diagram of a computer system that can be used to execute a print control program pertaining to a second embodiment of the present invention.

The computer system 310, which comprises a scanner 311a, a digital still camera 311b, and a video camera 311c as video input devices, is connected to a computer 312. Each input device can create image data in which pixels are reproduced as a dot matrix, and can output the data to the computer 312. The image data can reproduce about 16,700,000 colors by expressing 256 gradation levels for each of the three primary colors RGB.

The computer 312 is connected to a floppy disk drive 313a, a hard disk 313b, and a CD-ROM drive 313c as external auxiliary storage devices; the main program related to the system is recorded on the hard disk 313b, and the necessary programs can be read as needed from a floppy disk 313a1 and a CR-ROM 313c1.

A modem 314a is connected as a communications device for linking the computer 312 to an external network, and the computer is connected to the external network over a public communications line to enable software or data downloads. In this example, outside access from the modem 314a is provided through a telephone line, but a configuration in which network access is provided through a LAN adapter is also possible. A keyboard 315a and a mouse 315b are also connected in order to operate the computer 312.

A display 317a and a color printer 317b are further provided as video output devices. The display 317a has a display area measuring 1024 pixels horizontally and 768 pixels vertically, making it possible to display the aforementioned 16,700,000 colors in each pixel. It is apparent that this resolution is just an example and can be appropriately varied and set to 640×480 pixels, 800×600 pixels, or the like.

The computer 312 executes specific programs because such video input devices are used to display data on the video output devices (or to output data to them) while images are inputted. Of these, operating system (OS) 312a is run as the basic program, and this operating system 312a incorporates a display driver (DSP DRV) 312b for displaying data on the display 317a, and a printer driver (PRT DRV) 312c for providing the color printer 317b with print output. The types of drivers 312b and 312c depend on the model of the display 317a or color printer 317b, and can be added to the operating system 312a and modified according to each model. With some models, additional functions can be offered beyond standard processing. Specifically, various types of supplementary processing can be performed within allowable limits while the common processing format of the standard system (operating system 312a) is preserved.

It is apparent that execution of such programs is premised on equipping the computer 312 with a CPU 312e, RAM 312f, ROM 312g, I/O 312h. The data-processing CPU 312e appropriately executes the basic program stored in the ROM 312g while using the RAM 312f as a temporary work area, settings storage area, or program area, and controls the external or internal devices connected via the I/O 312h.

An application program 312d is run on top of the operating system 312a as a basic program. The application 312d can perform different types of processing, such as monitoring the operation of the keyboard 315a or mouse 315b as the operating devices, appropriately controlling various external devices and processing data in a corresponding manner when the keyboard or mouse is actually operated, displaying processing results on the display 317a, or outputting the results to the color printer 317b.

The processing results provided by the application 312d are outputted as print data by the printer driver 312c to the above-described color printer 317b, and the color printer 317b prints the corresponding characters or images by depositing color ink dots on printing paper.

B-3. Printer Hardware Structure

Figure 24:
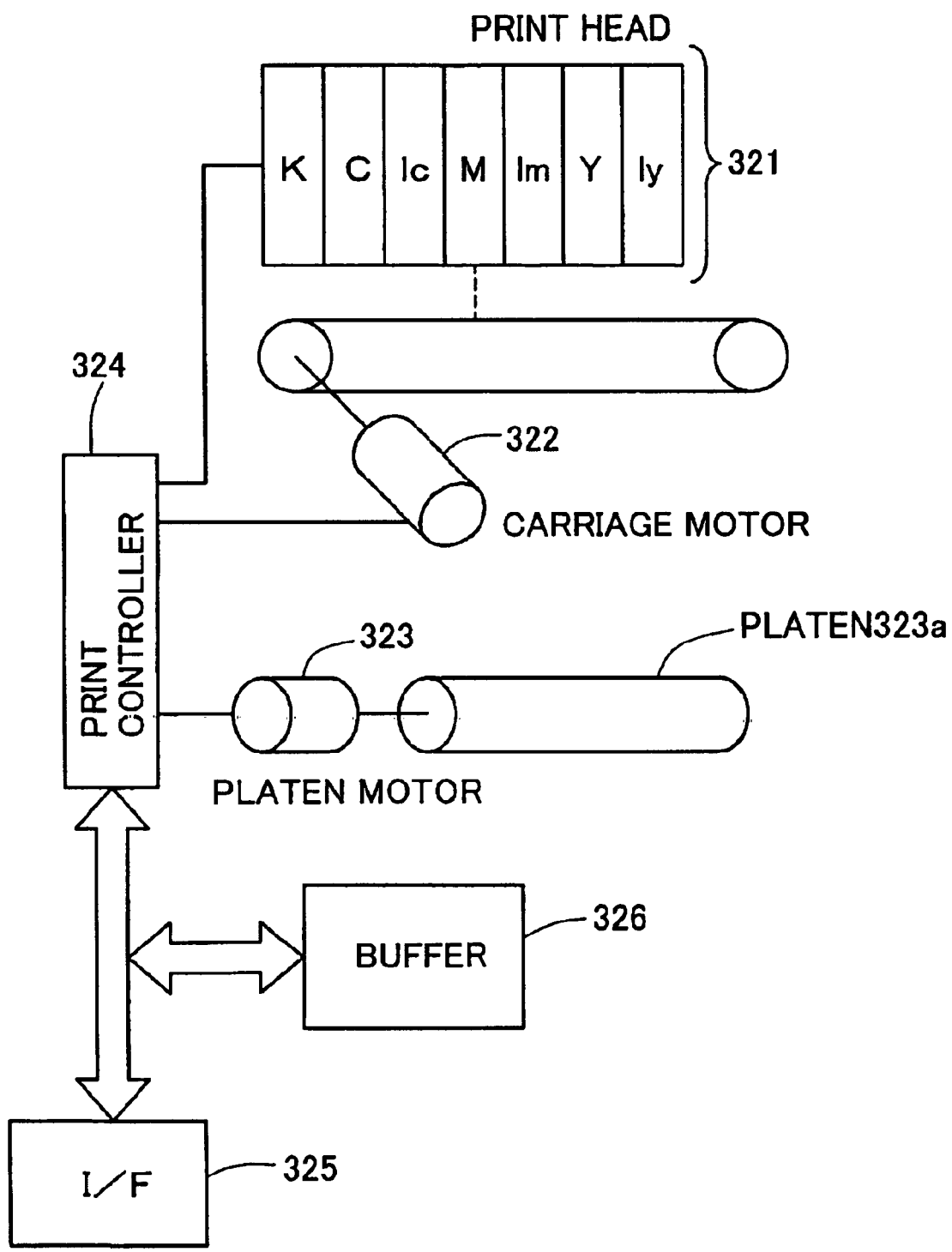
FIG. 24 is a schematic block diagram of a color ink-jet printer.

FIG. 24 schematically depicts the structure of the color printer 317b. The print head 321 has a plurality of nozzle arrays for a plurality of inks, and prints images by ejecting inks from the nozzles. The print head 21 can be driven by a mechanism (not shown) in a reciprocating manner in the transverse direction relative to the printing paper, and is actuated in the direction of main scanning by a carriage motor 22 in a specific direction. The printing paper is supported by being pressed against a platen 23a, and can be advanced in specific increments by a platen motor 23 in a specific direction. Actuation in the direction of paper advance is referred to as "sub-scanning."

The print head 321, carriage motor 322, and platen motor 323 are connected to a print controller 324, and appropriate drive control signals are inputted by the print controller 324 to perform specific actions. The print controller 324 is connected by an interface 325 to the computer 312. The print controller 324 receives print control data from the computer 312 via the interface 325 and controls the print head 321, carriage motor 322, and platen motor 323 to allow images to be printed in accordance with the print control data. The print controller 324 accommodates CPU, ROM, and RAM, and the print data inputted via the interface 325 are temporarily stored in a buffer 326 and are read or written by the instructions from the print controller 324.

Figure 25:
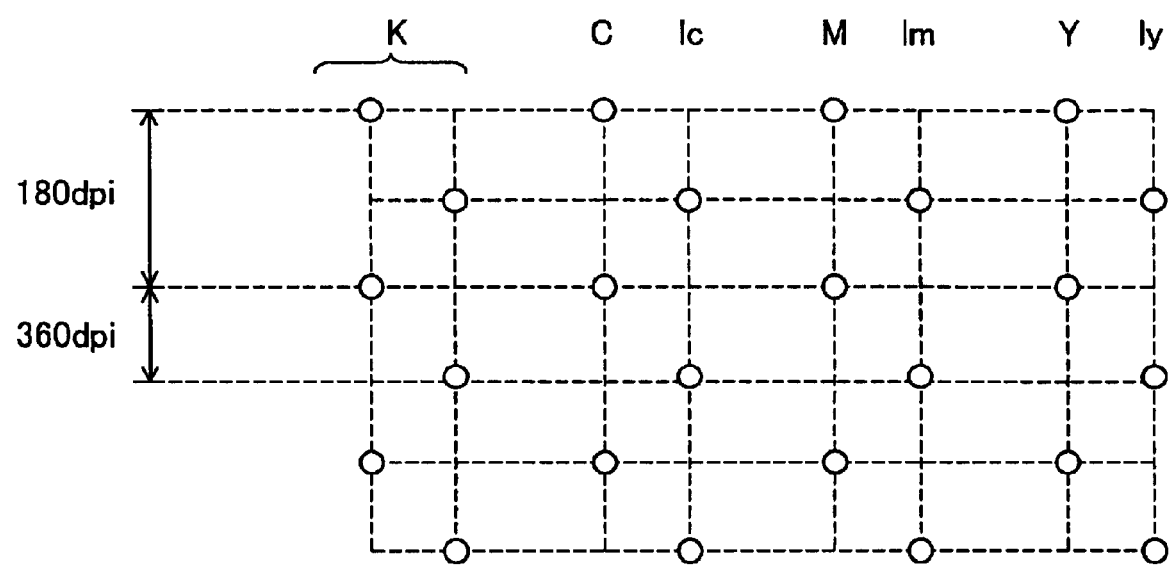
FIG. 25 is a diagram depicting the nozzle arrangement of the color ink-jet printer.
Figure 26:
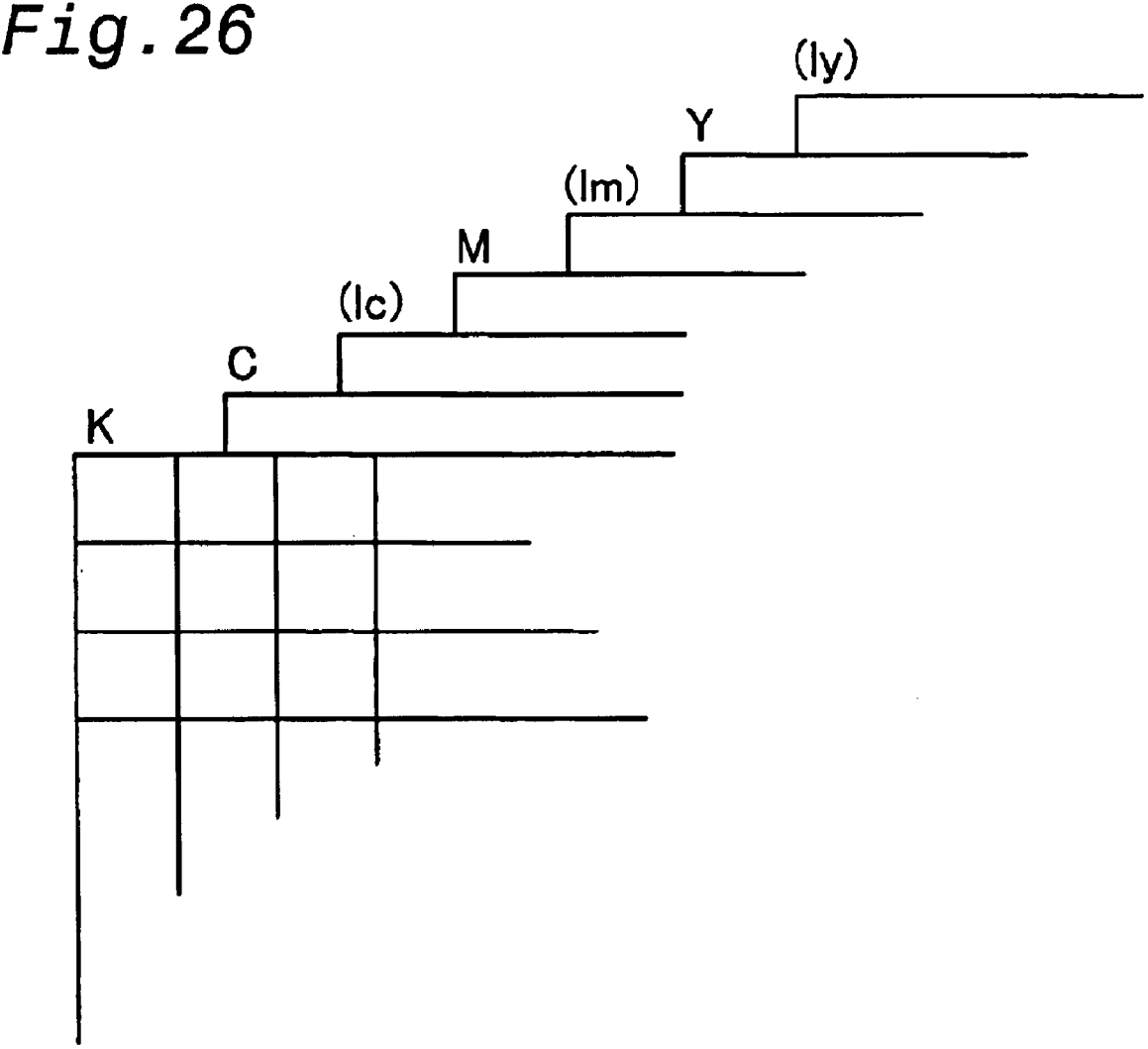
FIG. 26 is a diagram depicting the bitmap data corresponding to different color inks.

FIG. 25 depicts the nozzle face of the print head 321 The nozzles are disposed in a planar arrangement in the longitudinal and transverse directions, and the color inks are fed to predetermined nozzle arrays or columns, respectively. In the example under consideration, black ink (K) is fed to two nozzle arrays, and the following inks are fed to each corresponding nozzle array: cyan ink (C), light cyan ink (lc), magenta ink (M), light magenta ink (lm), yellow ink (Y), and light yellow ink (ly). The nozzle arrays are grouped in pairs, the nozzles in each array are formed at 180-dpi intervals, and adjacent nozzle arrays are offset by a dot pitch of 360 dpi relative to each other in the sub-scanning direction.

Consequently, black ink can be printed at 360 dpi in a single main scan pass, and other color inks can be printed at 360 dpi in two main scan passes. When in the high-resolution mode, the color printer 317b commonly receives 360-dpi print data and completes dot formation on each scan line by a single scan pass in monochromatic printing with black ink, while it completes dot formation by two scan passes in color printing. The number of scan passes required for completing dot formation on each scan line can be increased, if necessary, according the print mode used. In this specification, the high-resolution mode is also referred to as "high quality mode" or "low speed mode."

FIG. 25 depicts the bitmap data for color inks compiled by the printer driver 312c in order to eject the color inks from the print head 321. The bitmap data are composed of bi-level data for indicating whether the respective inks are to be ejected onto pixels arranged in a dot matrix in accordance with print resolution. The data are grouped into planes for each color.

In this example, two inks of different densities (dark and light inks) are used for each hue of magenta, cyan, and yellow. Alternatively, a single type of ink may be used for the yellow hue. In this case, it is possible to use two nozzle arrays for the yellow ink.

B-4. Schematic Flow of Printing Routine

If high-resolution mode is specified for color printing by the color printer 317b, print data with the resolution of 360 dpi are delivered by the operating system 312a to the printer driver 312c. The present embodiment, however, is focused on a high speed mode (also referred to as "low quality mode").

Figure 27:
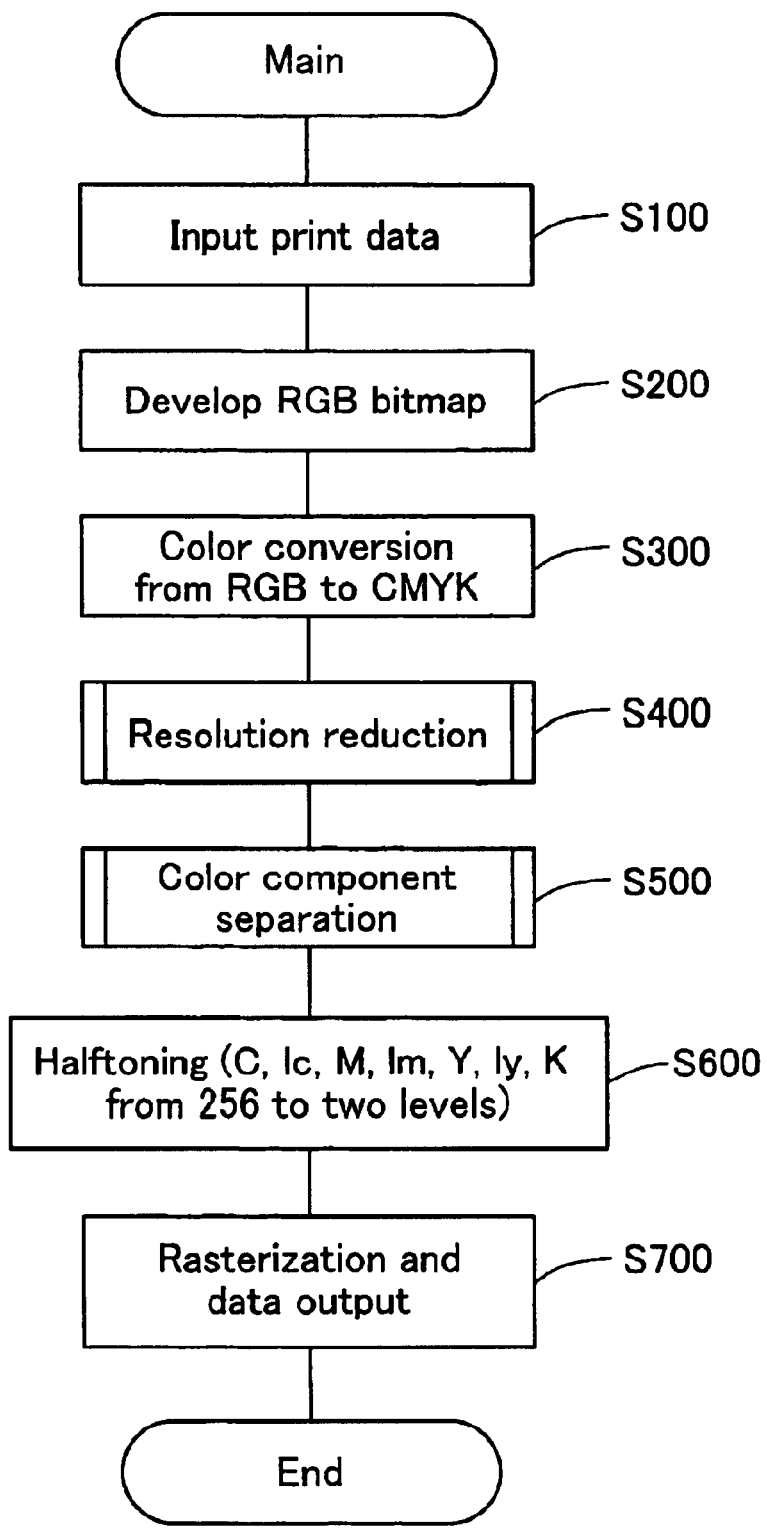
FIG. 27 is a flowchart depicting the print control routine performed in accordance with the first working example.

FIG. 27 shows the printing procedure of the high-speed mode. Upon receipt of print command data from the operating system 312a in step S100, the printer driver 312c develops the print command data into bitmap data in the RGB space in step S200, and converts the colors to the CMYK space for each of the pixels in the bitmap data in step S300. The colors are converted through an appropriate interpolation routine based on the use of a three-dimensional LUT.

Resolution is then reduced in step S400, and data for cyan, magenta, and yellow are then separated into dark and light ink components in step S500. At this point, the systems compiles pixel data in which 256 gradation levels each are reproduced for the cyan ink (C), light cyan ink (lc), magenta ink (M), light magenta ink (lm), yellow ink (Y), light yellow ink (ly), and black ink (K); the number of gradation levels is reduced from 256 to two for each color component in step S600; and a rasterization procedure compatible with the nozzles of the print head 21 is performed and data are outputted in step S700.

The routine performed in the high-speed mode entails resolution reduction and density separation in a specific manner after conversion of RGB to CMYK, but not direct conversion from RGB to C, lc, M, lm, Y, ly, K. The resolution reduction routine and density separation routine are described below.

B-5. Resolution Reduction Routine

Figure 28:
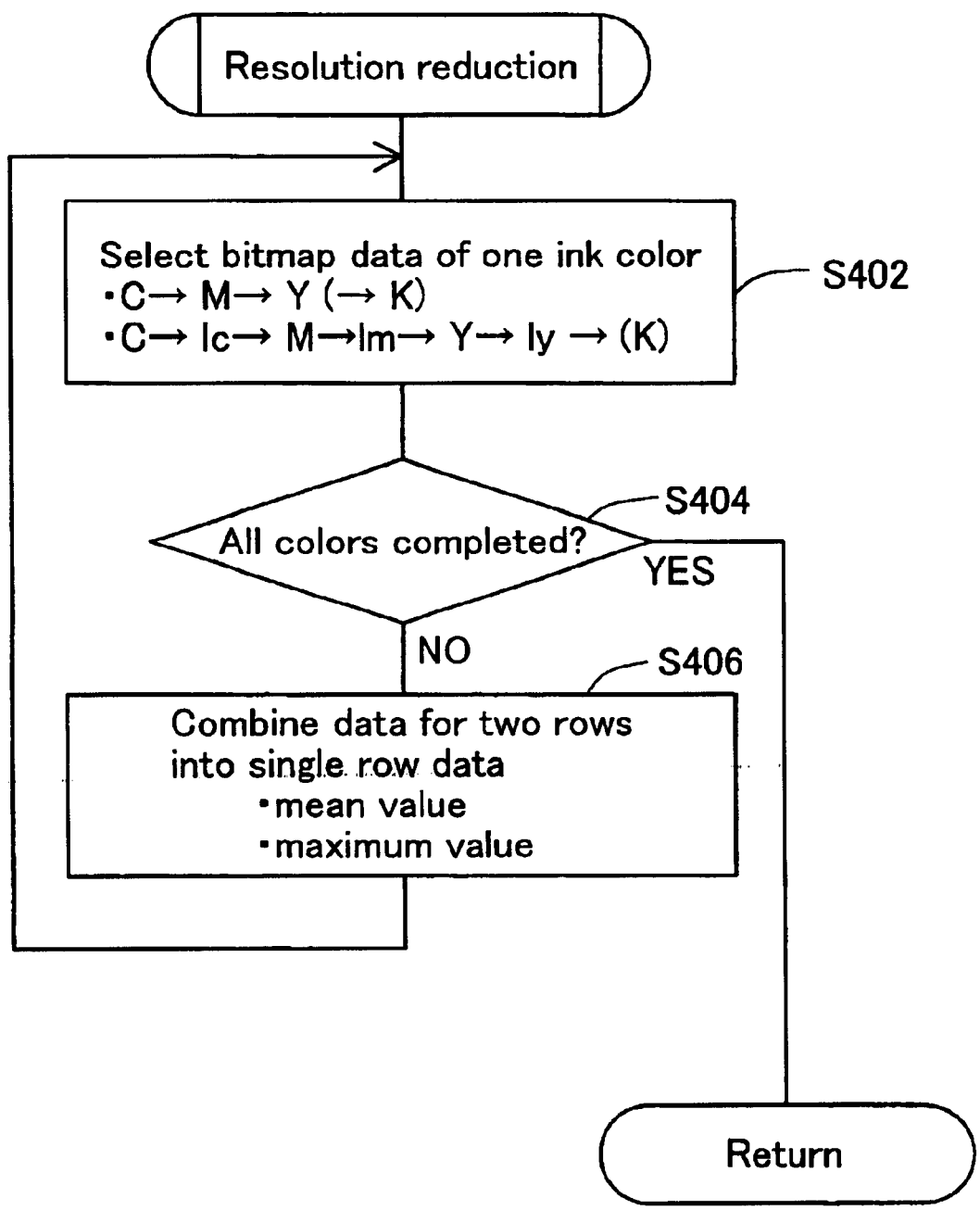
FIG. 28 is a flowchart of the resolution reduction routine.

FIG. 28 is a flowchart of the resolution reduction routine. According to this routine, resolution is reduced by combining two pixel rows into a single pixel row with respect to cyan, magenta, and yellow whose nozzle pitch is 180 dpi but not 360-dpi.

One color is selected in sequence in step S402, and pixel data for two rows are combined into single-row pixel data with reference to the bitmap data for the selected color in step S406 until it is determined that the procedure has been completed for all the colors in step S404.

For example, the following expression can be obtained for the image data with 640×480 pixels when pointer variables i and j are used, wherein i varies in a loop between 0 and 639, and j varies in a loop between 0 and 239. In the formula, D0(i, j) denotes original image data or high-resolution image data, and D1(i, j) denotes converted image data or low-resolution image data.

$$D1(i, j) = \frac{D0(i, j) + D0(i, j+1)}{2}$$

Specifically, mean values are calculated when two-row data are combined into single-row data. In principle, the resolution reduction routine is performed for cyan, magenta, and yellow. As a general rule, there is no need to perform the routine for black, but there is no particular need to prohibit this routine either. In particular, this routine is effective in cases in which two black inks K1, K2 having different densities are used in the two nozzle arrays provided for the black ink.

FIG. 29 depicts a specific example of a resolution reduction routine. The uppermost tier depicts the image data at 360 dpi, with an example of even- and odd-numbered pixel rows. The image data at three column positions containing particular numerals comprise the pairs "140" and "100," "255" and "155," and "128" and "0." Calculating mean values in the above-described manner yields the values "120," "205," and "64," as shown in the middle tier in the drawing.

The above routine was described with reference to averaging, which is adopted in order to give preference to gradation reproduction. It is also possible, however, to use maximum values when combining two-row image data into single-row image data. Specifically, assuming that D0(i, j)≧D0(i, j+1) will give D1(i, j)=D0(i, j), whereas assuming that D0(i, j)<D0(i, j+1) will give D1(i, j)=D0(i, j+1).

Adopting averaging during conversion of two-row image data to a single row may result in producing broken lines or deleting underlines created during the compilation of single-row image data. Adopting maximum values makes it less likely that underlines will be deleted. The reason is that the image data at this point indicate a so-called gradation level for each ink. In this case, the amount of ejected ink increases with an increase in the numeric values of the image data. The same effect can be obtained by adopting minimum values for image data expressing luminous brightness, because the luminous brightness increases with an increase in the numeric values of the image data.

The lower tier in FIG. 29 shows results obtained using such maximum values. In contrast to the upper tier, in which the data are "140" and "100," "255" and "155," and "128" and "0," the corresponding values in the lower tier are "140," "255," and "128."

It is also possible to switch between mean and maximum values after determining whether the printed image is based on characters or picture images.

Reducing the resolution in this manner leaves behind 360-dpi data for the black color and produces 180-dpi data for the cyan, magenta, and yellow hues.

B-6. Density Separation

Figure 30:
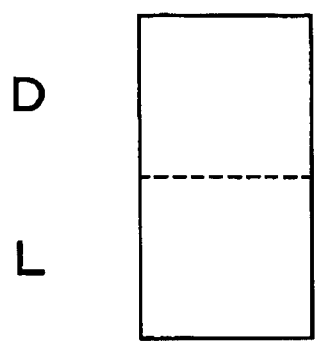
FIG. 30 is a diagram depicting the manner in which dark and light color inks are arranged in the vertical direction to form a single pixel.

As shown in FIG. 25, dark and light color ink nozzles each capable of printing at 360 dpi are provided for all ink hues except black, and nozzle positions for the dark and light inks are offset by a dot pitch of 360 dpi in relation to each other in the sub-scanning direction. FIG. 30 shows a low resolution pixel including two high resolution pixels arranged in the vertical direction or the sub-scanning direction. The low resolution pixel has a horizontal resolution of 360 dpi and a vertical resolution of 180 dpi. A nozzle pair including a dark ink nozzle and a light ink nozzle can eject ink drops on this low resolution pixel in the same scan pass. Desired print density represented by the original image data will not be obtained in this case because dark color ink cannot be deposited on one of the two high resolution pixels within each low resolution pixel. With this positional relationship, however, dot formation on each low resolution pixel can be accomplished in a single scan pass through the use of the nozzle pair. A tradeoff is commonly sought between image reproducibility and increased printing speed, so this approach is adequate for use in high-speed printing.

Figure 31:
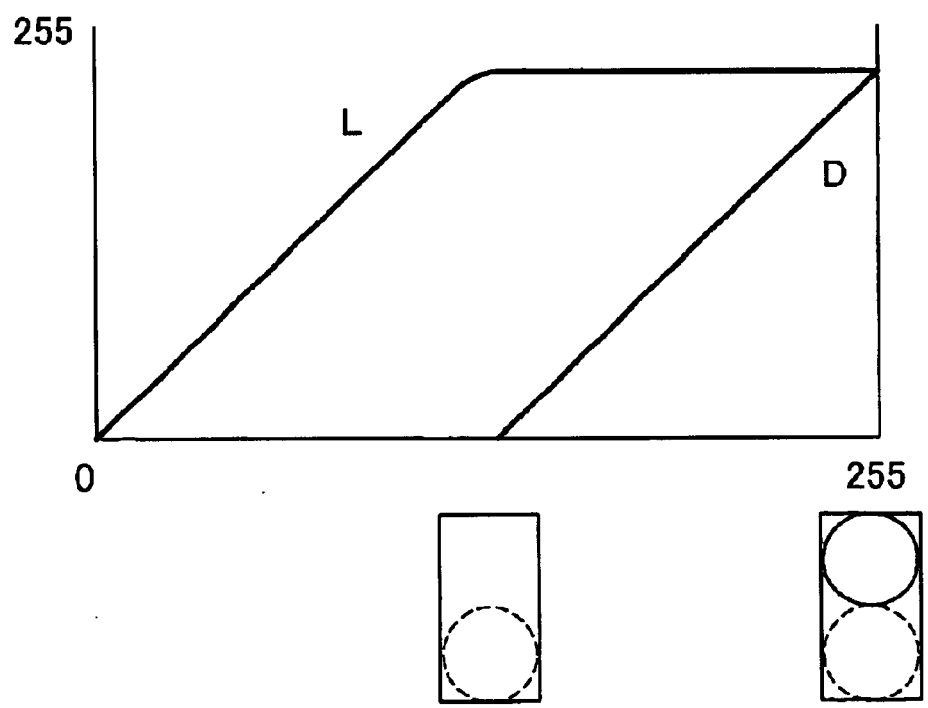
FIG. 31 is a diagram depicting a density separation map corresponding to the number of ink densities.
Figure 32:
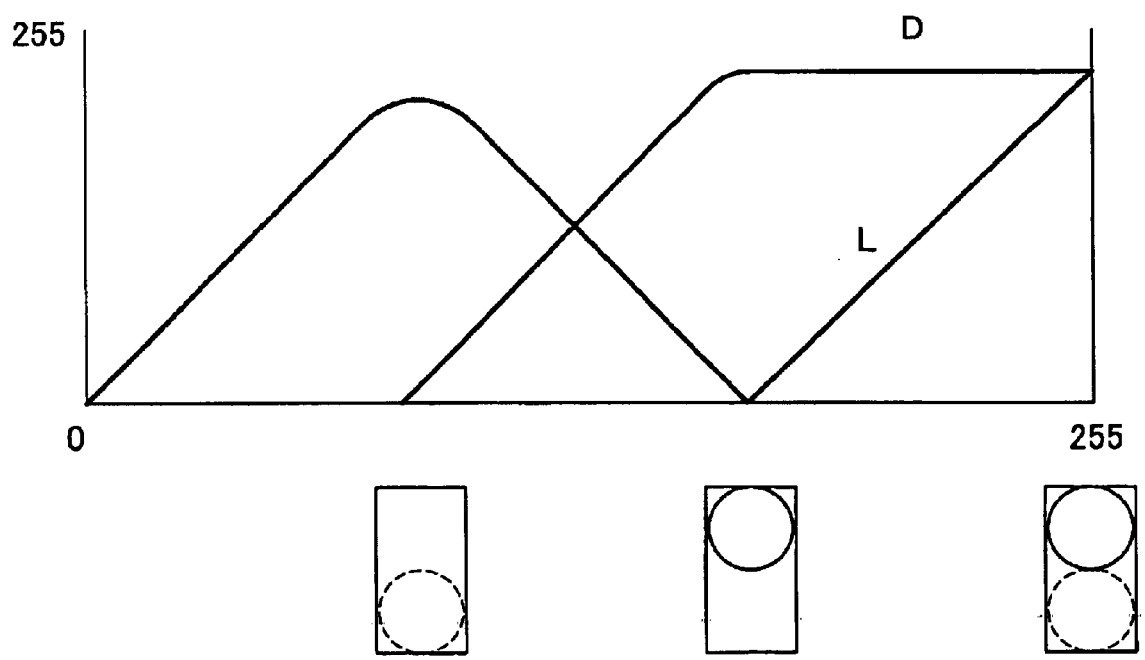
FIG. 32 is a diagram depicting a density separation map whereby groups of ink densities are combined.

Two types of techniques can be applied in the density separation wherein one component of image data for a particular ink hue is separated into two data components for dark and light inks of the same hue. FIGS. 31 and 32 schematically depict the relation between the original data component and the separated data components. The abscissa denotes the original data component, and the ordinate denotes the separated data component. The left side end of the abscissa corresponds to an ink gradation level of 0, and the right side end corresponds to an ink gradation level of 255.

In the first example shown in FIG. 31, the light-ink data component increases with the ink gradation level, and after the light-ink data component reaches its maximum value the dark-ink data component increases with the ink gradation level. The light-ink data component remains at its maximum even when the dark-ink data component starts to increase. According to this density separation, the number of possible dot formation variations in each low resolution pixel is two, which is equal to the number of inks having the same hue and different densities.

In the second example shown in FIG. 32, when the dark-ink data component increases with the ink gradation level after the light-ink data component reaches its maximum value, the light-ink data component decreases with the increase of the dark-ink data component. The light-ink data component increases again after the dark-ink data component reaches its maximum value. Both dark- and light-ink data components finally reach their maximum values. According to this density separation, the number of possible dot formation variations in each low resolution pixel is three, which is the number of combinations of inks on each low resolution pixel. The density separation is also referred to as "color component separation" in this specification.

Figure 33:
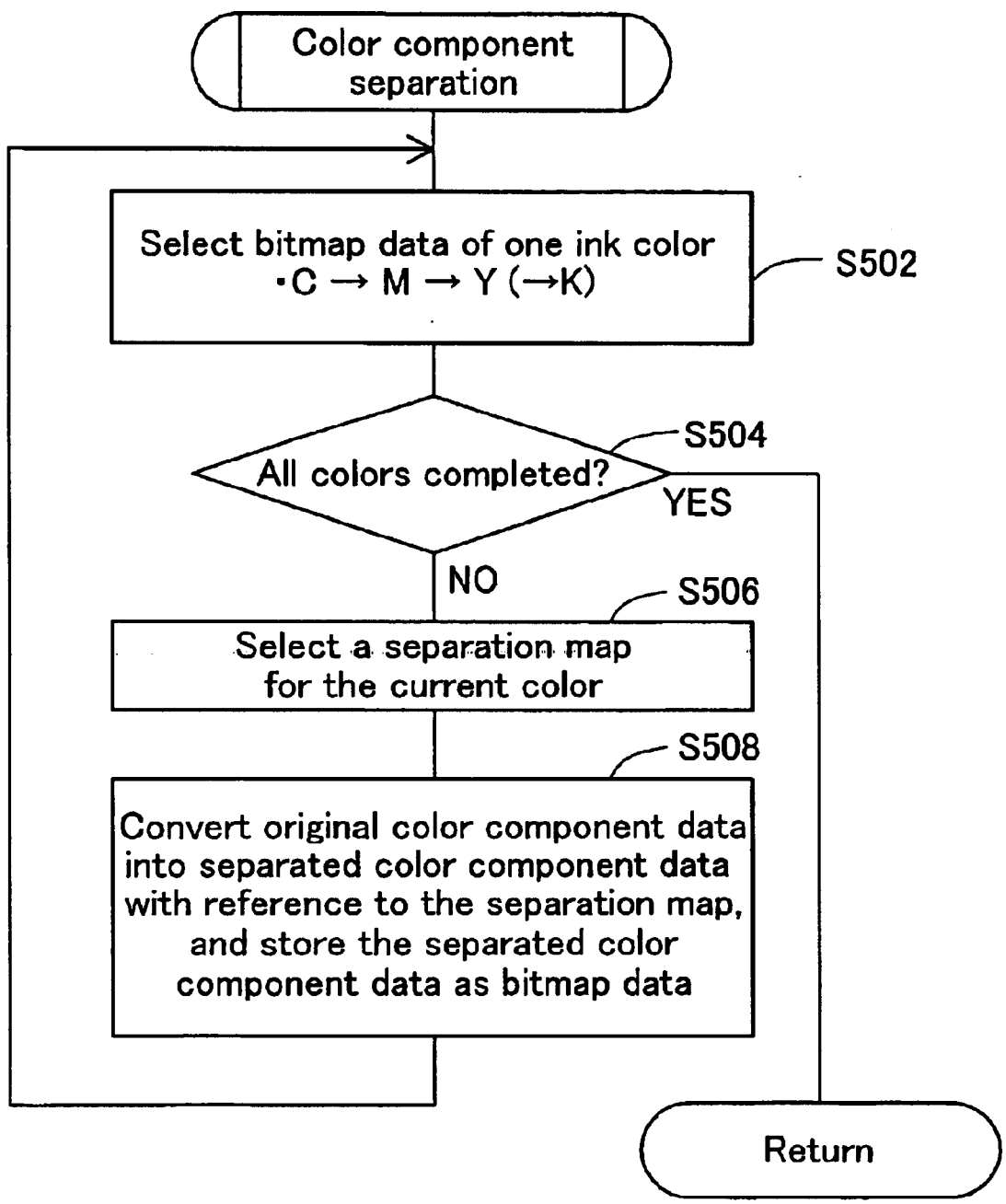
FIG. 33 is a flowchart depicting the density separation routine.

FIG. 33 is a flowchart of the density separation. One ink color hue is selected in step S502, and it is judged in step S504 if all color hues are processed. A separation map for the selected color hue is selected in step S506. The basic separation maps shown in FIGS. 31 and 32 can be used for the density separation, but the separation maps are preferable fine-tuned to prevent tone jumps. FIG. 34 shows the structure of such map data in the form of table in which light-color data (L) and dark-color data (D) are related to the original single color data. In step S508, the table is referenced by the original bitmap data, and the corresponding light-color data (L) and dark-color data (D) are written as new bitmap data.

At this point, 360-dpi bitmap data are prepared for the black ink (K), and 180-dpi bitmap data are prepared for each of the following inks: cyan ink (C), light cyan ink (lc), magenta ink (M), light magenta ink (lm), yellow ink (Y), and light yellow ink (ly).

Since each type of bitmap data still has data with 256 gradation levels, the results are converted to two-level data in step S600 (FIG. 27) prior to printing, and are outputted as print data in conformity with each of the nozzles in the print head 21 while rasterization is performed in step S700.

B-7. Operation of Second Embodiment

Figure 35:
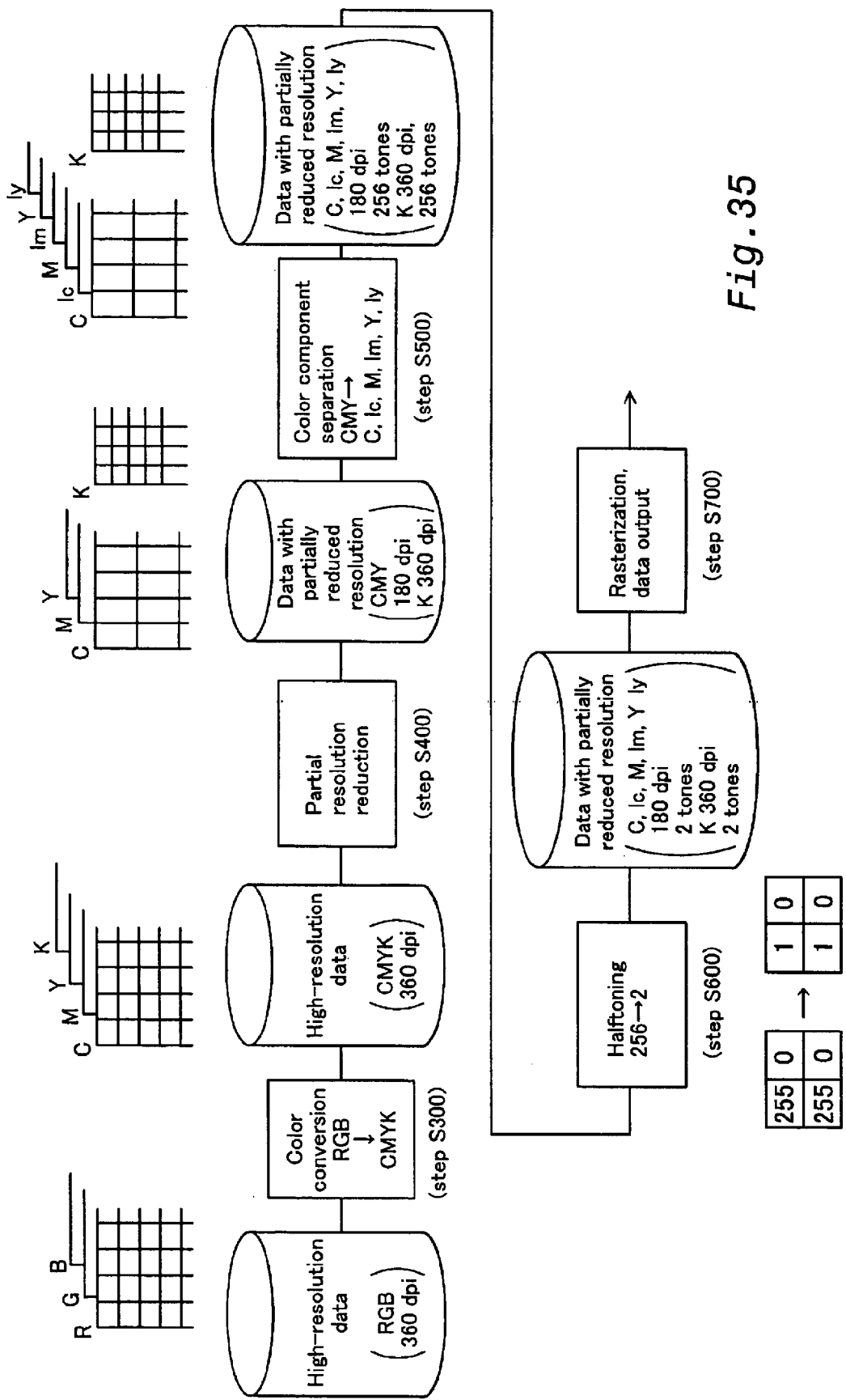
FIG. 35 is a diagram schematically depicting the print control routine.

The information outputted by the operating system 312a to the printer driver 312c during high-speed mode printing comprises print command data for each of the RGB colors (256 gradation levels at 360 dpi). A description thereof will now be given with reference to FIG. 35.

Upon receipt of the print command data (step S100), the printer driver 312c develops the print command data to RGB bitmap data (step S200) and then converts the colors to the CMYK color space (step S300).

Resolution is then reduced (step S400) by a routine in which two-row image data related to cyan, magenta, and yellow hues (but not the black) are combined into one-row image data, and a specific density separation map is then used for each color hue to divide the results into data for dark color inks and data for light color inks (step S500).

Bitmap data with 256 gradation levels at 360 dpi are thereby created for the black ink, and bitmap data with 256 gradation levels at 180 dpi are created separately for dark and light inks of cyan, magenta, and yellow hues, respectively.

The 256 gradations are subsequently converted to two gradations, made into dot on-off data (step S600), rasterized, and outputted to the color printer 317b (step S700).

Figure 36:
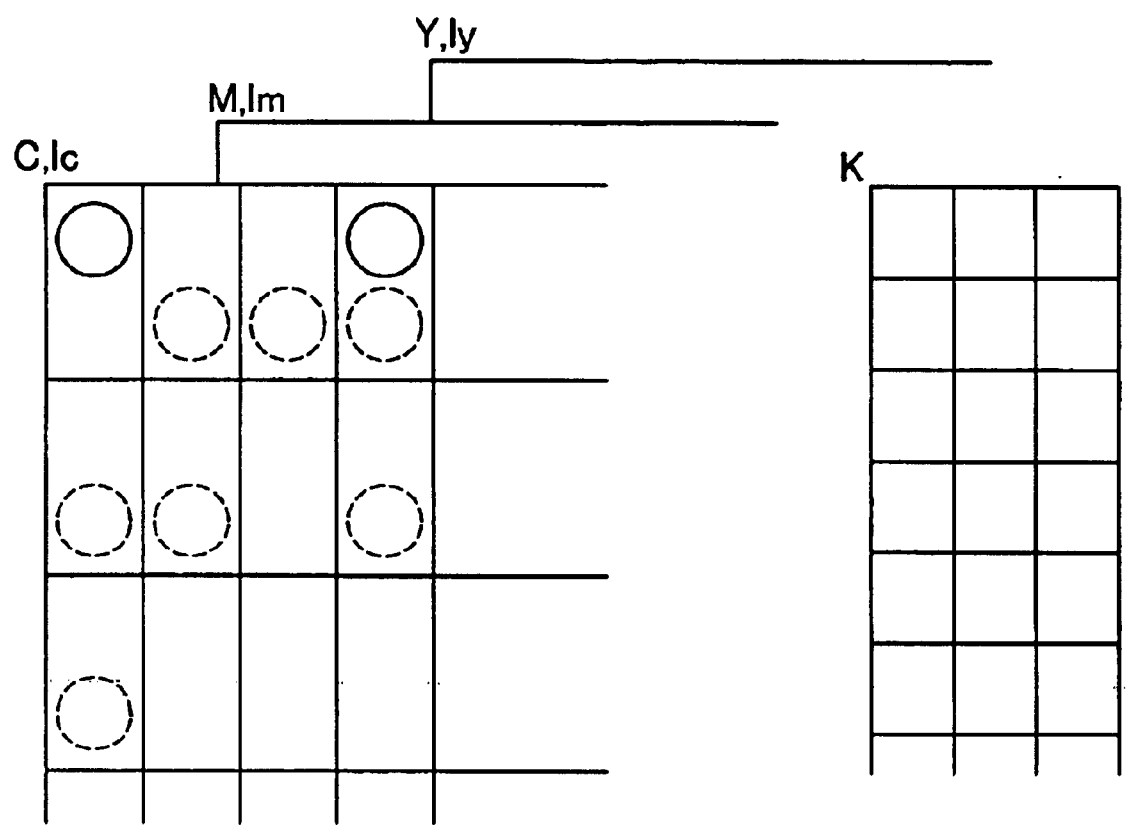
FIG. 36 is a diagram depicting the manner in which dots are formed by high-speed printing.

Although initially the color printer 317b was designed to receive 360-dpi data with two gradations and to perform printing operations in two scan passes for each scan line, adopting the above-described high-speed mode printing allows the printing operations to be performed in a single scan pass by using the entire array of staggered nozzles provided to the print head 321. FIG. 36 shows three pixel planes for low-resolution pixel data with respect to cyan (C, lc), magenta (M, lm), and yellow (Y, ly), and another pixel plane for high-resolution pixel data with respect to black ink (K).

As described with reference to FIG. 25, two nozzle arrays are provided in a staggered arrangement to the black ink (K) and also to each of the other hues. Specific inks can be ejected onto the pixels arranged in a 360-dpi dot matrix (FIG. 36) by outputting drive signals with an ejection timing that conforms to each pixel. Because two nozzle arrays are prepared for the same black ink, the black ink is ejected onto 360-dpi pixels irrespective of whether an odd- or even-numbered pixel row is involved, but with the inks of other hues, dark color inks are ejected solely onto the odd-numbered rows at 360 dpi, and light color inks are ejected solely onto the even-numbered rows. Thus, all 360-dpi pixels on two pixel rows can be filled during a single scan pass by a nozzle pair, and printing can be speeded up despite some pixels are only printed with dark color inks while other pixels are only printed with light color inks.

As described above, two high-resolution pixels adjacent to each other in the vertical direction constitute a single low-resolution pixel, and the two high-resolution pixels within each low-resolution pixel are serviced by a dark color ink nozzle and a light color ink nozzle, respectively. In more general terms, a plurality of high-resolution pixels within each low-resolution pixel may be serviced by a plurality of nozzles for inks of the same hue and different densities, respectively.

B-8. Summary

In the color printer 317b, which is provided with a plurality of nozzles arranged in a staggered fashion to allow ink drops of dark and light color inks to be ejected onto each high-resolution pixel, the resolution is reduced (step S400) by combining together data related to two adjacent pixel rows, a specific type of density separation is performed (step S500), and dark and light ink nozzles eject ink drops onto the corresponding pixels in the two pixel rows to allow the pixels in the two rows to be treated in the same manner as a single pixel. This approach makes it possible to establish a high-speed printing mode by reducing the number of scan passes for ejecting ink drops at a high resolution.

B-9. Modifications (1) First Modification

The first modification omits the density separation routine performed in step S500. The density separation is not performed, and the 180-dpi data related to each of the cyan, magenta, and yellow hues (whose resolution is reduced in step S400) are used as-is for the dark-color data related to each of the hues. The light color inks lc, lm, ly are not used in printing accordingly.

Dispensing with the density separation routine in this manner makes it possible to accelerate the process and is particularly effective in cases in which the CPU 312e in the computer 312 has low processing power. Printing with dark color inks alone is sufficient if graininess, which can be improved by the use of light color inks, is not a concern. This approach also reduces printing costs because of nonuse of light color inks. It can be seen in FIG. 36 that the dark color inks for C, M, Y are ejected as ink drops solely on odd-numbered rows at 360 dpi. For this reason, slight banding in even-numbered rows may occur during solid printing even if the ink dots are somewhat larger than 360-dpi pixels. Such banding can be reduced further if the ink drops can be made larger.

(2) Second Modification

The above second embodiment was described with reference to cases in which the density separation routines was performed for each of cyan, magenta, and yellow hues after the colors have been converted from an RGB space to a CMYK space. The color conversion and density separation are performed with reference to respective lookup tables, and two LUTs must be referenced when the above approach is adopted. For this reason, the second modification is aimed at completing the process by referencing a lookup table only once.

Figure 37:
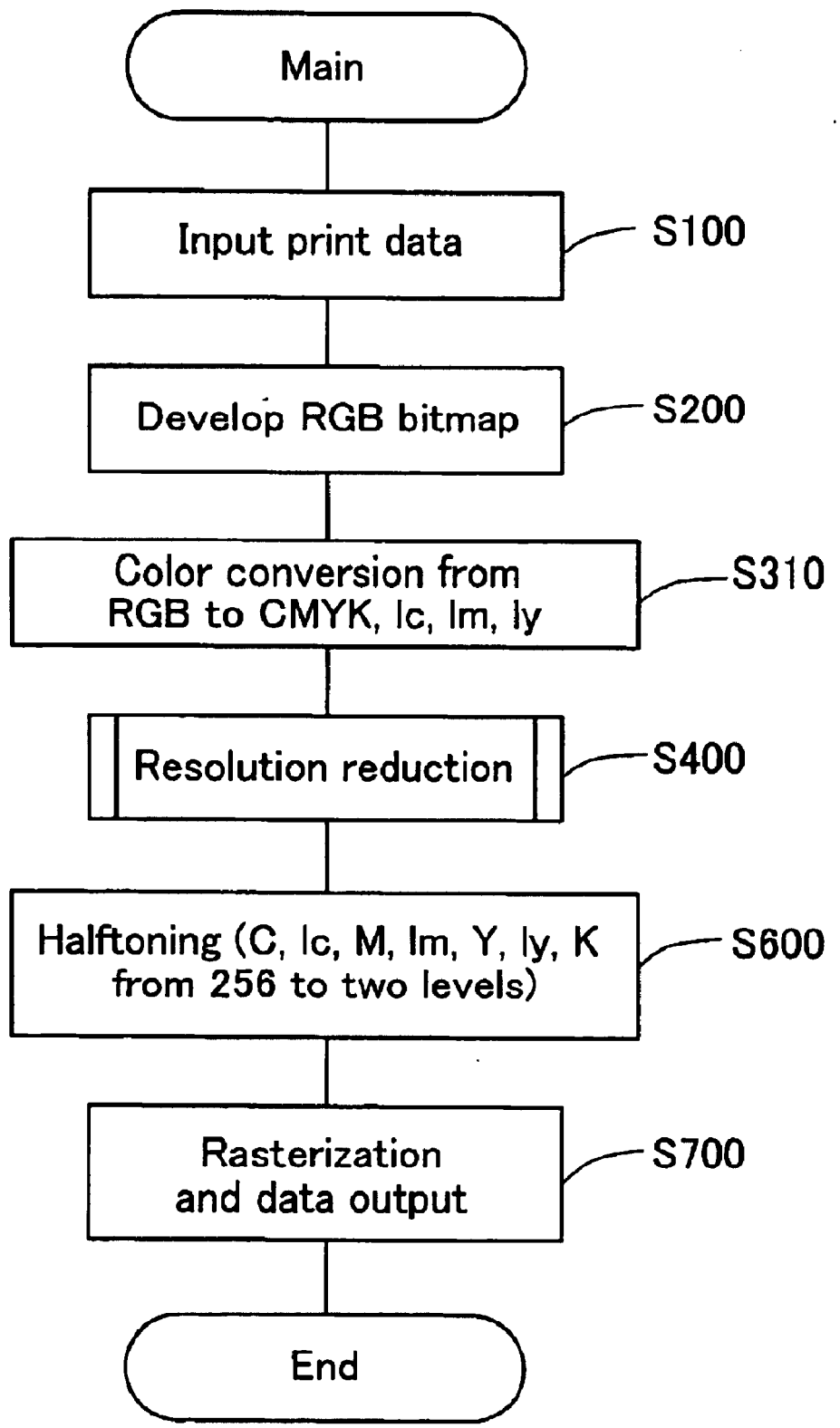
FIG. 37 is a flowchart depicting the print control routine pertaining to the second modification.

FIG. 37 is a flowchart of the second modification. Print command data are entered in step S100 and developed into bitmap data in the RGB space in step S200. The subsequent step S310 is performed differently from the second embodiment in that the colors are converted from RGB in a single operation into the following seven colors: cyan, magenta, yellow, light cyan, light magenta, light yellow, and black. The lookup table used in this case is obtained by combining the two LUTs used in steps S300 and S500 in the procedure of FIG. 27. The lookup table used in the second modification is produce by combining a first lookup table for the color conversion from RGB to four colors of CMYK, and a second lookup table for the density separation of (C→C, lc), (M→M, lm), and (Y→Y, ly).

Resolution is then reduced in step S400 in the same manner as in the second embodiment after the color conversion is completed. Halftoning is then performed in step S600 without any density separation, and rasterization and data output are performed in step S700.

The characteristics of the second modification will now be compared with those of the second embodiment. The second modification is usually advantageous in terms of speed. This is because the LUT need to be referenced only once instead of twice. Although the LUT needs to be referenced a fewer number of times, it is also necessary to reduce the resolution of the bitmap data for light color inks, so the resulting increase in the volume of processing may negate the advantages of this approach in terms of speed under certain conditions.

The second modification is also disadvantageous in terms of gradation reproduction. It can be seen in FIG. 29 that the 360-dpi image data comprises the values 140 and 100, and that each of these values has corresponding optimum values of dark and light color ink data. Density separation does not necessarily constitute a linear relation between the input and output because, rather than merely calculating ink dot density values, it involves performing actual fine-tuning to exclude possible gradation jumps. Although a value of 120 is obtained as the image data that result from performing averaging with emphasis on gradation reproduction, the density separation values consistent with this image data (120) does not necessarily agree with the results of the density separation obtained at 360 dpi because the density separation routine does not constitute a linear relation. The adverse effect on gradation reproduction becomes particularly pronounced when the maximum-value selection scheme is used and the resolution is reduced in order to prevent underline from being deleted.

Consequently, the second modification is more effective when the emphasis is on higher speed, and the second embodiment is more effective when efforts are made to reduce quality degradation while maintaining high speed.

(3) Third Modification

The second modification, while allowing some latitude in terms of adopting either maximum values or mean values during resolution reduction, still requires one of the two to be constantly maintained. The third modification entails varying the adopted values in accordance with ink dot density.

Figure 38:
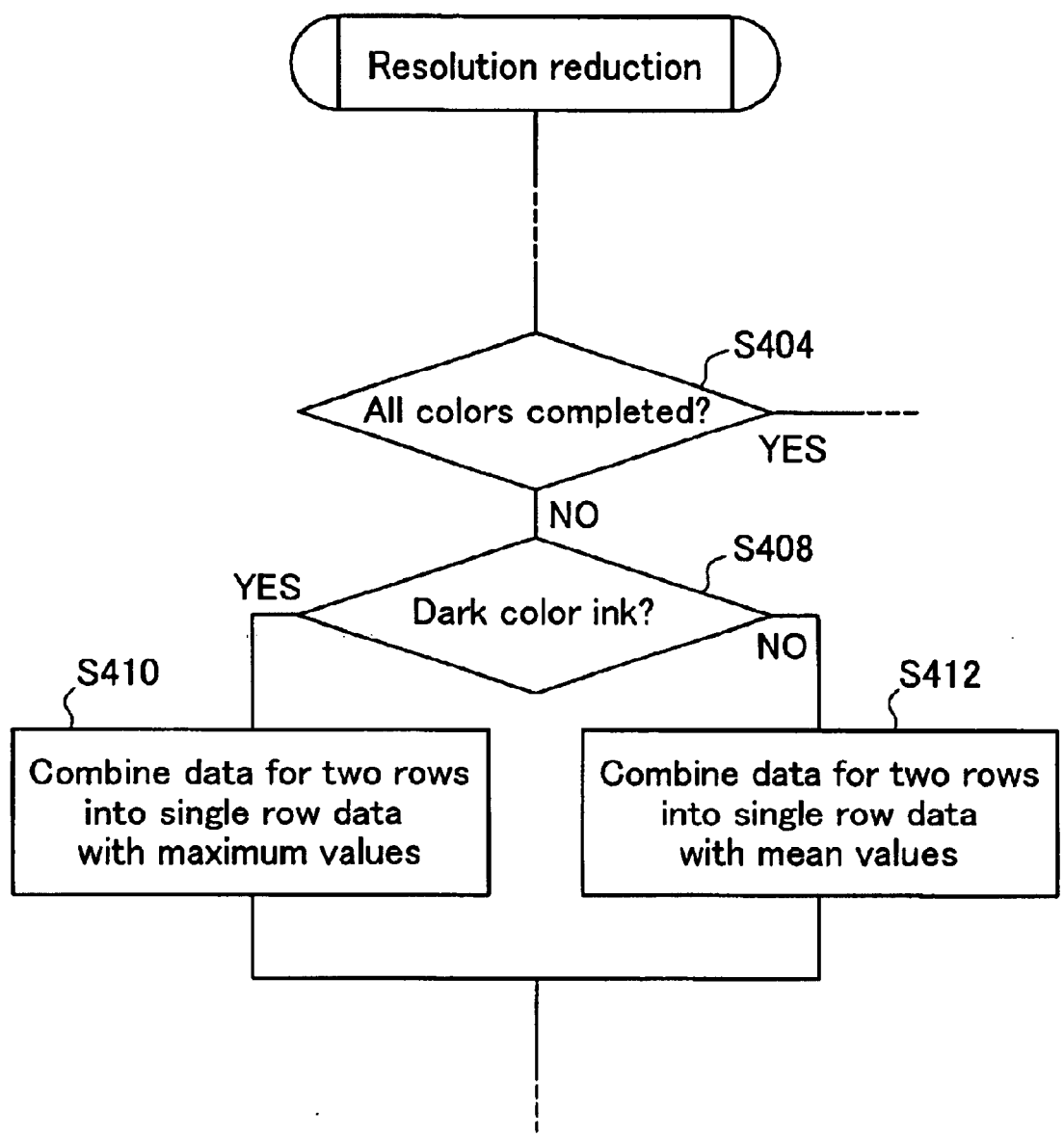
FIG. 38 is a flowchart depicting the modified resolution reduction routine performed in accordance with the third modification.

FIG. 38 depicts a flow chart of resolution reduction in the third modification, which corresponds to step S406 shown in FIG. 28. It is judged if a target of processing is dark color ink or light color ink in step S408. Maximum values are adopted as the reduced resolution data for dark color in step S410, and mean values are adopted for light color in step S412.

The fact that the image data related to dark color inks have been allocated indicates the presence of dark areas, and the disappearance of dots (which occurs similarly to the disappearance of underline) in these areas is apt to have an adverse effect on picture quality.

The fact that the image data related to dark color inks have not been allocated suggests that the dark areas are absent (irrespective of whether the image data related to light color inks have been allocated), so putting emphasis on gradation reproduction rather than on preventing banding or the like from being caused by dot disappearance allows the desired picture quality to be maintained.

An effective approach would thus be to adopt the present modification, in which a resolution reduction technique is used depending on whether the image data are for dark color ink or light color ink. Although this example was described with reference to a case in which color inks having two different densities were adopted, the same applies to situations in which three or more color inks having the same hue and different densities are used, in which case the routines may be branched depending on whether the image data are for the maximum density ink or not.

(4) Fourth Modification

Figure 39:
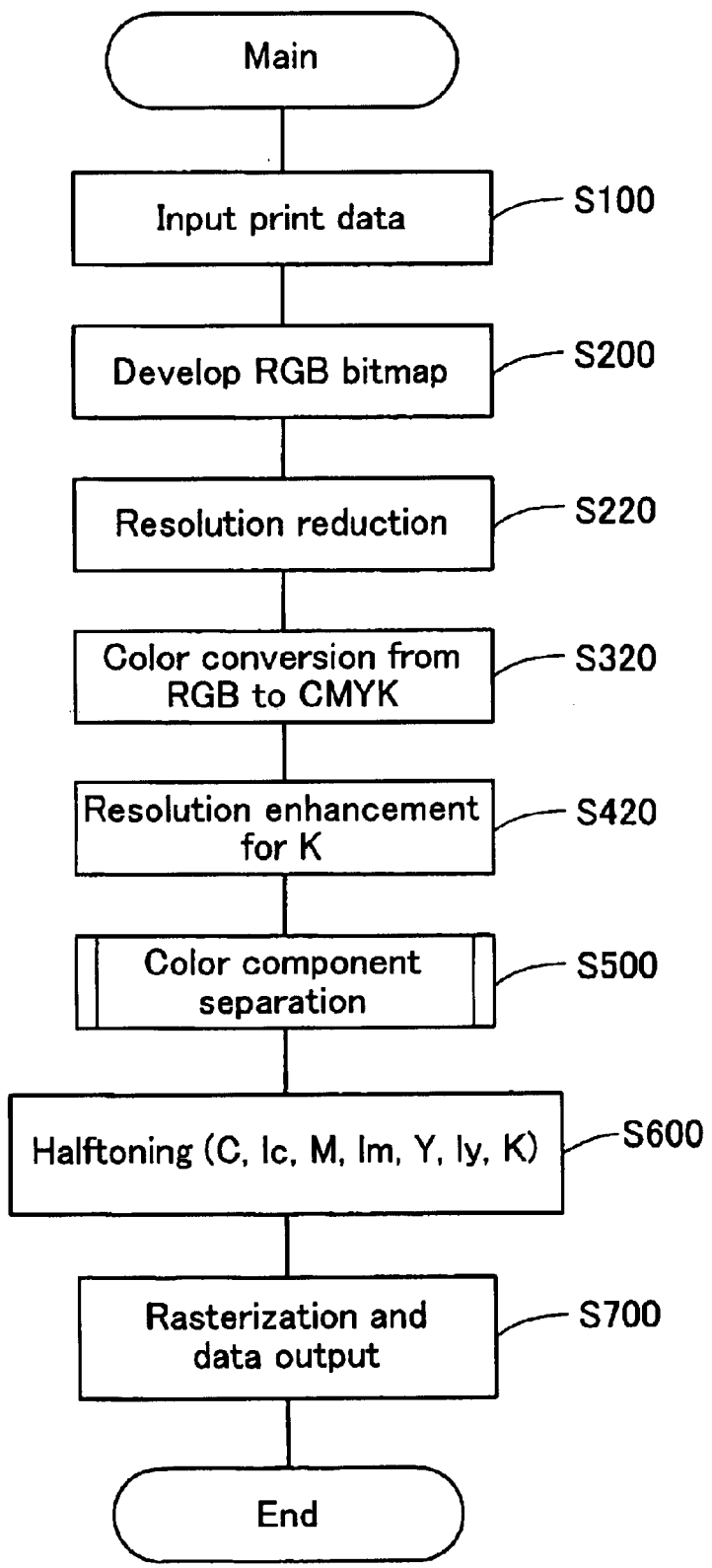
FIG. 39 is a flowchart depicting a print control routine pertaining to the fourth modification.

The fourth modification entails reducing the resolution in the RGB space. FIG. 39 is a flowchart of the fourth modification. Print command data are entered in step S100 and developed into bitmap data in the RGB space in step S200, whereupon resolution is reduced in step S220. The 360-dpi RGB image data are similar to the CMY image data in that image data for two rows are combined to image data for a single row. In the process, it is possible to adopt mean values in order to give preference to gradation reproduction, or to adopt a procedure for preventing underlines from being deleted at a later stage. In the latter case, minimum values are adopted for the image data related to two rows.

The RGB space is a color space for luminous brightness, and greater values of image data indicate brighter colors. Consequently, image data for expressing black underlines have low values, and the minimum values of the image data related to two rows are adopted in order not to delete underlines. FIG. 40 depicts conversion results obtained when minimum values are adopted in this manner, with the values "100," "155," and "0" obtained from the pairs "140" and "100," "255" and "155," and "128" and "0" in the upper tier of the data.

A color conversion of RGB→CMYK is then performed in step S320. The density separation is desired in this modification in order to print images with dark and light color inks on the basis of the 180-dpi RGB data. The conversion of RGB→CMYK is therefore carried out in step S320.

Since the black ink nozzles are capable of creating black dots at 360 dpi, resolution for black is again increased in step S420, and the CMY image data are subjected to the density separated in step S500. It is apparent that the arrangements shown in FIGS. 31 and 32 can be used as the density separation maps. Halftoning is then performed in step S600, and rasterization and data output are performed in step S700.

(5) Fifth Modification

Although the above second embodiment and its modifications were described with reference to cases in which two nozzle arrays were offset to be arranged in a staggered manner, the two nozzle arrays may not be offset to each other.

Figure 41:
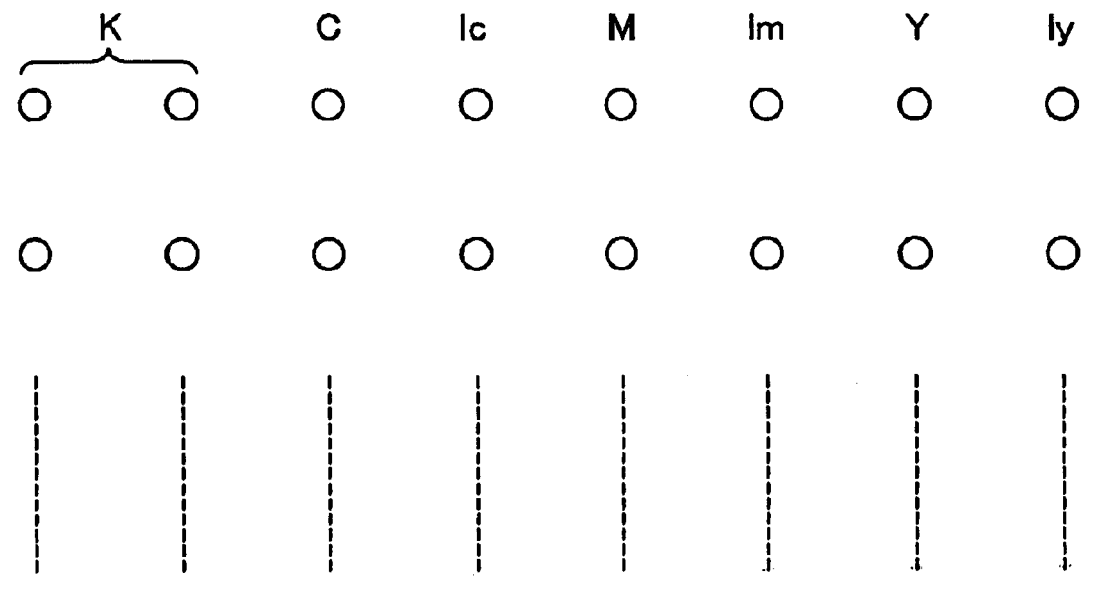

FIG. 41 depicts the nozzle arrays and the allocated ink colors. When a pair of nozzle arrays eject ink drops with the same timing in accordance with this arrangement, their positional relation is such that one of them deposits ink drops onto odd-numbered pixels, and the other deposits ink drops onto even-numbered pixels. In addition, since the two nozzle array for black ink eject the same black ink, all pixel positions on one scan line can be serviced by the two nozzle arrays. By contrast, other color hues have two kinds of inks of different densities and therefore two scan passes are required to complete dot formation on each scan line. The result is that such arrangements also allow black ink to be printed with about twice the speed of other color inks in ordinary printing mode.

Figure 42:
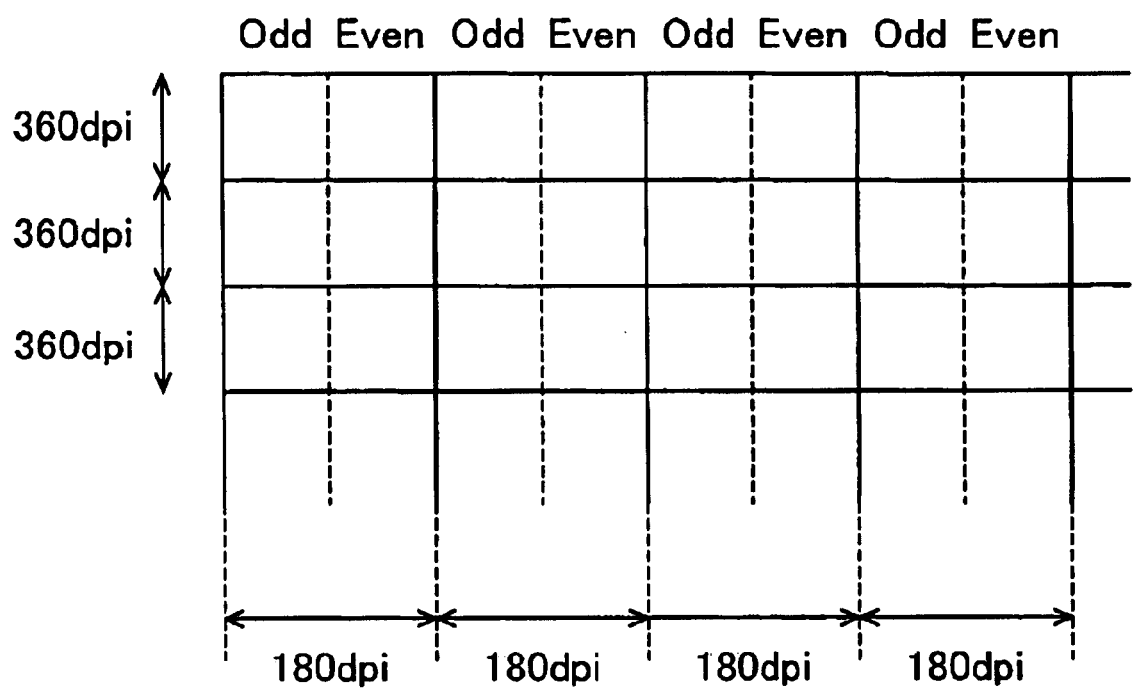
FIG. 42 is a diagram depicting the condition in which resolution is reduced by high-speed printing.
Figure 43:
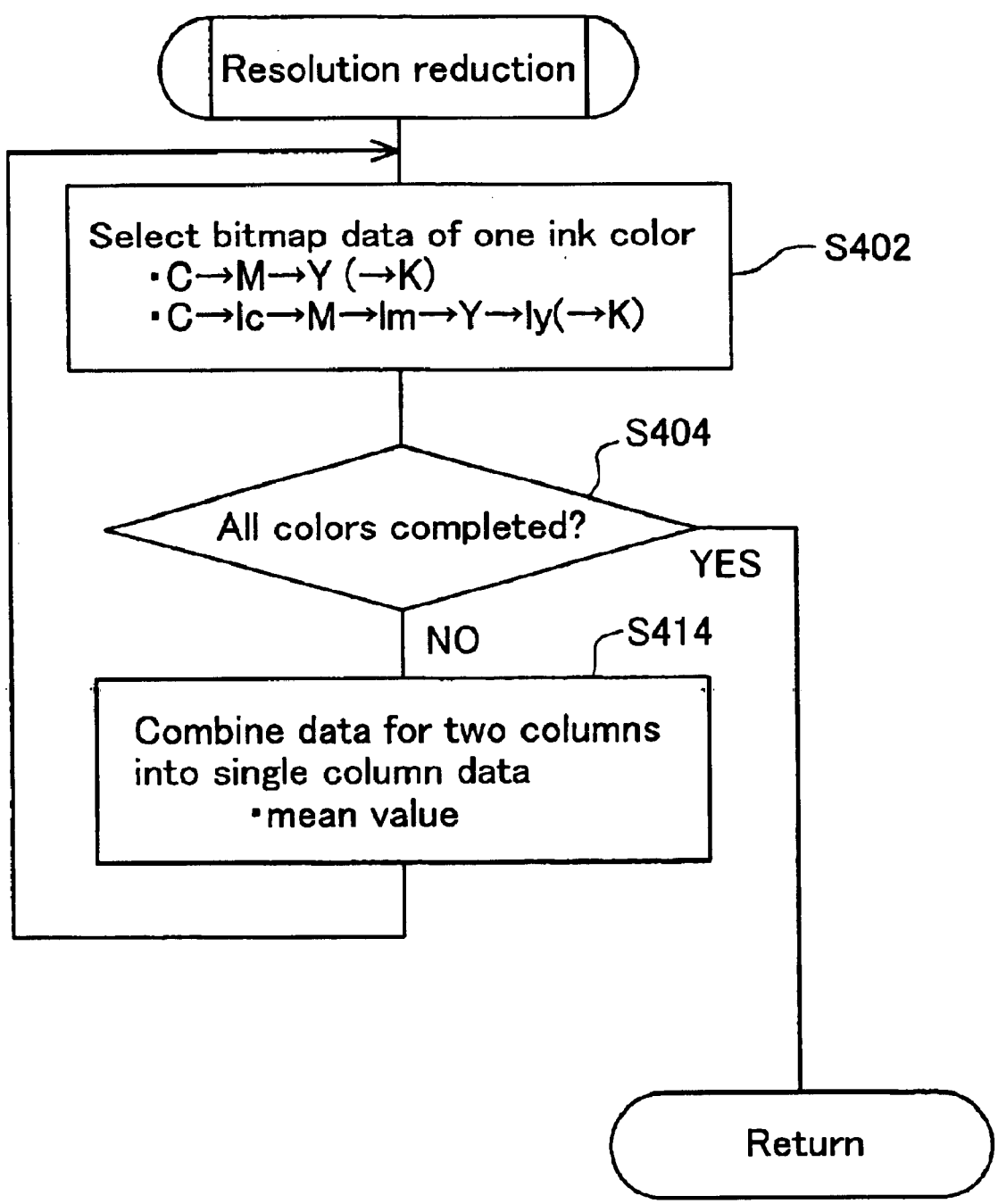
FIG. 43 is a flowchart depicting the resolution reduction routine of the fifth modification.

In the fifth modification, however, only one scan pass is performed on each scan line for all of CMYK. Specifically, the odd- and even-numbered pixels aligned in the main scanning direction are combined together and treated as a single low-resolution pixel, and printing is performed at a resolution of 180 dpi in the main scanning direction while the resolution in the sub-scanning direction is kept at 360 dpi, as shown in FIG. 42. The basic process flow of such high-speed printing is the same as in FIG. 27, and a routine such as the one shown in FIG. 43 is performed to reduce the resolution. The only difference from the resolution reduction routine shown in FIG. 28 is that a procedure in which two-column data are combined into a single column is performed in step S414 and that there is no need in this case to adopt maximum values.

FIG. 44 depicts 360-dpi image data before the resolution reduction. The example shown depicts the image data of an odd-numbered column (2n−1) and the image data of the subsequent even-numbered column (2n). FIG. 45 depicts 180-dpi image data after the resolution reduction. Combining two-column data into a single column reduces the number of pixels in the row direction in half, converts the image data of the preceding odd-numbered column (2n−1) and the image data of the even-numbered column (2n) into the image data of the n-th column while averaging the two values.

Density separation is then performed in step S500. The second embodiment concerned an example in which dark and light color ink dots were arranged in the vertical direction shown in FIG. 30. The fifth modification is different in the sense that the dark and light color ink dots are arranged in the horizontal direction, as shown in FIG. 42. There is, however, no substantial difference in picture quality, and the same density separation routine can be performed.

Halftoning is then performed in step S600, and rasterization and data output are performed in step S700.

(6) Sixth Modification

Although the second embodiment was described with reference to cases in which resolution reduction was performed on image data of 256 gradations, it is also possible to peform resolution reduction on data of a fewer number of gradations, such as dot data indicating whether or not dots are to be deposited onto each pixel. This approach has the advantage of providing higher speed through simplified procedures.

Figure 46:
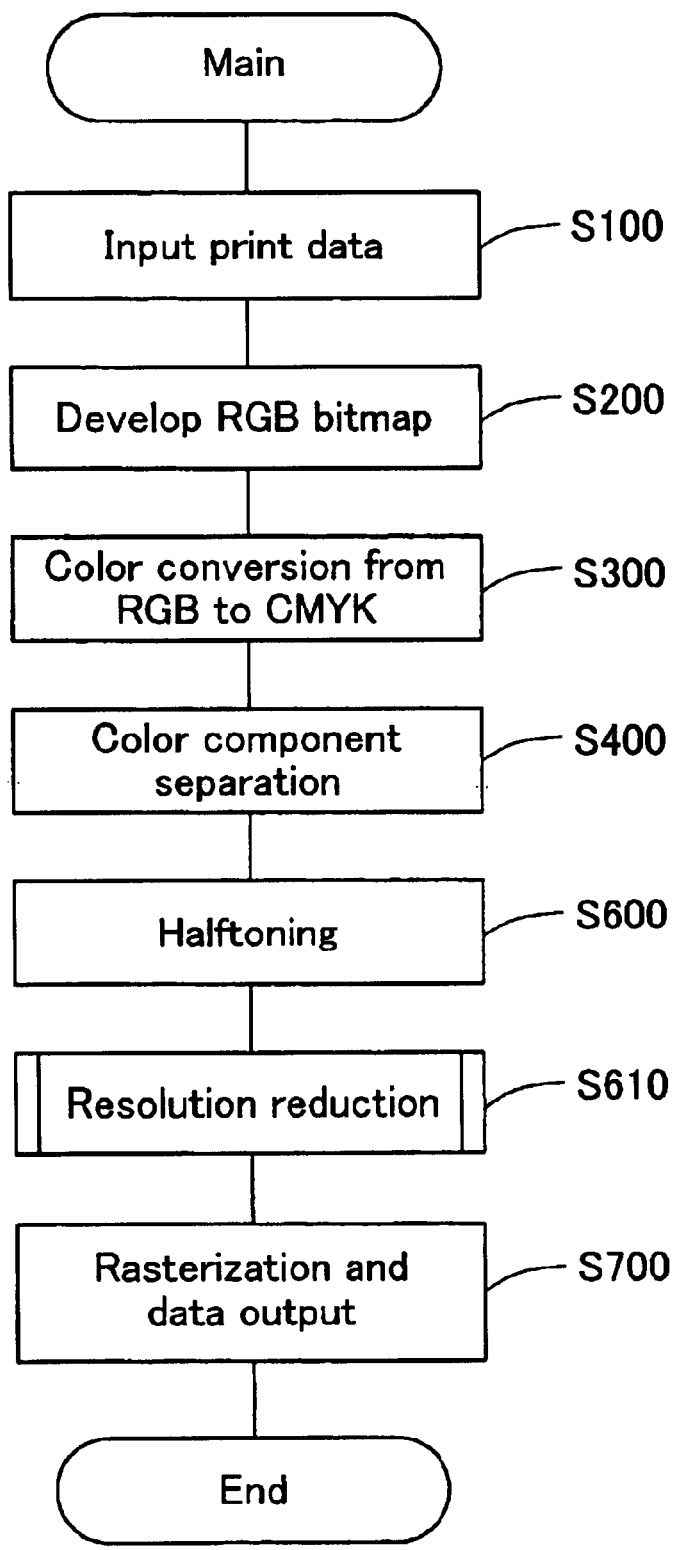
FIG. 46 is a flowchart depicting the print control routine of the sixth modification.
Figure 47:
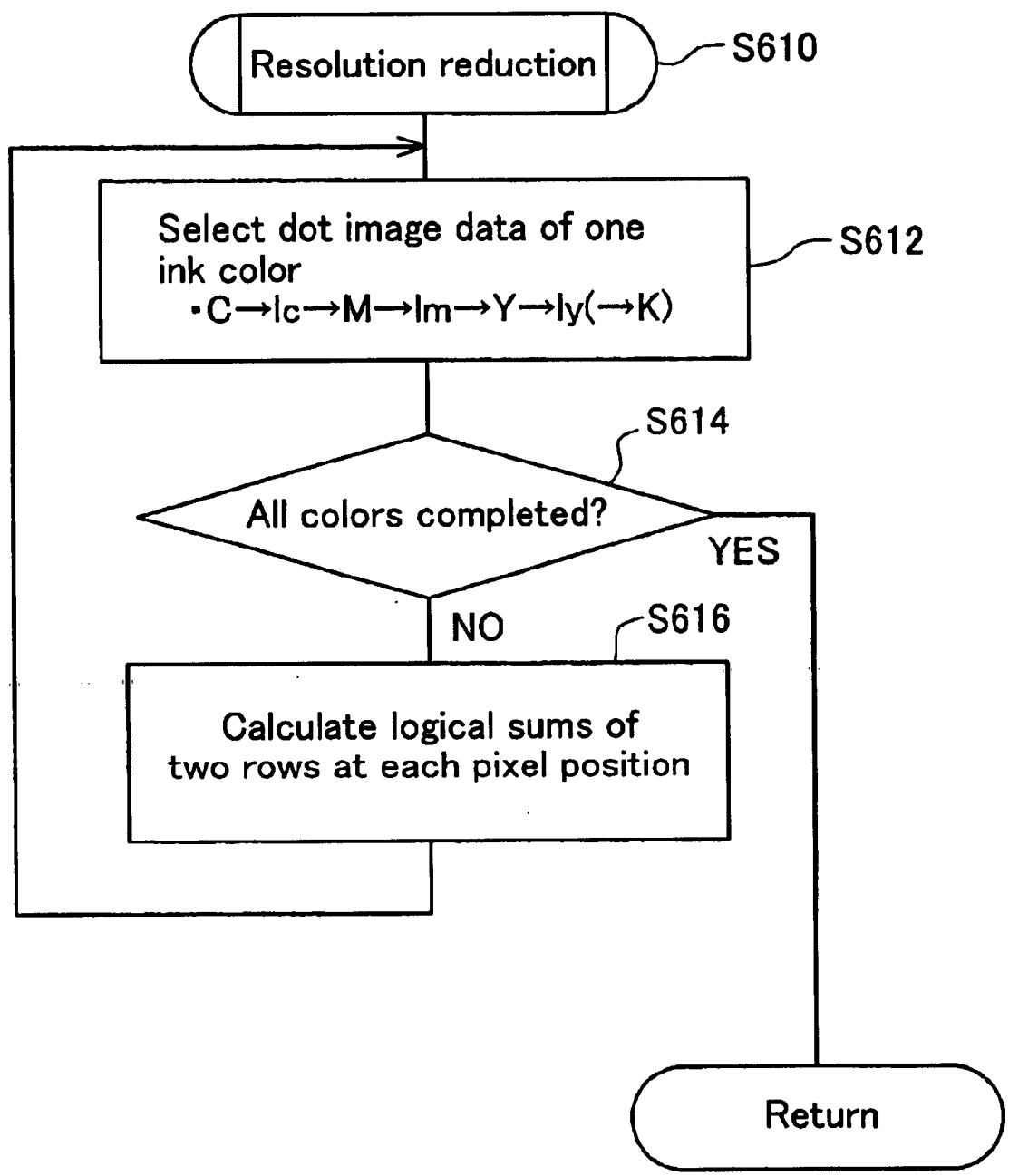
FIG. 47 is a flowchart depicting the resolution reduction routine of the same modification.

FIG. 46 schematically depicts the flow of a high-speed printing procedure. As shown in the drawing, resolution is reduced in step S610 after halftoning is performed in step S600. The image data that have undergone step S600 are bi-level data indicating whether individual color inks are to be deposited as dots on individual pixels. The resolution reduction routine of step S610 entails calculating logical sums for the bi-level data related to the two pixel rows in step S616 while sequentially selecting one target color for processing in steps S612 and S614, as shown in FIG. 47.

Figure 48:
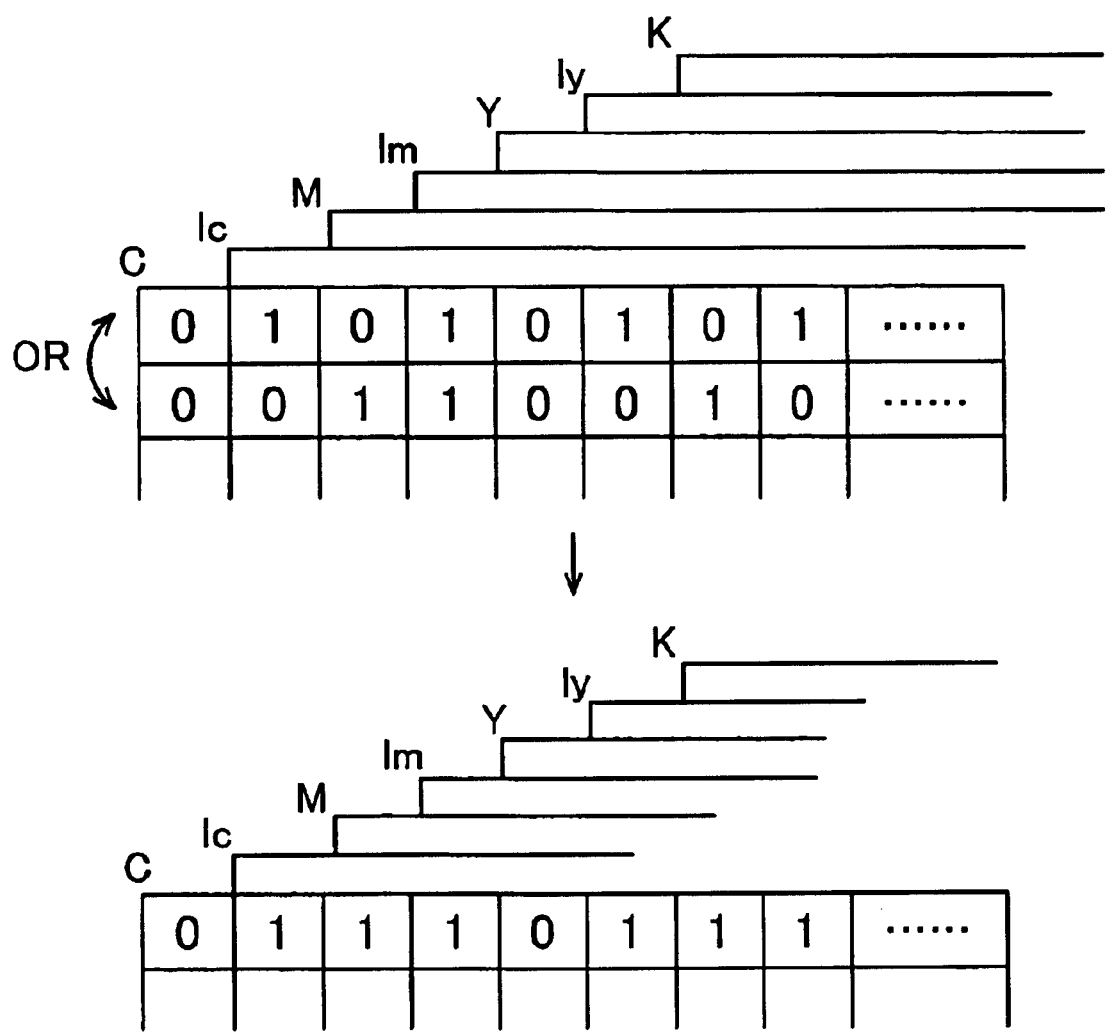
FIG. 48 is a diagram depicting variations in the dot images in which the resolution reduction routine is reflected.

FIG. 48 depicts an example of logical summation. Sequentially calculating logical sums starting from the top bit creates data of "01110111 . . . " for cyan when original data in the first and second rows are "01010101 . . . " and "00110010 . . . ", respectively.

The same calculations are subsequently performed for light cyan. Consequently, the resolution of dot images for cyan and light cyan is reduced, each ink is assigned a single pixel row, and two pixel rows are printed with the corresponding inks of cyan and light cyan, respectively. It is apparent that the presence of staggered nozzle arrays allows two adjacent pixel columns to be printed in a single scan pass.

Printing can be speeded up because logical sums can be calculated extremely rapidly by the CPU 12e.

(7) Seventh Modification

Figure 49:
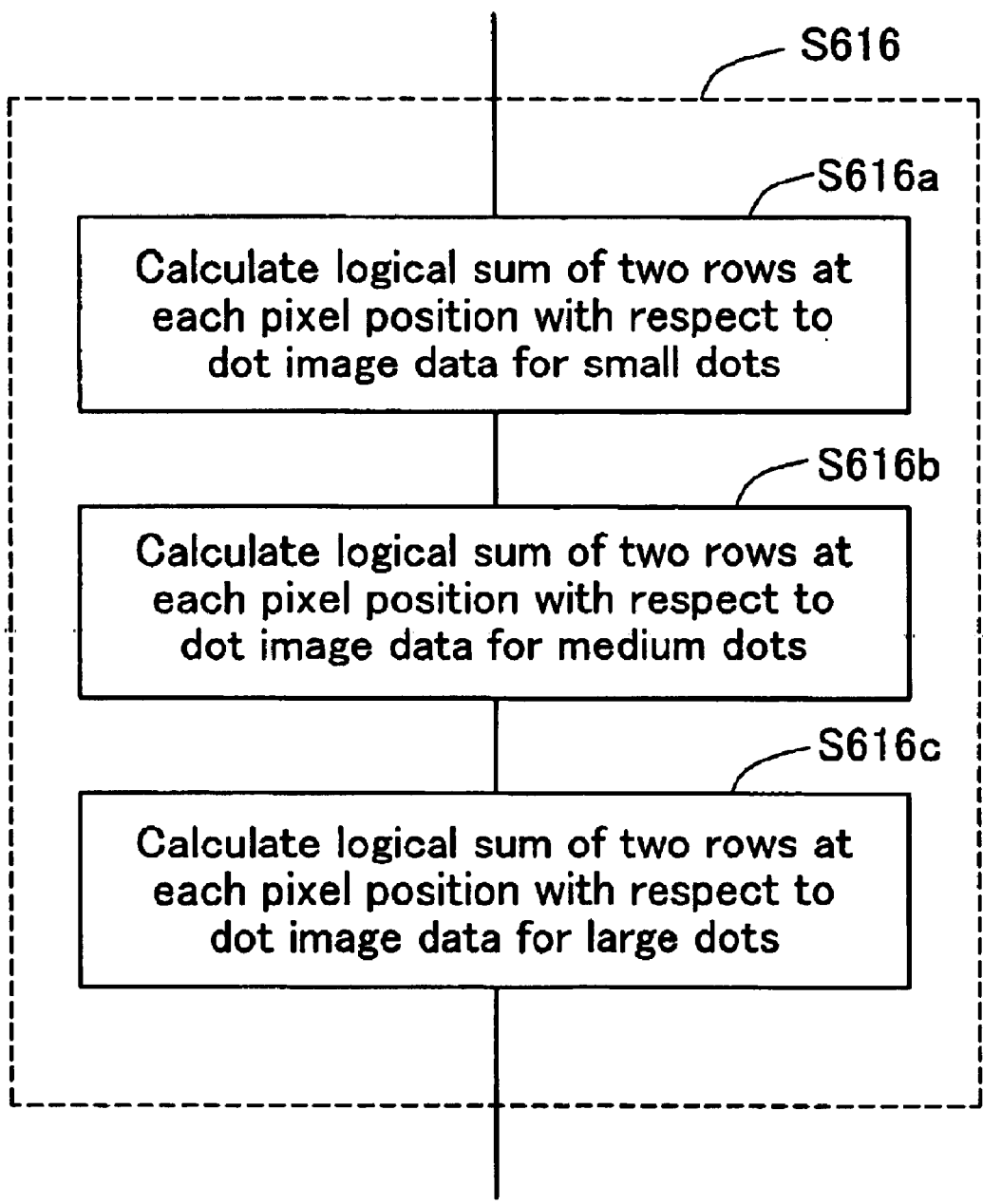
FIG. 49 is a flowchart depicting a resolution reduction routine compatible with a plurality of dot sizes.

The above sixth modification was made on the assumption that there is only one type of dot size. FIG. 49 shows the detailed procedure of step S616 in the seventh modification in which three dots sizes (small, medium, and large) are printable, and bi-level data are prepared for each size.

Step S616 of FIG. 47 is divided into step S616a for calculating logical sums with respect to dot image data for small dots, step S616b for calculating logical sums with respect to dot image data for medium dots, and step S616d for calculating logical sums with respect to dot image data for large dots, as shown in FIG. 49. In this case as well, processing can be speeded up through logical summation. In all other respects the procedure is substantially the same as the one illustrated in FIG. 47.

(8) Eighth Modification

Figure 50:
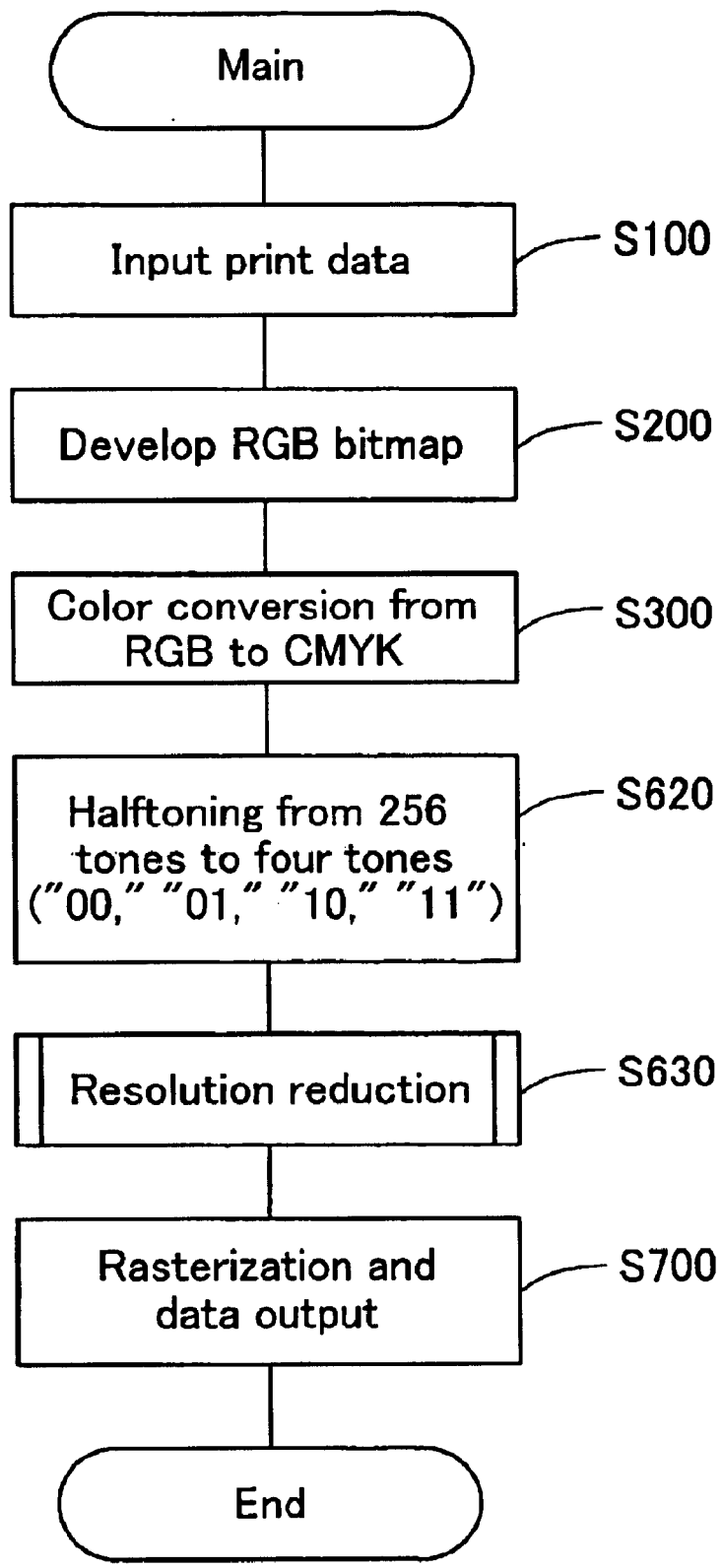
FIG. 50 is a flowchart depicting the print control routine of the seventh modification.

The halftoning process may involve not only a conversion to two-gradation level data but also a conversion to reduced gradation data of three or more gradation levels. In the flowchart shown in FIG. 50, 256-gradation image data are reduced to four-gradation data on the assumption that ink drops of three dot sizes (large, medium, and small) can be ejected. Four gradation levels can be expressed with two bits, such as "00" for no ejection, "01" for small dots, "10" for medium dots, and "11" for large dots. Resolution is then reduced in step S630 for the dot image data expressed by these four gradation levels.

Figure 51:
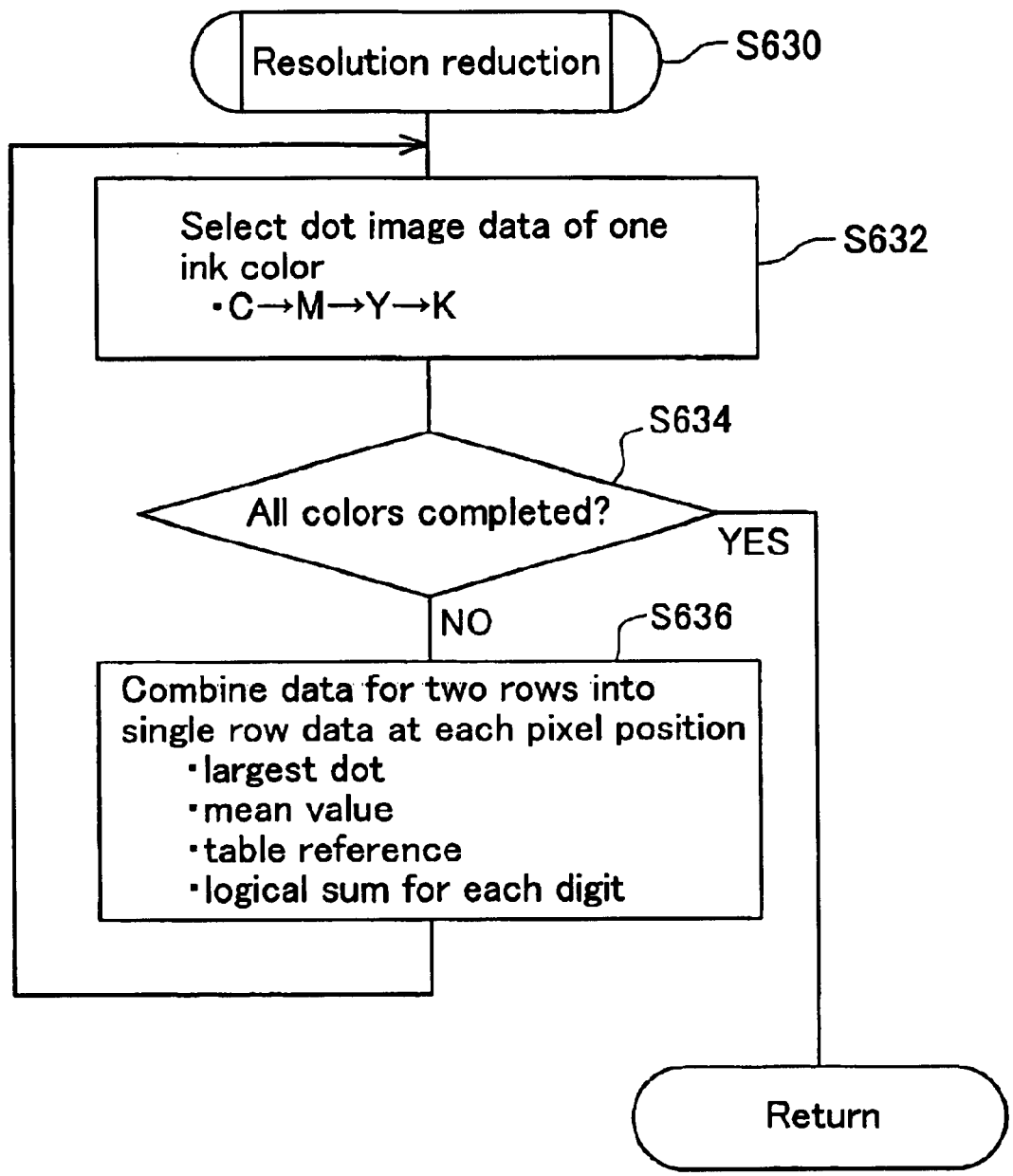
FIG. 51 is a flowchart depicting the resolution reduction routine of the same modification.

The main flow of the resolution reduction routine involving four gradation levels is the same as that of the above second embodiment, and the two pixel rows are combined into a single row in step S636 while one of the colors in the dot image data whose gradation levels have been reduced in steps S632 and 634 is sequentially selected, as shown in FIG. 51. It is not essential but in this example only one type of ink is used for each hue because local image density is reproduced by varying the dot size.

The following techniques for combining two pixel rows into a single row will be described below: a technique based on the largest dots, a technique for calculating mean values, a technique for referencing tables, and a technique for determining logical sums for each digit.

Figure 53:
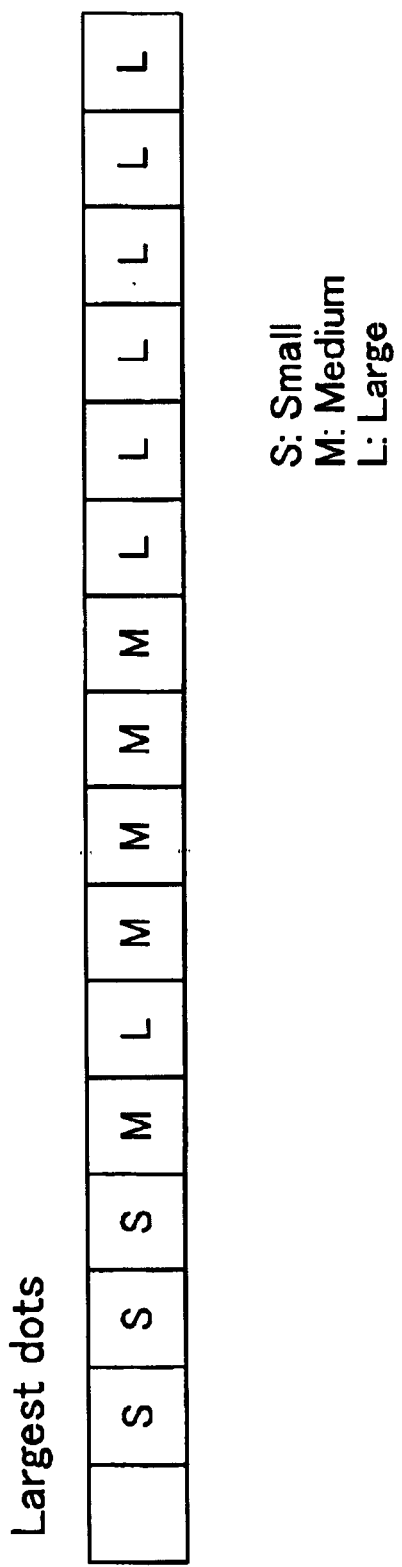
FIG. 53 is a diagram depicting dot images in which a technique for selecting the largest dots is reflected.

FIG. 52 shows original dot data for two pixel rows, which are commonly used in respective techniques. The results in FIG. 53 are obtained when the largest dots are selected in the course of combining two pixel rows into a single row. These results are obtained by selecting large dots from among the upper and lower pixels. Although dot size comparison is needed, the process can still be speeded up because of the two-bit comparison.

The results shown in FIG. 54 are obtained when mean values are calculated. Despite the mean values, the results are rounded up in order to prevent blurring. For example, the average of no ejection and a small dot is a small dot, the average of a small dot and a medium dot is a medium dot, and the average of a medium dot and a large dot is a large dot. In addition, the average of no ejection and a large dot is assumed to be a medium dot.

Although this approach is effective when the goal is to preserve the gradation reproduction characteristics, a slight reduction in speed is observed due to increased processing load.

It is also possible to combine the technique for calculating mean values and the technique for selecting the largest dots. Specifically, it is possible to adopt an arrangement in which the technique is switched with each ink. More specifically, it is determined during the selection of target ink whether the largest dot scheme or mean value scheme is to be applied, and the two pixel rows are combined into a single row in accordance with the selected scheme. In this case, the preferred option is to select the largest dot scheme for dark color inks, and to select the mean value scheme for light color inks. When light and dark color inks are used for the same color hue, it is intended to reproduce gradation curve characteristics with the light color inks, so the use of the mean value scheme for light color inks is advantageous even when the processing load increases.

In the case of table reference, a table such as the one shown in FIG. 55, in which the correspondence relationship is pre-established, may be produced to perform the resolution reduction. This approach is effective for reducing the processing load when calculating mean values or when striving to improve print quality by averaging. Since the table can be appropriately adjusted in accordance with the actual printing results, print quality can be improved by such adjustments. The technique for referencing tables is performed such that two sets of two bit data related to a pixel pair are combined into four-bit input data, and the corresponding output data is read out from the table.

A comparison of the results shown in FIG. 56 and the results shown in FIG. 54 indicates that there are differences in the sixth, ninth, and sixteenth pixel positions.

Figure 57:
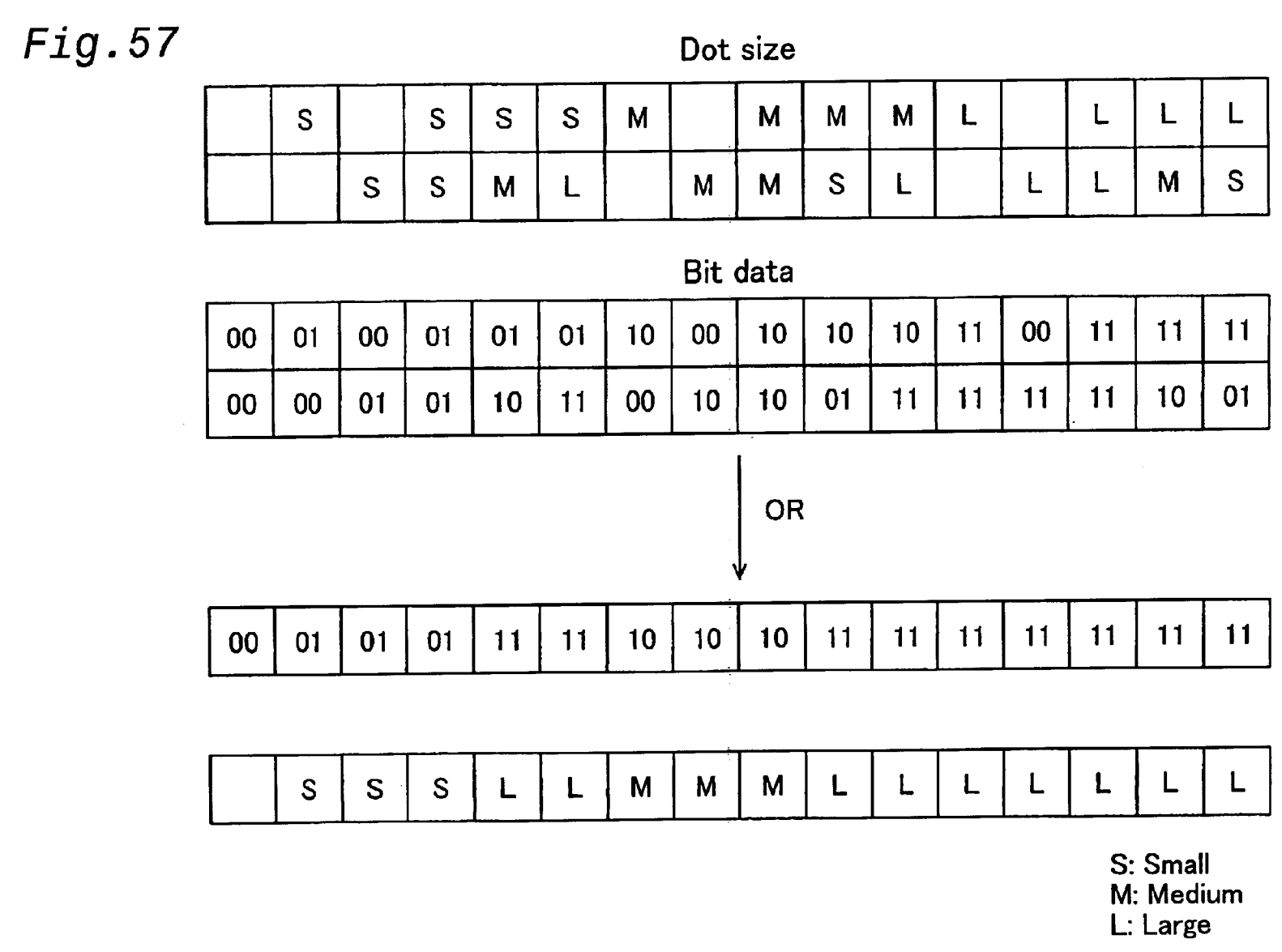

The technique in which logical summation is performed for each digit will finally be described. This technique is schematically shown in FIG. 57. The upper tier shows dot sizes on two pixel rows at a high resolution, and the middle tier shows corresponding two-bit data. Logical sums are calculated at each bit position between the upper and lower pixels.

A comparison between this approach and the selection of the largest dots reveals differences in the first and tenth pixel positions. In this example, gradation reproduction may sometimes be adversely affected, but an extremely rapid routine can be performed.

It is apparent that the present invention is not limited to the above modifications. It is also apparent that these modifications can be combined in a variety of ways in order to utilize their characteristics.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing device for printing on a print medium while performing main scanning, comprising:
    a print head having a plurality of nozzles ejecting a same given ink and a plurality of eject drive elements for causing droplets of ink to be ejected from the plurality of nozzles;
    a main scan drive section for performing main scanning by means of moving the print medium and/or the print head;
    a sub scan drive section performing sub scanning by means of moving the print medium and/or the print head;
    a head drive section for providing a drive signal to each eject drive element in response to a print signal; and
    a controller for controlling the sections; the controller having a first print mode wherein gradation reproduction with the same ink is performed by:
        (i) designating as a unit of gradation reproduction a group of N contiguous pixels arranged in a selected one of a main scan direction and a sub scan direction where N is an integer of at least 2;
        (ii) setting a volume of ink ejectable onto at least one pixel location of the N pixels to a value different from a volume of ink ejectable onto other pixel locations; and
        (iii) controlling the volume of ink at each pixel location of the N pixels to reproduce M gradation levels for each group of the N pixels where M is an integer of at least N+2.

2. A printing device according to claim 1, wherein the head drive section drives the plurality of eject drive elements in the course of one main scan pass so as to eject droplets of a predetermined volume of ink, predetermined for each main scan, exclusively at intermittent pixel locations selected from pixel locations on each main scan line scanned by the plurality of nozzles, and
    the print head ejects ink droplets over each main scan line in the course of a plurality of main scan passes such that M gradation levels are reproducible at each group of N pixels.

3. A printing device according to claim 2, wherein the head drive section overstrikes ink droplets of the same ink on at least one pixel location of the group of N pixels in the course of a plurality of main scan passes.

4. A printing device according to claim 3, wherein different volumes of ink are ejected at the ink overstrike pixel location during each main scan.

5. A printing device according to claim 4, wherein the head drive section comprises:
    a common drive signal generator capable of selectively generating, for each main scan, one of a plurality of common drive signal types; and
    a drive signal shaping circuit for shaping the common drive signal supplied by the common drive signal generator, the shaping being performed for each pixel with reference to the print signal to generate a drive signal which is supplied to each individual eject drive element;
    wherein the head drive section varies the volume of ink ejectable by the plurality of nozzles by means of modifying a waveform of the common drive signal.

6. A printing device according to claim 1, wherein the integer N is 2 and the integer M is at least 4.

7. A printing device according to claim 6, wherein pixel pairs constituting the unit of gradation reproduction are arrayed in opposite directions on adjacent main scan lines.

8. A printing device according to claim 1, wherein the volume of ink ejected at a darkest gradation level of the M gradation levels reproducible by the N pixels is such that a print area on the print medium is set solid with the given same ink.

9. A printing device according to claim 1, wherein the M gradation levels reproducible by the N pixels are set to have substantially equal increments of lightness level.

10. A printing device according to claim 1, wherein the control section further has a second print mode for printing at higher resolution than the first print mode, wherein a minimum volume of ink that can be ejected onto the N pixel locations in the first print mode is equivalent to the volume of ink with which a print area on the print medium is set solid with the given same ink in the second print mode.

11. A printing method employing a print head having a plurality of nozzles ejecting a same given ink and a plurality of eject drive elements for causing droplets of ink to be ejected from the plurality of nozzles, for printing on a print medium while performing main scanning; the method comprising the step of performing gradation reproduction with the same ink by:

(i) designating as a unit of gradation reproduction a group of N contiguous pixels arranged in a selected one of a main scan direction and a sub scan direction where N is an integer of at least 2;

(ii) setting a volume of ink ejectable onto at least one pixel location of the N pixels to a value different from a volume of ink ejectable onto other pixel locations; and (iii) controlling the volume of ink at each pixel location of the N pixels to reproduce M gradation levels for each group of the N pixels where M is an integer of at least N+2.

12. A printing method according to claim 11, wherein droplets of a predetermined volume of ink, predetermined for each main scan, are ejected exclusively at intermittent pixel locations selected from pixel locations on each main scan line scanned by the plurality of nozzles, and the print head ejects ink droplets over each main scan line in the course of a plurality of main scan passes such that M gradation levels are reproducible at each group of N pixels.

13. A printing method according to claim 12, wherein ink droplets of the same ink are overstruck on at least one pixel location of the group of N pixels in the course of a plurality of main scan passes.

14. A printing method according to claim 13, wherein different volumes of ink are ejected at the ink overstrike pixel location during each main scan.

15. A printing method according to claim 14, further comprising:

selectively generating, for each main scan, one of a plurality of common drive signal types;

shaping the common drive signal supplied by the common drive signal generator, the shaping being performed for each pixel with reference to the print signal to generate a drive signal which is supplied to each individual eject drive element; and modifying a waveform of the common drive signal to vary the volume of ink ejectable by the plurality of nozzles.

16. A printing method according to claim 11, wherein the integer N is 2 and the integer M is at least 4.

17. A printing method according to claim 16, wherein pixel pairs constituting the unit of gradation reproduction are arrayed in opposite directions on adjacent main scan lines.

18. A printing method according to claim 11, wherein the volume of ink ejected at a darkest gradation level of the M gradation levels reproducible by the N pixels is such that a print area on the print medium is set solid with the given same ink.

19. A printing method according to claim 11, wherein the M gradation levels reproducible by the N pixels are set to have substantially equal increments of lightness level.

20. A printing method according to claim 11, wherein a minimum volume of ink that can be ejected onto the N pixel locations is set equivalent to the volume of ink with which a print area on the print medium is set solid with the given same ink in another print mode.

21. A print control device for supplying print data to a print device, the print device including a print head having a plurality of nozzles ejecting a same given ink and a plurality of eject drive elements for causing droplets of ink to be ejected from the plurality of nozzles, the print control device being capable of producing the print data for reproducing gradation levels with the same ink, the gradation reproduction being performed by:

(i) designating as a unit of gradation reproduction a group of N contiguous pixels arranged in a selected one of a main scan direction and a sub scan direction where N is an integer of at least 2;

(ii) setting a volume of ink ejectable onto at least one pixel location of the N pixels to a value different from a volume of ink ejectable onto other pixel locations; and (iii) controlling the volume of ink at each pixel location of the N pixels to reproduce M gradation levels for each group of the N pixels where M is an integer of at least N+2.

22. A print control method for supplying print data to a print device, the print device including a print head having a plurality of nozzles ejecting a same given ink and a plurality of eject drive elements for causing droplets of ink to be ejected from the plurality of nozzles, the print control method comprising the step of producing the print data for reproducing gradation levels with the same ink, the gradation reproduction being performed by:

(i) designating as a unit of gradation reproduction a group of N contiguous pixels arranged in a selected one of a main scan direction and a sub scan direction where N is an integer of at least 2;

(ii) setting a volume of ink ejectable onto at least one pixel location of the N pixels to a value different from a volume of ink ejectable onto other pixel locations; and (iii) controlling the volume of ink at each pixel location of the N pixels to reproduce M gradation levels for each group of the N pixels where M is an integer of at least N+2.

23. A computer program product for producing print data to be supplied to a print device, the print device including a print head having a plurality of nozzles ejecting a same given ink and a plurality of eject drive elements for causing droplets of ink to be ejected from the plurality of nozzles, the computer program product comprising:

a computer readable medium; and a computer program stored on the computer readable medium, the computer program comprising:

a program for causing a computer to produce the print data for reproducing gradation levels with the same ink, the gradation reproduction being performed by:

(i) designating as a unit of gradation reproduction a group of N contiguous pixels arranged in a selected one of a main scan direction and a sub scan direction where N is an integer of at least 2;

(ii) setting a volume of ink ejectable onto at least one pixel location of the N pixels to a value different from a volume of ink ejectable onto other pixel locations; and (iii) controlling the volume of ink at each pixel location of the N pixels to reproduce M gradation levels for each group of the N pixels where M is an integer of at least N+2.

24. A method of adjusting placement of ink droplets for a printing device including a print head having a plurality of nozzles ejecting a same given ink and a plurality of eject drive elements for causing droplets of ink to be ejected from the plurality of nozzles, wherein gradation reproduction with the same given ink is performed by:
(i) designating as a unit of gradation reproduction a group of N contiguous pixels arranged in a selected one of a main scan direction and a sub scan direction where N is an integer of at least 2;
(ii) setting a volume of ink ejectable onto at least one pixel location of the N pixels to a value different from a volume of ink ejectable onto other pixel locations; and
(iii) controlling the volume of ink at each pixel location of the N pixels to reproduce M gradation levels for each group of the N pixels where M is an integer of at least N+2;

wherein during printing the plurality of eject drive elements, in the course of one main scan, are driven so as to eject droplets of a predetermined volume of ink, predetermined for each main scan, exclusively at intermittent pixel locations selected from pixel locations on each main scan line scanned by the plurality of nozzles;

and wherein the method comprises the steps of:
(a) printing a first test pattern including two dot types of different size such that the two dot types are recorded substantially arrayed in single columns in the sub scanning direction;
(b) determining a relative correction value for placement in the main scanning direction for the two dot types with reference to the first test pattern; and
(c) performing correction of relative position of the two dot types using the relative correction value during printing, while forming the two dot types at different pixel locations on a same main scan line.

25. A method according to claim 24, further comprising the steps of:
(d) printing a second test pattern for adjusting placement, in the main scan direction in a forward pass and reverse pass during bidirectional printing, with respect to a predetermined reference dot selected from the two dot types; and
(e) determining for the reference dot a reference correction value for placement in the main scanning direction during bidirectional printing, with reference to the second test pattern;

and wherein during the bidirectional printing the step (c) comprises the steps of:
correcting main scanning direction position of the two dot types using the relative correction value during a first one of the forward pass and reverse pass; and
correcting main scanning direction position of the two dot types using both of the relative correction value and the reference correction value during a second one of the forward pass and reverse pass.

26. A computer program product for adjusting placement of ink droplets for a computer system comprising a printing device, the printing device including a print head having a plurality of nozzles ejecting a same given ink and a plurality of eject drive elements for causing droplets of ink to be ejected from the plurality of nozzles, the computer program product comprising:
a computer readable medium; and
a computer program stored on the computer readable medium,
wherein gradation reproduction with the same given ink is performed by:

(i) designating as a unit of gradation reproduction a group of N contiguous pixels arranged in a selected one of a main scan direction and a sub scan direction where N is an integer of at least 2;
(ii) setting a volume of ink ejectable onto at least one pixel location of the N pixels to a value different from a volume of ink ejectable onto other pixel locations; and
(iii) controlling the volume of ink at each pixel location of the N pixels to reproduce M gradation levels for each group of the N pixels where M is an integer of at least N+2;

wherein during printing the plurality of eject drive elements, in the course of one main scan, are driven so as to eject droplets of a predetermined volume of ink, predetermined for each main scan, exclusively at intermittent pixel locations selected from pixel locations on each main scan line scanned by the plurality of nozzles;

and wherein the computer program comprises:
a first program for causing a computer to print out a first test pattern including two dot types of different size such that the two dot types are recorded substantially arrayed in single columns in the sub scanning direction; and
a second program for causing the computer to perform correction of relative position of the two dot types using a relative correction value during printing where the relative correction value is determined with reference to the first test pattern, while forming the two dot types at different pixel locations on a same main scan line.

27. A print control device for controlling a printing device comprising a print head having a plurality of nozzles capable of performing high-resolution printing by ejecting ink drops onto each high-resolution pixel, wherein the print control device has a high-speed print mode and a low-speed print mode, and wherein when the high-speed print mode is selected, the print control device performs:
resolution reduction to generate low-resolution image data from high-resolution image data, the high-resolution image data having a pixel value at each high-resolution pixel, the low-resolution image data having a pixel value at each low-resolution pixel consisting of a group of high-resolution pixels adjacent to each other; and
printing of a low-resolution image by ejecting ink drops onto each high-resolution pixel according to the low-resolution image data.

28. A printing device comprising a print head having a plurality of nozzles capable of performing high-resolution printing by ejecting ink drops onto each high-resolution pixel, wherein the printing device has a high-speed print mode and a low-speed print mode, and wherein when the high-speed print mode is selected, the printing device performs:
resolution reduction to generate low-resolution image data from high resolution image data, the high-resolution image data having a pixel value at each high-resolution pixel, the low-resolution image data having a pixel value at each low-resolution pixel consisting of a group of high-resolution pixels adjacent to each other; and printing of a low-resolution image by ejecting ink drops onto each high-resolution pixel according to the low-resolution image data.

29. A printing method using a print head having a plurality of nozzles capable of performing high-resolution printing by ejecting ink drops onto each high-resolution pixel, the method comprising:

providing a high-speed print mode and a low-speed print mode, and when the high-speed print mode is selected, performing resolution reduction to generate low-resolution image data from high-resolution image data, the high-resolution image data having a pixel value at each high-resolution pixel, the low-resolution image data having a pixel value at each low-resolution pixel consisting of a group of high-resolution pixels adjacent to each other; and printing a low-resolution image by ejecting ink drops onto each high-resolution pixel according to the low-resolution image data.

* * * * *